(12) United States Patent
Borodovsky et al.

(10) Patent No.: US 9,901,824 B2
(45) Date of Patent: Feb. 27, 2018

(54) USER CONTROL OF OBJECTS AND STATUS CONDITIONS

(71) Applicant: Wargaming.net LLP, London (GB)

(72) Inventors: Vitaliy Borodovsky, Minsk (BY); Dmitriy Bobrovnichiy, Minsk (BY)

(73) Assignee: Wargaming.net Limited, Nicosia (CY)

( * ) Notice: Subject to any disclaimer, the term of this patent is extended or adjusted under 35 U.S.C. 154(b) by 852 days.

(21) Appl. No.: 14/206,207

(22) Filed: Mar. 12, 2014

(65) Prior Publication Data

US 2015/0258441 A1 Sep. 17, 2015

(51) Int. Cl.
*A63F 13/537* (2014.01)
*A63F 13/2145* (2014.01)
*A63F 13/69* (2014.01)
*A63F 13/803* (2014.01)
*A63F 13/837* (2014.01)
*A63F 13/58* (2014.01)

(52) U.S. Cl.
CPC ........ *A63F 13/537* (2014.09); *A63F 13/2145* (2014.09); *A63F 13/69* (2014.09); *A63F 13/58* (2014.09); *A63F 13/803* (2014.09); *A63F 13/837* (2014.09)

(58) Field of Classification Search
None
See application file for complete search history.

(56) References Cited

U.S. PATENT DOCUMENTS

| | | | | |
|---|---|---|---|---|
| 6,241,524 B1* | 6/2001 | Aoshima | ................ | A63F 13/10 434/118 |
| 6,518,951 B1* | 2/2003 | Keyson | ................... | A63F 13/10 345/156 |
| 9,274,705 B2 | 3/2016 | Son et al. | | |
| 2007/0265081 A1 | 11/2007 | Shimura et al. | | |
| 2007/0270226 A1* | 11/2007 | York | ...................... | A63F 13/00 463/43 |
| 2008/0026842 A1 | 1/2008 | Nakasaka | | |
| 2009/0059497 A1 | 3/2009 | Kuwahara et al. | | |
| 2011/0172013 A1 | 7/2011 | Shirasaka et al. | | |
| 2011/0314093 A1* | 12/2011 | Sheu | ..................... | G06F 9/4445 709/203 |

(Continued)

OTHER PUBLICATIONS

Wargaming.net, World of Tanks Game Manual, copyright 2008-2012, 76 pages.*

(Continued)

*Primary Examiner* — Jay Liddle
*Assistant Examiner* — Alex F. R. P. Rada, II
(74) *Attorney, Agent, or Firm* — Banner & Witcoff, Ltd.

(57) ABSTRACT

Methods and systems for providing user control of objects or vehicles simulated in a simulated environment or virtual world are described herein. The user control may include various types of touch controls that may be used by a player to move the object or vehicle in a direction and/or at a velocity. The user, in some embodiments, may be able to select which type of touch control is used in the user interface. In some arrangements, the touch control may include a touch zone arrangement that can be changed based on a condition of the virtual world or a player interaction with a user interface. Additionally, in some embodiments, the user control may include one or more controls for removing one or more statuses that may be received by the vehicle.

20 Claims, 50 Drawing Sheets

(56) References Cited

U.S. PATENT DOCUMENTS

| | | | |
|---|---|---|---|
| 2012/0242590 A1* | 9/2012 | Baccichet | G06F 3/0488 345/173 |
| 2013/0038623 A1 | 2/2013 | Tezuka et al. | |
| 2013/0088437 A1 | 4/2013 | Nishidate | |
| 2015/0182856 A1* | 7/2015 | Mays, III | A63F 13/2145 463/31 |
| 2015/0258442 A1* | 9/2015 | Yudo | A63F 13/537 463/31 |

OTHER PUBLICATIONS

Oct. 23, 2014 U.S. Non-Final Office Action—U.S. Appl. No. 14/206,189.
Feb. 23, 2015 U.S. Final Office Action—U.S. Appl. No. 14/206,189.
Nov. 5, 2015 U.S. Non-Final Office Action—U.S. Appl. No. 14/206,189.
Wu Metal., "Multi-finger and whole hand gestural interaction techniques for multi-user tabletop displays", Proceedings of the 16H Annual ACM Symposium on User Interface Software and Technology: Vancouver, Canada, Nov. 2-5, 2003, ACM Press, New York, NY vol. 5, No. 2, Nov. 2, 2003, pp. 193-202.
May 2, 2016 U.S. Final Office Action—U.S. Appl. No. 14/206,189.

\* cited by examiner

Vehicle — 555

Attributes: — 557
- Name: Liechttraktor — 561
- Hit Points: 110 — 563
- Weight/Load li mit: 7.5/9.2 — 564
- Engine Power (h.p.) = 51 — 565
- Speed Limit = 46 km/h — 566
- Hull Armor (front/s ide/rear mm)= 14/12/12 — 567
- Turret Armor (front/s ide/rear mm) = 14/12/12 — 568
- Standard Shell Damage = 24-40 — 569
- Standard Shell Pene tration (mm) 26-43 — 570
- Rate of Fire (rounds/min) = 30 — 571
- Turret Traverse Speed (deg/sec) — 572
- View Range (m) = 270 — 573
- Signal Range (m)= 100 — 574

Module: — 559
- Gun: 37 mm M-5 — 575
- Turret: D37812 — 576
- Engine: Continental W-670 — 577
- Suspension: Stuart E1 — 578
- Radio: SCR 209 — 579
- Additional: — 580

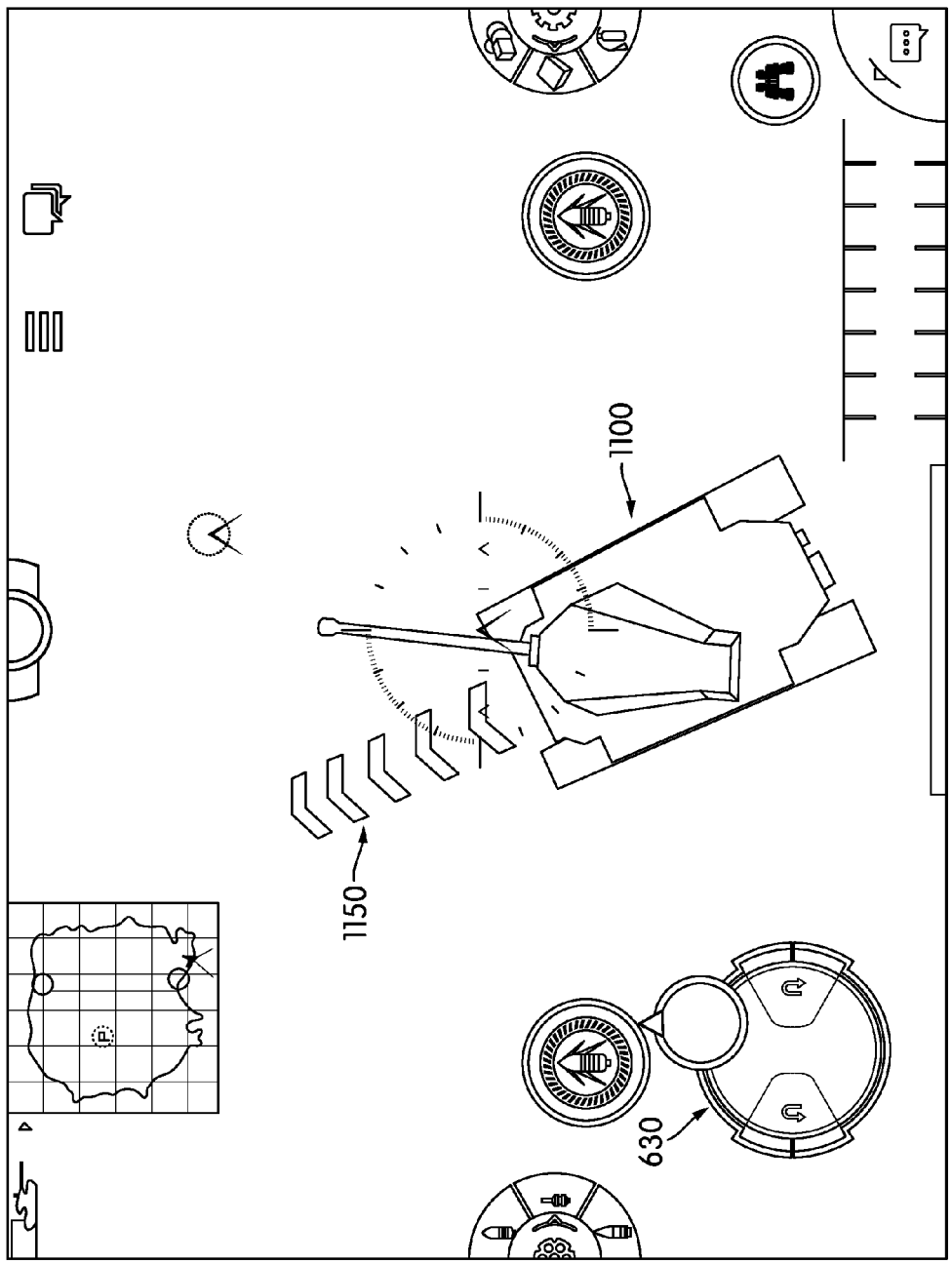

USER CONTROL OF OBJECTS AND STATUS CONDITIONS

FIELD

Aspects of the disclosure relate to computer systems, computer software, and video games. More particularly, aspects of the disclosure relate to video game software, including aspects related to a user controlling an object of the video game.

BACKGROUND

Video games are increasingly popular. Online multiplayer video games have become particularly popular due, at least in part, to the ability of players to compete with multiple other human players.

Popular genres games include objects, such as vehicles or characters, that can be controlled by a player through a virtual world. To be able to control the object through the virtual world, a player may be provided with a mechanism and/or control scheme to provide input that is interpreted and converted to commands that control the object. For example, players may commonly use a mouse, keyboard, gamepad, touch screen or one of various types of joysticks to provide input. Players often desire a mechanism and/or control scheme that allows him or her to accurately and reliably control the object through the virtual world. Improving accuracy and reliability of a mechanism and/or control scheme can improve a player's experience in the video game and improve his or her performance against other players.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Methods and systems for providing user control of objects or vehicles simulated in a simulated environment or virtual world are described herein. The user control may include various types of touch controls that may be used by a player to move the object or vehicle in a direction and/or at a velocity. The user, in some embodiments, may be able to select which type of touch control is used in the user interface. In some arrangements, the touch control may include a touch zone arrangement that can be changed based on a condition of the virtual world or a player interaction with a user interface.

For example, some aspects described herein relate to a method that may comprise generating a user interface for a virtual world. The user interface may include a touch control having a touch zone arrangement in which a user may press to control an object of the virtual world. The method may also comprise changing, responsive to a condition of the virtual world or user interaction with the user interface, the touch control to have a different touch zone arrangement. The condition of the virtual world or user interaction with the user interface may include a change from a first viewing mode to a second viewing mode. The condition of the virtual world or user interaction with the user interface may include the user pressing within a touch zone of the touch zone arrangement. Changing the touch control to have the different touch zone arrangement may include increasing a size of a touch zone of the touch zone arrangement or may include decreasing a size of a dead zone of the touch zone arrangement. The user interface may include a visual indicator indicating the direction and velocity the object is moving. The user interface may also include one or more object condition controls operable in an active mode and a manual mode. The method may further comprise removing an object status responsive to the object receiving a status and the one or more object condition controls being in the active mode.

Additional aspects described herein related to a dissected touch control that includes a set of dissected touch control elements that can be separately displayed from each other. For example, some embodiments may include receiving a first gesture input from a user; responsive to receiving the first gesture input, generating, as part of a user interface for a virtual world, a first touch control element that is associated with one or more first touch zones of a touch control in which the user may press to control an object of the virtual world; receiving first press input from the user within the one or more first touch zones; controlling the object based on the first press input; receiving a second gesture input from the user; responsive to receiving the second gesture input, generating, as part of the user interface, a second touch control element that is associated with one or more second touch zones of the touch control; receiving second press input from the user within the one or more second touch zones; and controlling the object based on the second press input.

Further aspects described herein relate to a touch control, such as the dissected touch control, that may be placed at different locations of a user interface. For example, some embodiments may include receiving a first gesture input from a user; responsive to receiving the first gesture input, generating, as part of a user interface for a virtual world, a first touch control element of a dissected touch control at a first location; controlling an object of the virtual world based on the first touch control element; receiving a second gesture input from the user; responsive to receiving the second gesture input, generating, as part of the user interface, a second touch control element of the dissected touch control at a second location different from the first location; and controlling the object based on the first touch control element.

Yet further aspects may relate to one or more controls for removing one or more statuses that may be received by the vehicle as it travels through the virtual world.

The methods described herein may be performed based on instructions stored on a statutory computer readable medium, or executed by a virtual environment server configured to perform as described herein.

These and other aspects will be apparent upon reading the detailed description below.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 5B illustrates an instance of a vehicle object according to various features described herein.

DETAILED DESCRIPTION

In the following description of the various aspects, reference is made to the accompanying drawings, which form a part hereof, and in which is shown by way of illustration how various features described herein may be practiced. It is understood that other embodiments may be used and structural and functional modifications may be made.

Figure 1:
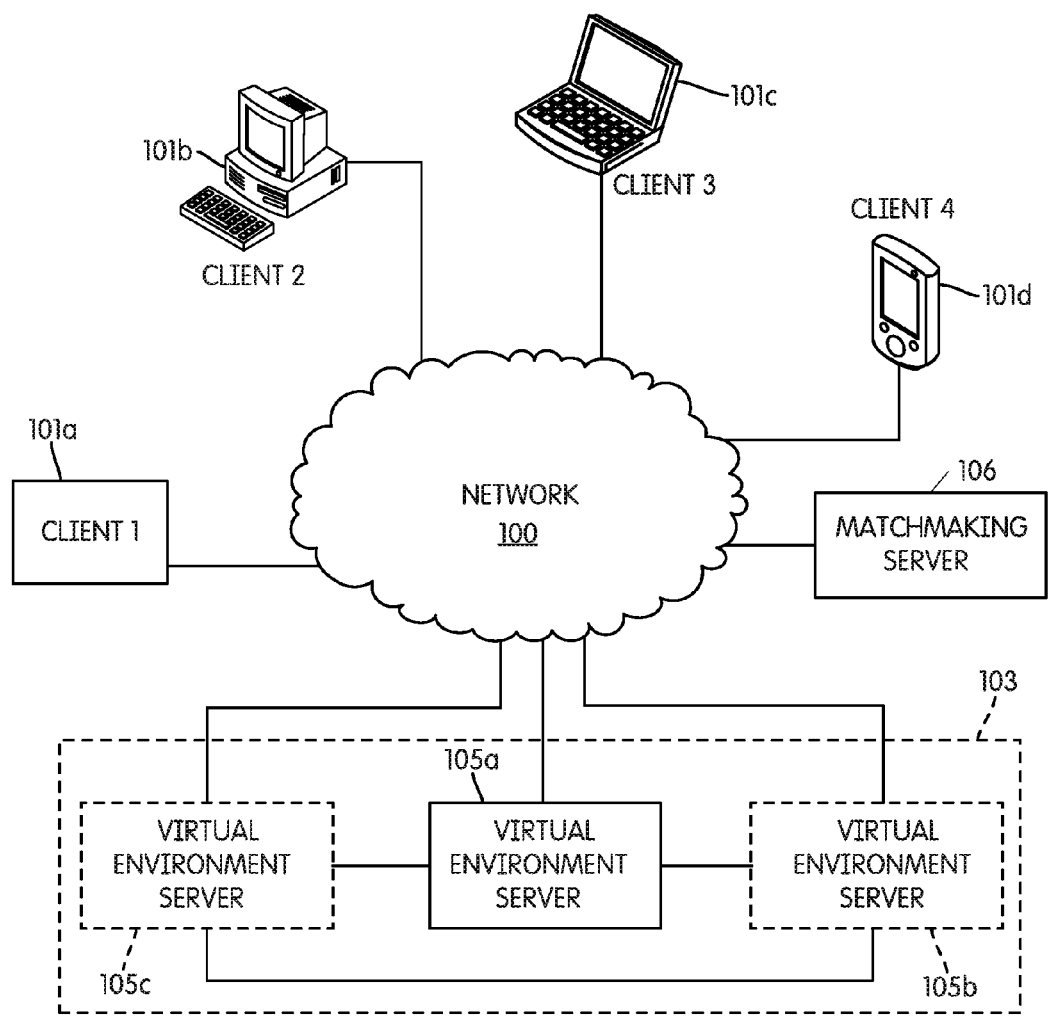
FIG. 1 is an illustrative network environment in which one or more aspects described herein may be used.

FIG. 1 illustrates a network environment in which clients 101 may interact with virtual world servers 105 to provide a virtual world for users to access. Clients 101 may include a variety of devices including generic data processing device 101a, personal computer (PC) 101b, laptop, portable, or netbook computer 101c, personal data assistant, mobile phone or device 101d, a tablet device (not shown) and the like. Each of clients 101 may have a network adapter (and software) that allows clients 101 to connect to virtual world servers 105 through network 100. In one example, network 100 may include an Internet Protocol (IP) based network, e.g., the Internet. Other networks may include cellular networks, cable networks, fiber optic networks, wireless networks, wired network and/or combinations thereof. Network 100 may further include one or more sub-networks such as wired or wireless local area networks (LANs), wide area networks (WANs), and the like.

In one or more arrangements, virtual world servers 105 may be included in a virtual world server system 103 that includes multiple linked physical and/or logical servers 105. Using such a distributed system, servers 105 may be able to distribute load across each of server 105. For example, if server 105a is experiencing high loads, some of the operations may be passed to either server 105b or 105c or both. Load may further be distributed based on user geography or on other predetermined bases. Alternatively, the virtual world may be hosted on a single server, e.g., virtual world server 105a. Each of servers 105 may collectively generate and manage a single instance of the virtual world, or each server 105a, 105b and 105c may provide independent instances of the world. An instance of a virtual world, as used herein, describes a stand-alone instance of the virtual world that does not interact with or depend on other instances of the virtual world. Depending on the processing load, a virtual world server system 103 may divide a plurality of users among multiple instances of the virtual world, to reduce or alleviate overloading on a single server or prevent overpopulation. Each server 105 may be logical or physical, e.g., multiple logical servers may reside and be running on the same physical computing device/server, or servers may be physically separate devices.

The network environment of FIG. 1 may also associate with one or more matchmaking servers 106. As used herein, a matchmaking server 106 may determine what set of players to assign to a same instance of the virtual world to ensure that all players meet predefined criteria for that instance of the virtual world.

In addition to or alternatively from the virtual world server 105a and/or the one or more matchmaking servers 106, other servers may be used in the network environment. For example, another server (not shown) may be used to manage user logins; and yet another server (also not shown) may be used to store account data. The servers included in the network environment may be organized in various ways, such as a server center, periphery, central server with a number of peripheral devices, and the like.

Figure 2:
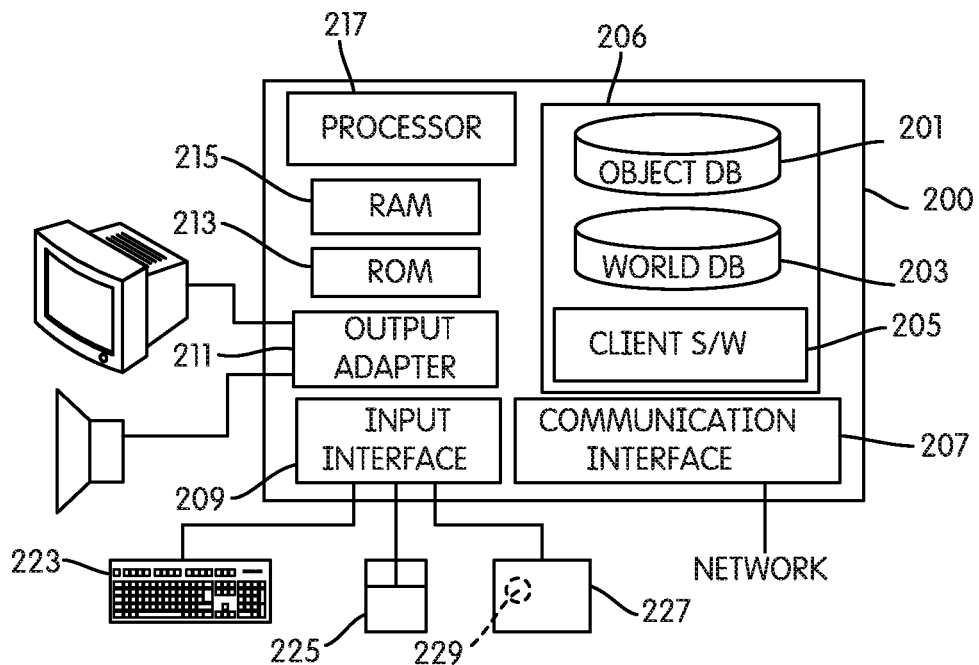
FIG. 2 is a block diagram illustrating an example virtual world client according to one or more aspects described herein.

FIG. 2 illustrates an example client device 200 such as PC 101b (FIG. 1) that may be used to access and interact with a virtual world provided by a virtual world server such as server 105a of FIG. 1. Client device 200 may include a variety of components and modules including a processor 217, random access memory (RAM) 215, read only memory (ROM) 213, databases 201 and 203, client software 205, output adapter 211, input interface 209 and communication interface 207. Software, databases, operating systems, and the like may be stored in nonvolatile memory 206 (e.g., a magnetic disk or solid state hard drive, or equivalent). Object database 201 may be configured to store data defining and otherwise associated with an object used by a user of device 200 to explore and interact with the virtual world. World database 203, on the other hand, may be configured to store data for defining and generating the environment in which the objects exist. For example, world database 203 may store texture maps for rendering a floor or ground, walls, a sky and the like. In another example, world database 203 may store simulated environments, buildings, trees and other data defining animate or inanimate objects existing in the world, data defining computer controlled characters and the like. Each of database 201, 203 may or may not be a conventional database, and instead may refer to data stored in a memory, accessed as needed by the client software. Data associated with an object or the virtual world may be communicated between client device 200 and a virtual world server using communication interface 207. For example, object positions, attributes and status may be updated or environments may be changed by communicating such data through interface 207.

The world and the objects may be graphically rendered by client software 205 and subsequently sent to output adapter 211 and display 219. The client software 205 may, in one or more arrangements, be configured to generated three dimensional (3-D) models of the virtual world and components thereof as well as the object corresponding to a user. A user may control the object and interact with the world through input interface 209 using various types of input devices including keyboard 223, mouse 225, and one or more touch sensors 227 that sense when a user has pressed his or her finger at various locations, such as location 229. In some embodiments the one or more touch sensors 227 may be included in a touch pad, touch screen or the like. Devices that include one or more touch sensors 227 may detect various gestures performed by a user as one or more of his or her fingers are pressed onto the one or more touch sensors 227 (or the touch pad, touch screen, etc.). There are various types of touch sensors that a device may use, including capacitive touch sensors and resistive touch sensors. Some touch sensors may be usable with a stylus and a user may use the stylus instead of his or her finger to provide input to the touch sensor. Additionally, some touch sensors may be able to detect a single touch, while other touch sensors may be able to detect multiple touches at a given time. Other types of input devices may include a microphone (e.g., for voice communications over the network), joysticks, motion sensing devices and/or combinations thereof. In one or more arrangements, music or other audio such as speech may be included as part of the virtual world. In such instances, the audio may be outputted through speaker 221.

Client software 205, computer executable instructions, and other data used by processor 217 and other components of client device 200 may be stored RAM 215, ROM 213, nonvolatile memory 206 or a combination thereof. Other types of memory may also be used, including both volatile and nonvolatile memory. Software 205 may provide instructions to processor 217 such that when the instructions are executed, processor 217, client device 200 and/or other components thereof are caused to perform functions and methods described herein. In one example, instructions for generating a user interface for interfacing with the virtual world server may be stored in RAM 215, ROM 213 and/or nonvolatile memory 206. Client software 205 may include both applications and operating system software, and may include code segments, instructions, applets, pre-compiled code, compiled code, computer programs, program modules, engines, program logic, and combinations thereof. Computer executable instructions and data may further be stored on some physical form of computer readable storage media (referred to herein as "computer memory") including, e.g., electrically erasable programmable read-only memory (EEPROM), flash memory or other memory technology, CD-ROM, DVD or other optical disk storage, magnetic cassettes, magnetic tape, magnetic storage and the like.

Figure 3:
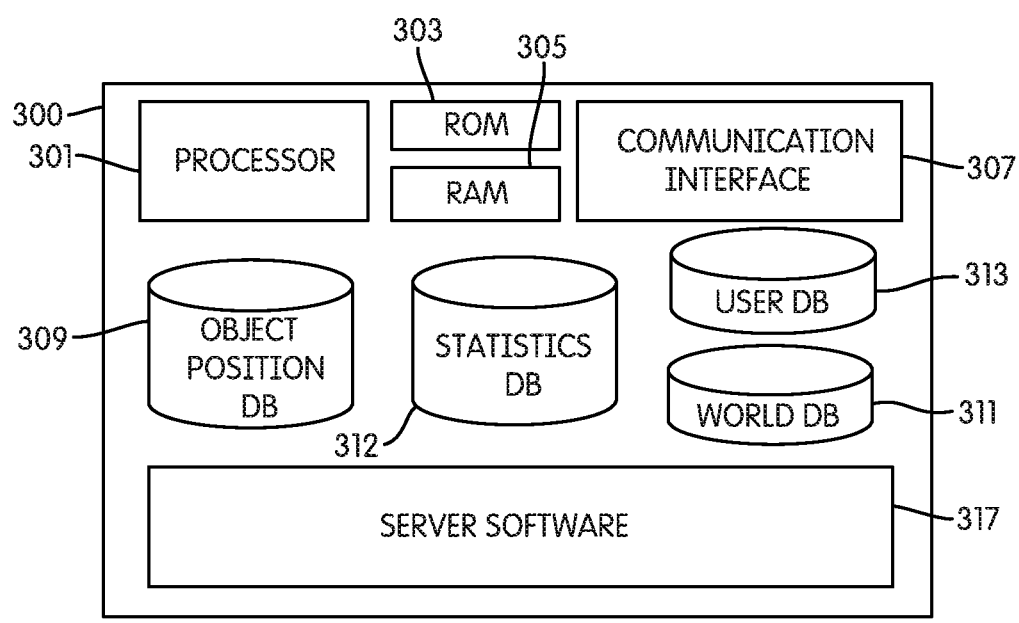
FIG. 3 is a block diagram illustrating an example virtual world server according to one or more aspects described herein.

Referring now to FIG. 3, a virtual world server 300 (e.g., an instance of server 105) may be configured to generate and operate a massive multiplayer online game, such as virtual world or the like. Server 300 may include processor 301, ROM 303, RAM 305, communication interface 307, object position database 309, world database 311, user database 313, server software 317, and a statistics database 312. Object position database 309 may be configured to store position information for each object (e.g., based on commands to move a vehicle received from each client). The statistics database 312 may be configured to store and/or transfer statistics relevant to game operation, including, for example, tracking player achievement and general game server performance.

A world database 311 may store rules, algorithms and other data for interactions that are available in the world. For example, a manner in which a computer controller character moves or otherwise behaves may be defined in data stored in world database 311. Additionally, item information may be defined in world database 311 so that items may not be modified by each client. In another example, world database 311 may store location information for non-object items and components. User database 313, on the other hand, may be configured to store user information describing a user controlling an object. For example, user database 313 may include account information, user preferences, one or more classes of user experience points and/or levels, payment information, user identification information, character definitions, state tables, and the like. Each of databases 309, 311, 312, 313 may or may not be a conventional database, and instead may refer to data stored in a memory, accessed as needed by the server software. For example, user database 313 may in fact be a collection of multiple databases or database tables.

Features described herein may be used with or in a variety of video games, including but not limited to, WORLD OF TANKS® by Wargaming.net®. Aspects described herein may also be used with other video games and are not limited to any one genre or implementation. Aspects described herein may be implemented in video game application software stored on a computer readable medium, e.g., storage 201, 203, 205, 206, 213, 215, 309, 311 312, and/or 313, and executable by a data processing device.

Various aspects of the disclosure provide features and capabilities that enhance game play by providing options through which users can develop strategies to play the video game. According to various aspects described herein, a video game may provide a graphically simulated virtual world or virtual environment, in which the game takes place, referred to herein interchangeably as a virtual world and as a simulated environment of the video game. The simulated environment may have features similar to actual geographic locations or may have fictional, science fiction or fantasy-themed environments.

Figure 4:
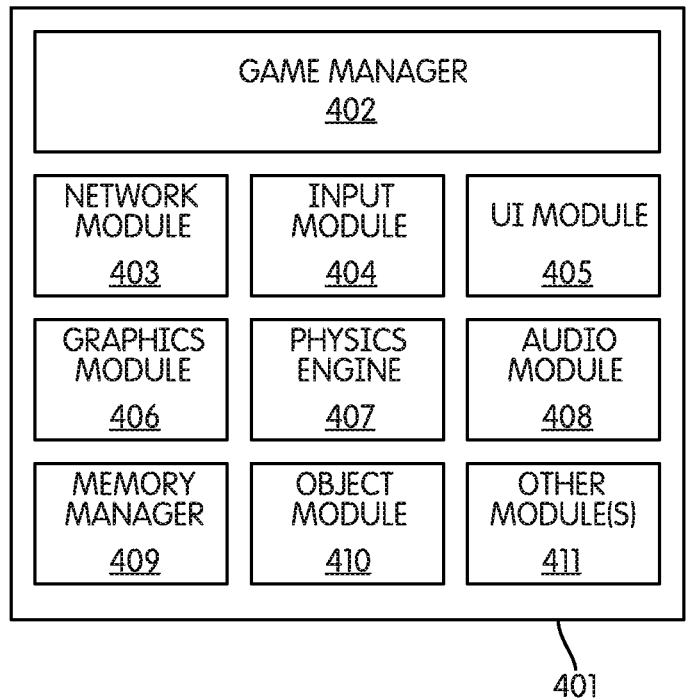
FIG. 4 illustrates a block architecture diagram of software modules that may be used to implement various features described herein.

FIG. 4 illustrates a block diagram of a video game software application 401. Each block in FIG. 4 illustrates a logical software module or function that performs an action, provides a capability or feature, implements an object, or performs some other aspect of the video game. When the video game software 401 executes on a data processing system such as a PC or game console, the modules operate collectively to provide a video game experience to a player. The modules illustrated in FIG. 4 are illustrative only, and additional or different modules may be used. The same, additional or different modules may be executed in tandem on a server with which each client device is connected.

Video game software 401 may include, e.g., a game manager module 402, which manages the overall operation of the video game and may be the initial module launched when the video game is executed. Video game software 401 may also include a network module 403, which manages network games sessions and communication with one or more game servers. A network game session may include e.g., a co-operative campaign with other networked players, or other compartmentalized periods of game play involving players located at discrete network locations. A memory manager module 409 performs memory management during execution of the video game 401. An input module 404 may receive and interpret user input via a game controller, keyboard, mouse, and the like, and provide the interpreted commands to game manager 402, network module 403, or other applicable module. UI module 405 may manage and control the user interface, including the display displayed on the video output device, interpreting input via the input module 404, and providing audio output via audio module 408.

Various software modules may operate with one or more classes or objects defined and used in the video game 401. The classes and objects may be defined with reference to an object module 410, and may include portions of executable software code and/or one or more data structures, depending on the object. Each object may be rendered and simulated in the virtual world in accordance with a physics engine 407. Video game software 401 may include other software modules 411 as needed. FIG. 4 illustrates one possible software architecture. Others may be used. Each module depicted in FIG. 4 may communicate directly or indirectly with each other module, e.g., by passing objects, data, parameters, input, and output, etc.

A first class of in-game objects may define characters in the video game. Characters may be defined by various attributes associated with the character, e.g., name, physical appearance, skills, etc. Skills may be defined based on a character's avatar, genre or task, e.g., gunners, tank commanders, and drivers in the present example. A gunner may have skills such as aiming accuracy and aiming speed, a tank commander may have skills that regulate the overall efficiency of the tank crew, a driver may have skills that determine the vehicle speed or precision of direction. Additional character attributes may include one or more other skills that can improve performance of the character or vehicle so as to enhance the strategic gaming experience such as firefighting skills, the ability to repair vehicles, the ability to camouflage vehicles, and the like.

A second class of in-game objects may define vehicles in the video game. A vehicle may be defined as any simulated inanimate object directly or indirectly controllable by or dependent on an in-game character or user/player. Illustrative vehicles may include tanks, airplanes, ships (and/or submarines), and the like. Vehicles may have various attributes and functions that provide advantageous qualities to the vehicle during combat. For example, some vehicles might be fast with minimal firepower, whereas other vehicles may be slower but extremely powerful. Infinite variations of strength, speed, defense, and any other attribute are possible.

Object module 410 may provide an array of vehicles, vehicle components, characters and other equipment. Vehicles, vehicle components, characters and other equipment may be defined by one or more objects and instantiated during the game. Each object may have various attributes and functions and provide advantages and disadvantages based thereon. A vehicle component may refer to an upgradeable component of a vehicle, e.g., armor plating, engine, guns, etc.

Figure 5A:
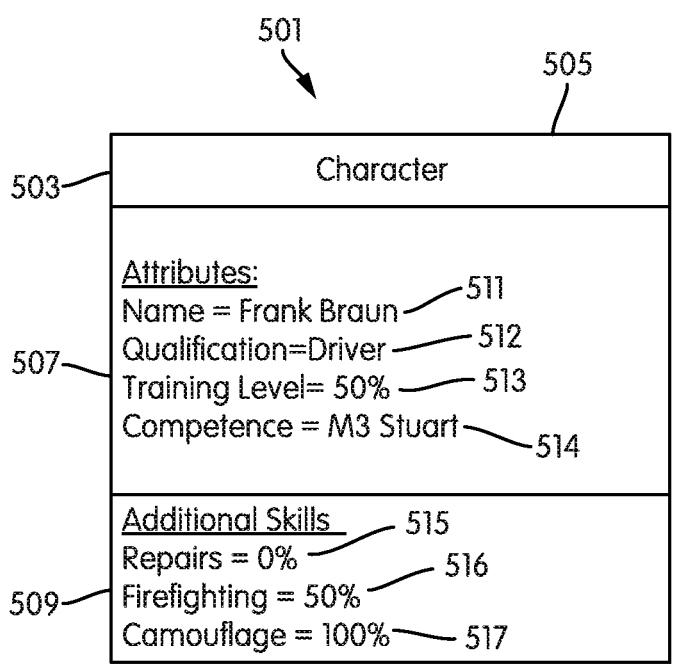
FIG. 5A illustrates an instance of a character object according to various features described herein.

FIG. 5A illustrates a block diagram of an instance 501 of a character object. Object instance 501 has an object class 505 (Character). Instance 501 may acquire one or more attributes from the object class. Attributes 507, when examined, define a state of the instance. In this example, the Character has the following attributes: Name 511, Qualification 512, Training Level 513, and Competence 514. A character may also have additional skill types 509. Additional skill types may include Repair Skills 515, Firefighting skills 516, and Camouflage skills 517. Other skill types, attributes, etc., may also or alternatively be used.

Each attribute may have a particular value. The attribute may have a default value inherited from the Qualification type 512. For some attributes, a player may increase attribute value by allocating experience points, gained during gameplay, to the character. Increased attribute value enhances gameplay by improving performance of the vehicle containing the characters. For example, by allocating experience points to the gunner of a tank, the Training Level 513 may be increased resulting in more accurate gun pointing by a vehicle containing that character, leading to improved vehicle performance during battle. Similarly, the effectiveness of the additional skill types is increased in accordance with the value of the skill. Thus, for example, a Firefighting skill 516 value of 100% is proportionally more effective than a value of 50%. Increased firefighting effectiveness results in reduced damage to the vehicle in the event of a fire. By staffing a vehicle with characters having improved attributes and skills, vehicle performance is maximized allowing for a more effective performance during game play.

In some embodiments, attributes might not be able to be changed. Qualification 512 may not be changed; for example, a driver may not be retrained as a gunner. A character's Competence attribute 514 refers to their ability to operate a specific vehicle type; for example a specific type of tank such as the M3 Stuart tank. Competence 514 may be changed by retraining the character to operate the same Qualification 512 on a different vehicle. Changing Competence 514 may result in a decreased Training Level 513 in the new vehicle. Additional experience points may be used to raise the Training Level 513 in the new vehicle. A character may eventually be associated with multiple competence attributes—one per vehicle the character has been associated with.

FIG. 5B illustrates a block diagram of an instance 551 of a vehicle object. Object instance 551 has an object class 555 (Vehicle). Instance 551 may acquire one or more attributes 557 from the object class. Attributes 557, when examined, define a state of the instance. In this example, object instance 551 is a Liechttraktor Tank and has attributes associated with tank properties. Exemplary attributes include Name 561, Hit Points 563, Weight/Load limit 564, Engine Power (h.p.) 565, Speed Limit 566, Hull Armor 567, Turret Armor 568, Standard Shell Damage 569, Standard Shell Penetration 570, Rate of Fire 571, Turret Traverse Speed 572, View Range 573, and Signal Range 574. These attributes contribute to the vehicle's effectiveness in combat. Attribute types may also have an attribute value, which determines the effectiveness of the attribute function. For example, the Speed Limit attribute 566 has a value of 46 km/h, which indicates how fast the vehicle can travel. One or more of the attributes, alone or in combination, may be used to assign the vehicle to a subclass. In this example, vehicle 551 may be in a subclass of tanks referred to as "Light Tanks" based on hit points, speed, armor, etc. Other classes of tanks may include medium tanks and heavy tanks, among others. Subclass may be used to quickly identify to a user a general approximation of attributes associated with a vehicle without requiring the user to review each attribute in detail.

Aspects of the disclosure involve providing a user with different views of a virtual world or three-dimensional simulated environment. Aspects of the disclosure also include providing the user with additional information or interactive controls in the different views of the environment and gameplay information.

A player or user can provide input to manipulate or control an object in a virtual world or three-dimensional simulated environment or change views of the virtual world or simulated environment through the input module 404 of video game software 401 which can communicate with a virtual world server 300 such as a virtual environment server 105. The input module 404 can pass the user input to the other modules including the UI module 405 to cause changes in the environment or views to be displayed on a display device in response to the user input. Through manipulation of an object in the environment such as a vehicle or character, the user can interact with the simulated environment and view different portions of the environment. The user can further view the environment through a number of different viewpoints and viewing ranges including a first-person view and a third-person view, and the user can change between different viewing modes and/or viewpoints. For example, if the controlled object is a tank vehicle, the player's point of view may be a first-person view from the viewpoint of a character located in the vehicle or a third-person view from a point a short distance behind the user controlled character or vehicle. The distance for the third-person view from behind the user controlled character or vehicle can vary depending on the terrain and viewing modes. The direction of the player's view of the environment may be controlled together with the direction in which a weapon is aimed. The direction of the player's view of the environment may also be changed independently of the direction of a weapon. The player can further control the character or vehicle independently of the direction of the view such that the forward direction for a player's character or vehicle may be in a direction different than the direction of the view being displayed.

Various examples described throughout this disclosure will be described in terms of a user or player touching or pressing onto a control. Such embodiments may include a device with a touch screen that allows a user or player to press his or her finger (or a stylus or other item that can be detected by a touch sensor of the touch screen) onto the touch screen to provide touch and/or gesture input. When terms such as touch, press, or gesture are used, it can be understood that the computing device is detecting the touch and/or gesture input via one or more touch sensors and/or one or more processors of the computing device. For example, one or more touch sensors may detect a user's touch and provide a signal to the one or more processors representing the touch. The one or more processors may process the signal to determine a location of the touch and/or a direction of the touch. Based on one or more signals received from the touch sensor, the one or more processors may determine that a gesture is being performed by the user (e.g, the user may be swiping or dragging his or her finger across the touch screen). Software, such as the video game application (see e.g., FIG. 4), may have access to the touch and/or gesture input (e.g., via the operating system of the device) and may perform additional processing to interpret the touch and/or gesture input. Some instances may include processing the touch and/or gesture input based on a user interface being displayed to the user and responding to the touch and/or gesture input by updating the user interface and/or controlling an object of the virtual world).

The various examples described throughout this disclosure are not meant to be limited to a touch screen device or a similar device with a touch sensor. Aspects of the disclosure may be used in a device that has a display screen and a different input device, such as a keyboard or mouse.

Figure 6A:
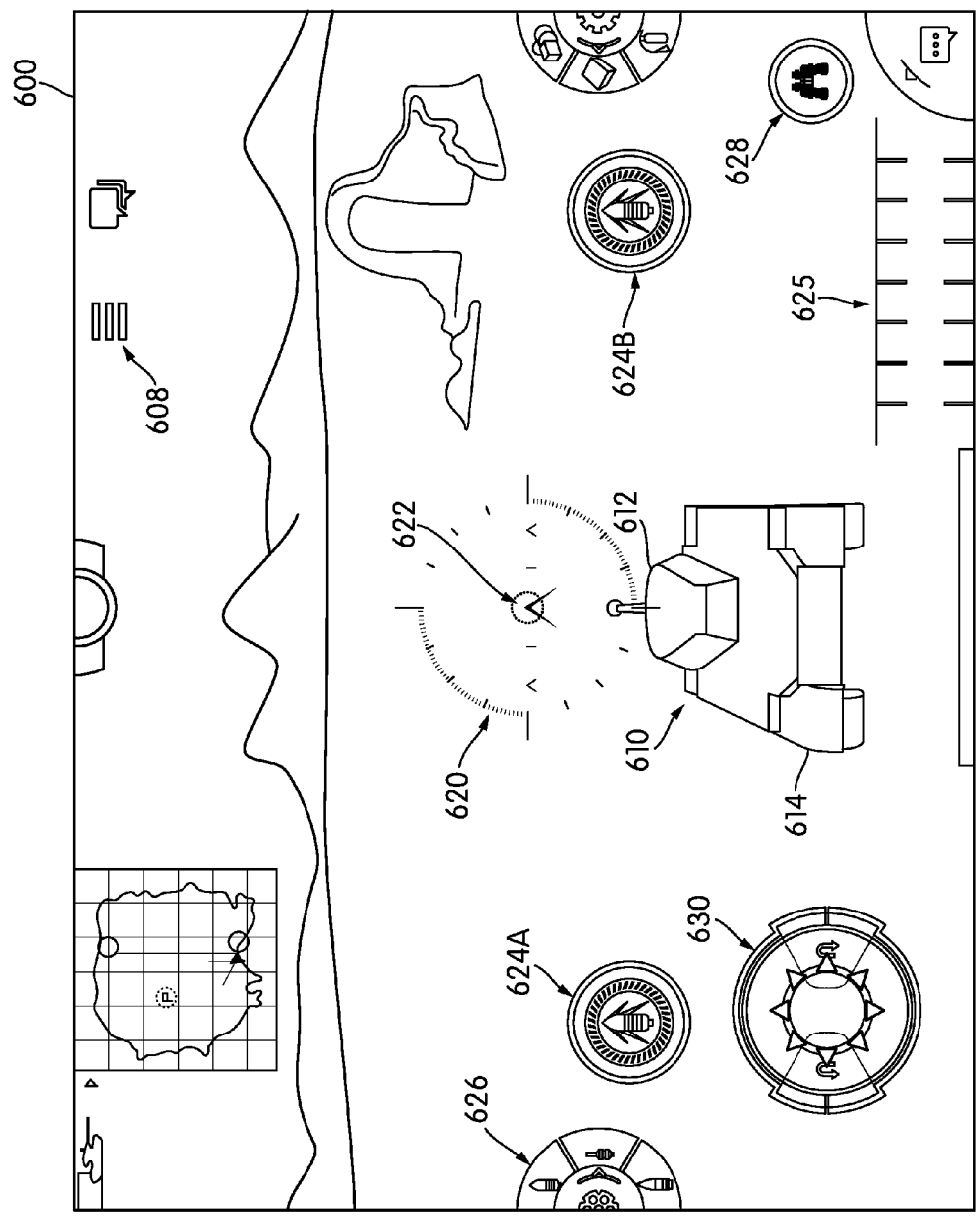
FIGS. 6A and 6B illustrate example screenshots of two embodiments for a video game user interface implementing different aspects of user control.
Figure 6B:
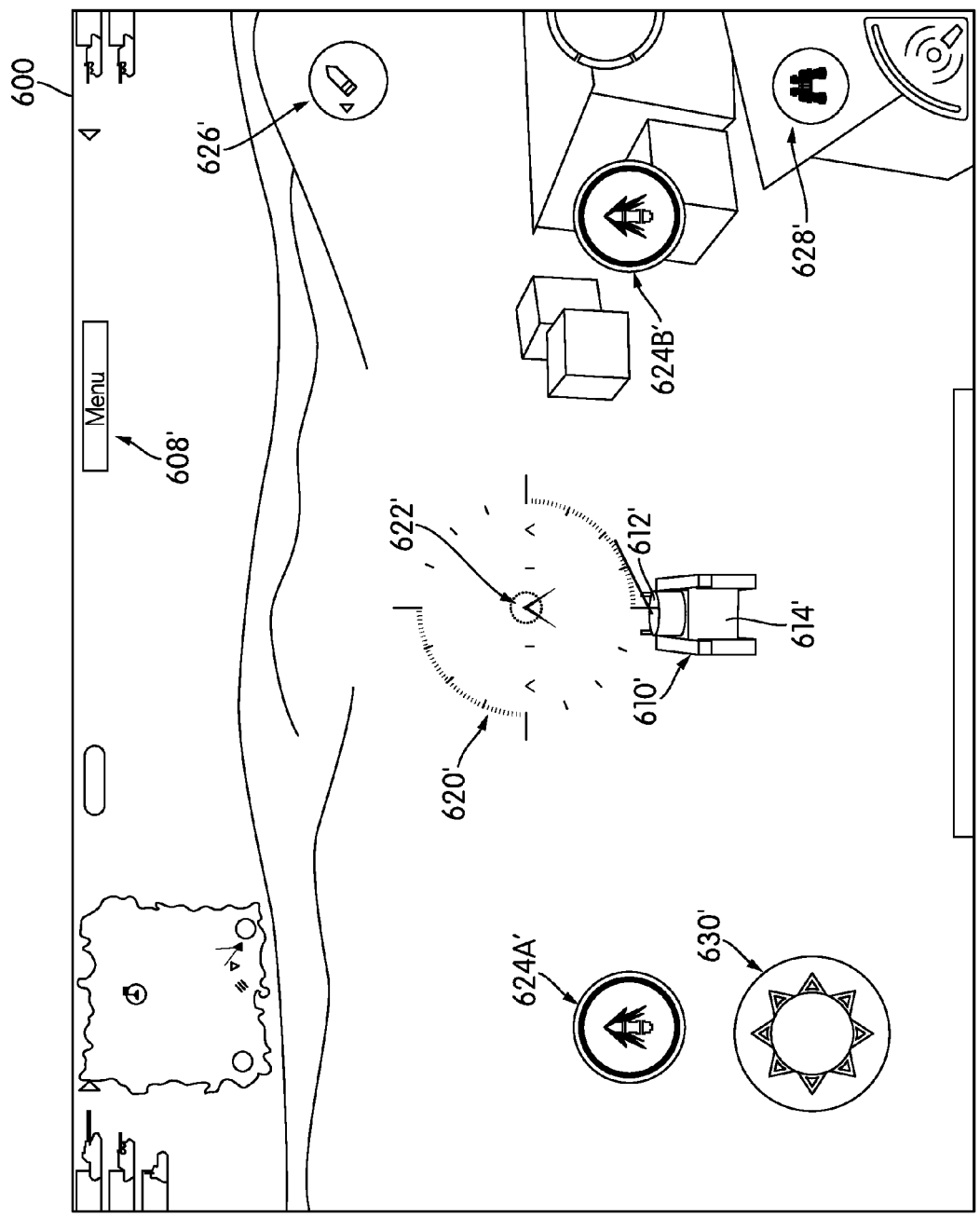

FIGS. 6A and 6B illustrate example screenshots of two embodiments for a video game user interface implementing different aspects of user control. In particular, FIG. 6A illustrates a view of a virtual world 600 and an interface for controlling a vehicle object 610 of the virtual world 600. FIG. 6B illustrates a view of a virtual world 600' and an interface in accordance with an alternative embodiment of the present disclosure.

Referring to FIG. 6A, vehicle object 610 may have independently controllable and movable parts such as a turret 612 and a hull 614. Turret 612 and hull 614 of vehicle object 610 may independently pivot with respect to each other. A second vehicle (not shown) may be located in the environment such as an enemy vehicle. A reticle or sight guide 620, which may be used to assist in targeting and aiming, may be displayed to provide the player with information regarding the direction, distance, and point at which a weapon (e.g., a gun, missile, or other projectile weapon) may be directed. A point of aim 622 may be provided to indicate the specific point at which the weapon is aimed (e.g., the point at which the weapon barrel of turret 612 is pointing).

The user may be able to press on the environment to move the camera angle (also referred herein as an "environmental control"). The user may also be able to use camera control 625 to move the camera angle. In some embodiments, pressing on the environment to move the camera angle may also cause the point of aim 622 (which may be the direction the weapon barrel of turret 612 is currently pointing) to move, for example, such that the point of aim 622 is centered on the reticle 620. However, using camera control 625 may move the camera angle, but the point of aim 622 may remain in its previous position. In this manner, the user may be able to move the camera to view other portions of the virtual world, but have the weapon barrel of turret 612 remain pointing at its current target. In some embodiments, after a user stops pressing on camera control 625, the camera may move back so that the point of aim 622 is at the center of reticle 620. More fully, some embodiments are arranged so that when a user stops pressing on the environment to move the camera, turret 612 may be moved (or continue moving) until point of aim 622 is aligned with the center of the reticle 620, but when a user stops pressing on camera control 625, the camera may move until the center of the reticle 620 is aligned with the point of aim 622. Such an arrangement, for example, may allow for a user to use the environmental control to move the camera when adjusting aim to a target, such as an enemy vehicle, (or to aim at a new target) and to use the camera control 625 when already aiming at a target to view if other targets are around by using camera control 625.

Various other controls may be provided that a player may be able to touch or press to cause particular information to be displayed in the interface (e.g., display a menu) or to cause particular actions to occur in the virtual world 600 (e.g., fire a weapon), such as, for example, fire weapon controls 624A and 624B, ammo select control 626, zoom control 628 (also referred herein as sniper mode control 628), menu control 608, and touch control 630.

Referring to FIG. 6B, which illustrates an alternative embodiment of an interface with respect to virtual world 600', components of the interface that are similar to the embodiment of FIG. 6A have been given a corresponding number. For example, the interface of FIG. 6B includes similar components as vehicle object 610', turret 612' and hull 614'. Also included in the interface of FIG. 6B is reticle 620', point of aim 622', fire weapon controls 624A' and 624B', ammo select control 626', zoom control 628', and menu control 608'. The interface of FIG. 6B illustrates a number of different graphical overlays from the interface of FIG. 6A. For example, touch control 630 of FIG. 6A includes a graphical overlay different than touch control 630' of FIG. 6B.

Figure 7:
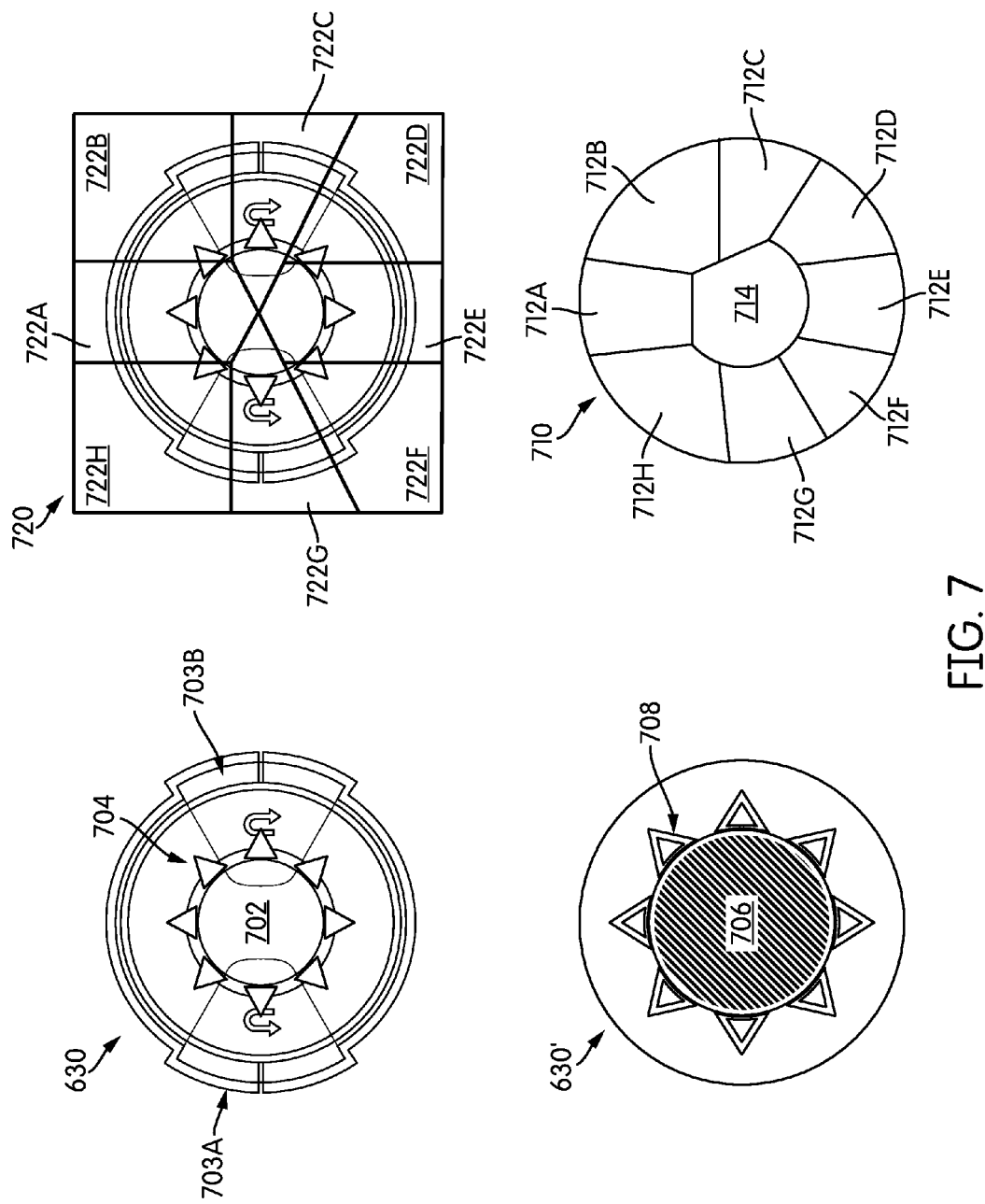
FIG. 7 illustrates example diagrams of touch zones for controlling an object of a virtual world in accordance with embodiments of a touch control and other aspects described herein.

FIG. 7 illustrates example diagrams of touch zones for controlling an object of a virtual world in accordance with embodiments of the touch control described herein. The example touch zones depicted in FIG. 7 can be used with either touch control 630, touch control 630', or other variations of touch controls. In addition to the example touch zones depicted in FIG. 7, FIG. 7 also provides a close up view of touch control 630 and touch control 630', each of which may be operated by a player in a manner similar to an analog stick on a game pad.

As illustrated, touch control 630' includes a touch pad 706 that the user may press and drag in a particular direction. Touch control 630' may include a number of direction indicators 708 (as illustrated, touch control 630' includes eight direction indicators 708). Each direction indicator 708 may represent the various touch zones that form a basis of the touch control's functionality and each direction indicator 708 may represent a direction in which the object may be controlled. For example, if a user pressed on touch pad 706 and drags touch pad 706 up towards the top of touch control 630' (e.g., in the direction of the top direction indicator), a controlled vehicle may move forward.

As illustrated, touch control 630 includes a touch pad 702 that the user may press and drag in a particular direction (which may be functionally similar to touch pad 706). Touch control 630 may include a number of direction indicators 704 (which may be functionally similar to direction indicators 708). Touch control may also include turning zone indicators 703A and 703B, which provide a visual indication to the user where the touch pad 702 can be moved to turn or pivot the controlled vehicle.

In various arrangements, the area of the turning zone indicators 703A and 703B may or may not match with the area of an underlying touch zone. For example, comparing the area of turning zone indicator 703A to the area of touch zone 712G of touch zone arrangement 710, it can be seen that the turning zone indicator 703A does not match or align with touch zone 712G. In an alternative embodiment, however, the turning zone indicators 703A and 703 may match or align with the underlying touch zones (not shown). Additionally, if turning zone indicators 703A and 703B both matched or aligned with their respective underlying touch zone (e.g., the underlying touch zones matched the area of indicators 703A and 703B), the touch zones may be arranged to be symmetrical or mirror images of each other.

Some embodiments that have turning zone indicators misaligned with the respective touch zones may include symmetrical or mirror image touch zones. Touch zone arrangement 720 of FIG. 7 illustrates an embodiment having touch zones that are symmetrical with or mirror images of each other, but are misaligned with turning zone indicators of the graphical overlay. Alternative and additional details on various touch zone arrangements that can be used will be discussed below.

Further details as to how a controlled vehicle is controlled (e.g., moved) in response to a player moving a touch pad, such as those depicted by touch pad 702 and 706, will be discussed below. Moreover, in the examples described throughout this disclosure, embodiments of the touch control will be discussed in terms of a particular touch zone arrangement (e.g., touch zone arrangement 710). While many of the examples herein may be discussed in terms of touch zone arrangement 710, this is done for simplicity. Many aspects described herein could be performed using touch zone arrangement 720 (or a different variation of arrangement 720 or 710) instead of arrangement 710. Additionally, while many of the examples herein will be discussed in terms of controlling a hull of a vehicle, a similar touch control could be used to cause another part of the controlled vehicle to move. For example, a touch control arranged similar to those depicted in FIG. 7, could be used to control the turret 612 of vehicle object 610, such as by allowing a player to rotate the turret 612 in a direction determined by the direction a player moves touch pad 702.

Many of the examples discussed herein will allow a user to control the hull of the vehicle (e.g., hull 614 of vehicle object 610) by interacting with the touch pad of the touch control. For example, a player may move touch pad 702 in a particular direction such that the tracks of a controlled tank are caused to move in particular directions (e.g., to move the hull of the tank forward or backward; to move the tracks of the tank in the same direction as each other, but at different speeds, such that the hull of the tank turns clockwise or counter-clockwise while moving forward or backward; to move the tracks of the tank in the opposite directions from each other to perform a pivot-turn where the tank turns clockwise or counter-clockwise while not moving forward or backward).

A sample touch zone arrangement 710 is illustrated in FIG. 7 and defines the zones in which a player may press to control the vehicle (e.g., cause the vehicle to move in different directions and/or velocities). The number and arrangement of the direction indicators 704 on touch control 630 may depend on the touch zones defined for touch control 630. As illustrated, there are eight direction indicators 704 for touch control 630 and there are eight different touch zones: 712A-710H. The touch zones 712A-712H may be of different shapes and sizes.

In some arrangements, the shape of a touch zone may depend on how a player is likely to press and move his or her finger while interacting with the device displaying the virtual world. For example, touch zone arrangement 710 may be an arrangement used when touch control 630 is in the left side of a display screen (see, e.g., FIGS. 6A and 6B). When in the left side of a display, a player is likely to interact with touch zone 630 using the thumb of the left hand. A player may be able to easily move his or her left thumb horizontally from the center of touch zone 630 to the right (e.g., in the direction of touch zone 712C), but it may be more difficult to move horizontally from the center of touch zone 630 to the left (e.g., in the direction of touch zone 712G). Accordingly, touch zones may be shaped and arranged to accommodate that physical movement (or others). As one particular example, touch zone 712C and touch zone 712G are of different shapes with the top edge of touch zone 712C being horizontal while the top edge of touch zone 712G is not horizontal (and instead is angled downwards).

Such an arrangement may accommodate the difference in moving the left thumb to the right or to the left.

As illustrated in FIG. 7, touch zone arrangement 710 may also include a dead zone 714 in which a player's presses or touches does not cause the controlled vehicle to move. In some embodiments, the dead zone 714 may be a circle (not shown) or other geometric shape. The dead zone 714 may be shaped asymmetrically and/or differently with respect to one or more of touch zones 712A-712H (as shown) or with respect to one or more directions that the dead zone extends in.

The arrangement of touch and/or dead zones for a touch control may be dynamic based on the conditions of the virtual world or based on input received from a player (e.g., a player's interaction with the user interface). In other words, the arrangement of touch and/or dead zones may be adjusted or changed in response to occurrence of a particular action in a virtual world or in response to particular input being received from a player.

Figure 8:
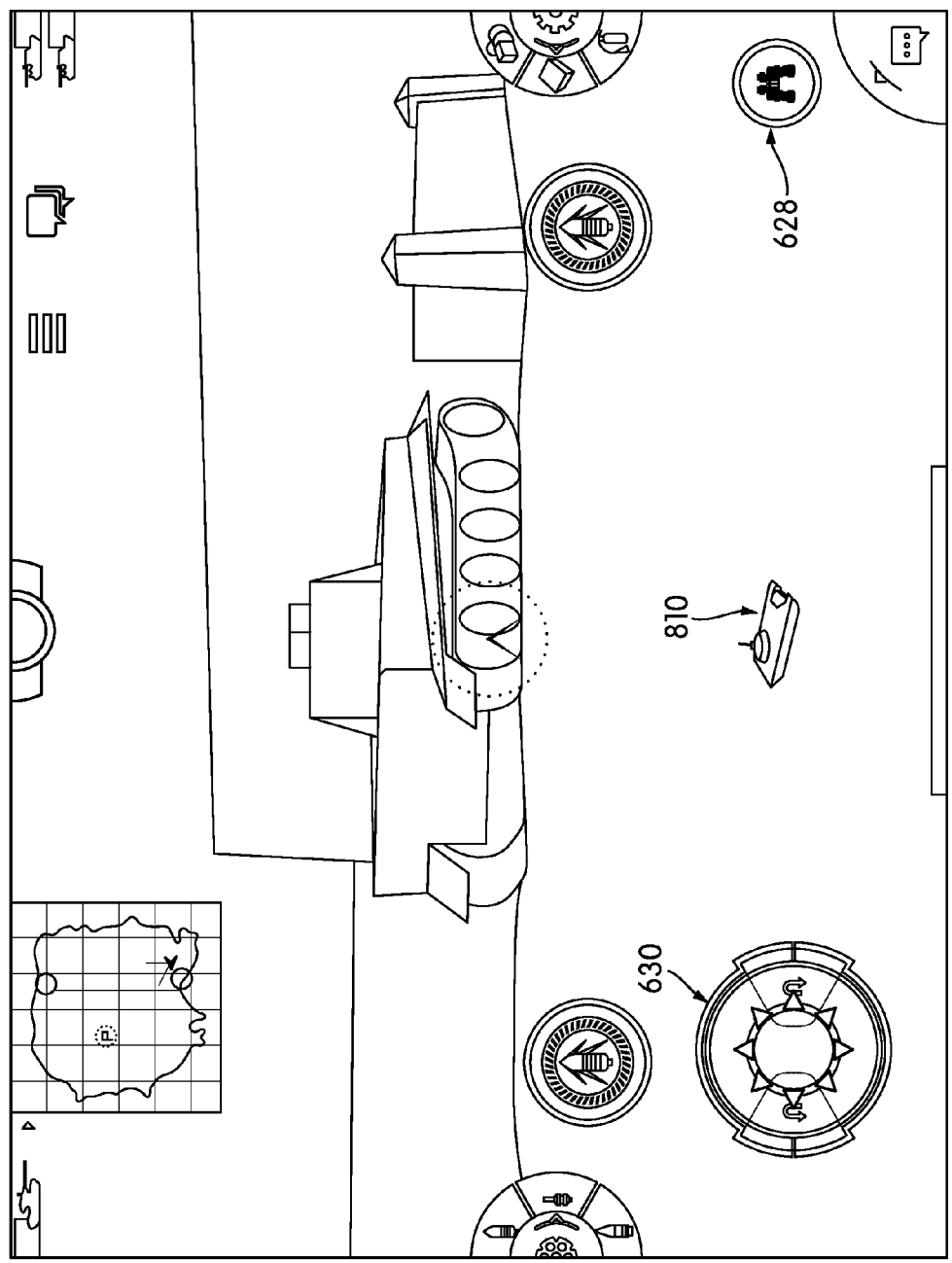
FIG. 8 illustrates an example screenshot of a video game user interface providing a zoom or sniper mode for viewing the virtual world in accordance with various aspects described herein.

For example, some embodiments may adjust or change touch zones of a touch control based on which viewing mode is active. A virtual world may have different viewing modes that, in some embodiments, may be selectable by a player (e.g., FIG. 6A illustrates a video game interface for a first viewing mode and pressing zoom control 628 may change the video game interface into a second view mode). FIG. 8 illustrates a video game interface for another viewing mode. In particular, FIG. 8 illustrates an example screenshot of a video game user interface providing a zoom or sniper mode for viewing the virtual world. The zoom or sniper mode may be presented in response to a player pressing zoom control 628 when the zoom or sniper mode is inactive. The zoom or sniper mode may be exited or closed by pressing zoom control 628 when the zoom or sniper mode is active.

Some aspects of the interface when in the zoom or sniper mode are different from the interface illustrated in FIG. 6A. For example, while in the zoom or sniper mode, the player may be presented with a more detailed or magnified view of a selected area of the virtual world. In some instances, the zoom or sniper mode may increase the ease of aiming and accuracy as compared to other modes of viewing the virtual world. Some aspects of the interface when in the zoom or sniper mode are similar to or the same as the user interface illustrated in FIG. 6A. For example, the user interface may include one or more of the same controls as the user interface illustrated in FIG. 6, including, touch control 630 and zoom control 628. Additional aspects of the snipe mode, including some aspects related to vehicle indicator 810 will be discussed below.

Figure 9:
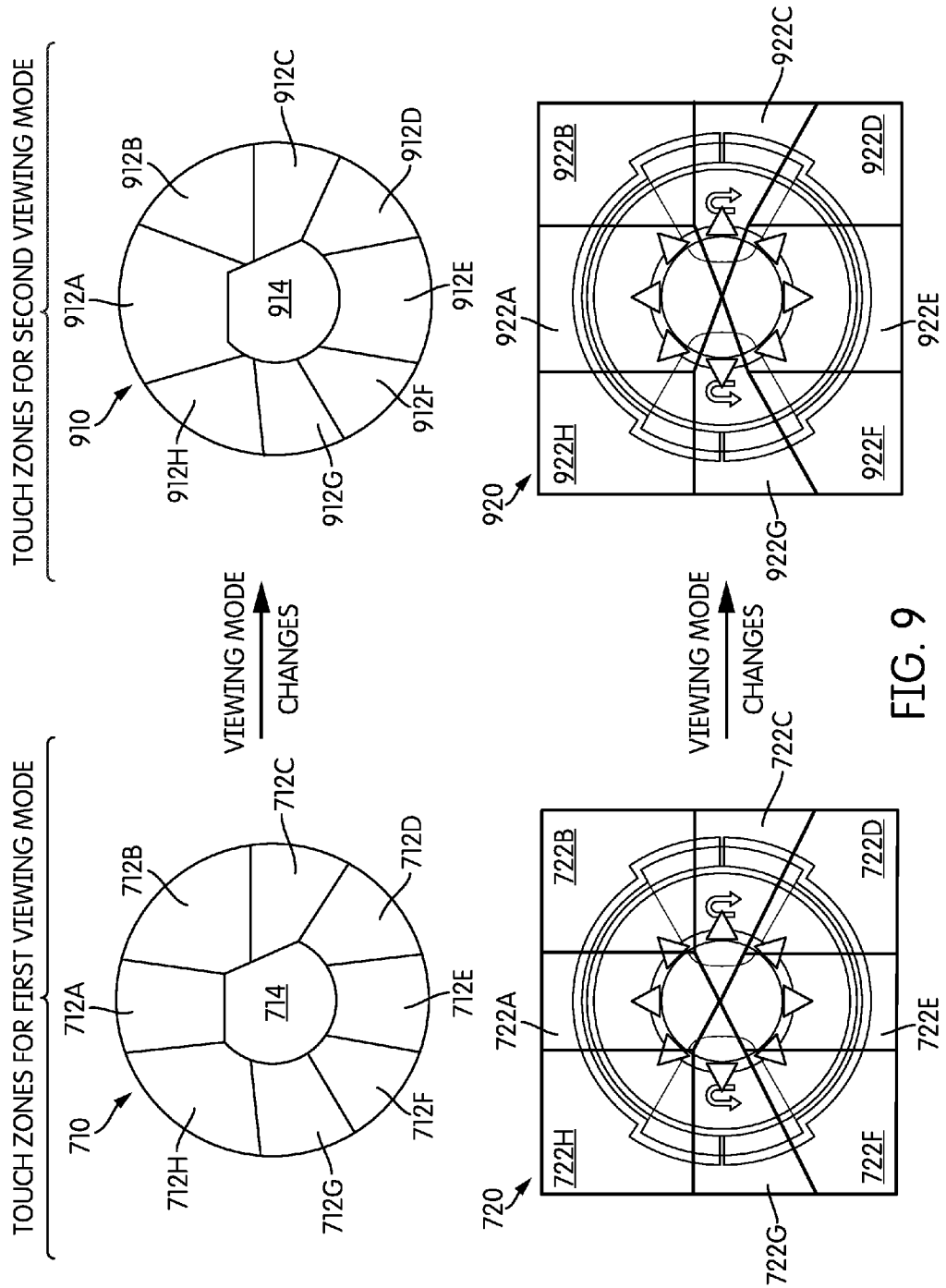
FIG. 9 illustrates example diagrams depicting touch zones for a touch control being adjusted or changed based on switching viewing modes in accordance with one or more aspects described herein.

FIG. 9 illustrates example diagrams depicting touch zones for a touch control being adjusted or changed based on switching viewing modes. In particular, FIG. 9 illustrates an example in which the touch zones of touch control 630 may be changed when switching from a first viewing mode, such as the one illustrated in FIG. 6A, to a second viewing mode, such as the one illustrated in FIG. 8. FIG. 9 also illustrates an example in which the touch zones of touch control 720 may be changed when switching from a first viewing mode, such as the one illustrated in FIG. 6A, to a second viewing mode, such as the one illustrated in FIG. 8

When in the first viewing mode, touch zone arrangement 710 may be used by the touch control (e.g., touch control 630). However, when the viewing mode changes (e.g., by the user pressing zoom control 628), the second viewing mode may be activated and touch zone arrangement 910 may be used by the touch control when in the second viewing mode. The change from touch zone arrangement 710 to touch zone arrangement 910 may be performed without the user being aware of the change. Touch zone arrangement 910 may include touch zones 912A-912H and dead zone 914. Compared to zones 712A-712H of touch zone arrangement 710, the size and/or arrangement of zones 912A-912H may be different. For example, touch zone 912A and 912E may be larger than corresponding zones 712A and 712E of touch zone arrangement 710. As also illustrated in FIG. 9, the touch zones of touch control 720 may be changed or adjusted based on a change in view mode.

In some arrangements, increasing the size of a touch zone when in the second mode may lower a player's error rate. For example, when in the zoom or sniper mode illustrated in FIG. 8, a player is more likely to want to keep aiming in a similar direction (or at the same target) when in the zoom mode. Thus, a player is more likely to desire to move the vehicle forward or reverse when in the zoom mode as compared to the other available directions in order to maintain vehicle orientation and keep aiming in a similar direction. Accordingly, the size of touch zone 712A and 712E of touch zone arrangement 710 are increased, resulting in touch zones 912A and 912E. Such an increase may result in lowering occurrences of player error in moving the vehicle in the forward or reverse direction.

The shape and size of the dead zone may be adjusted based on various conditions of the virtual world or based on certain player input (e.g., a player's interaction with the user interface). For example, with respect to if the player moves touch pad 712 in a particular direction (e.g., towards and into touch zone 712A), the dead zone 714 may adjust by, for example, decrease to cause the touch zone in that particular direction increase (e.g., increase the size of touch zone 712A) into a portion previously assigned to the dead zone.

The change in touch zones for touch control 720 that is illustrated in FIG. 9 also depicts an increase in the size of touch zones 722A and 722E (compare 722A to 922A and compare 922E to 722E). Various zones may also decrease in size based on the change in viewing mode. For example, Touch zones 722G and 722C are also depicted as decreasing in size based on the change in viewing mode. Touch zones 722B, 722D, 722F and 722H are also shown as decreasing in size (see resulting zones 922B, 922D, 922F and 922H, respectively). Additionally, by inspecting FIG. 9 to identify where zones 722B, 722C, 722D, 722F, 722G and 722H were decreased in size by the change in viewing mode, it can be seen that the decrease in size may correspond to the increase in size of zones 722A and 722E. For example, the expansion of 922A and 922E towards the center of the touch control caused a first portion of zone 922C to decrease in size but, because zones 922H and 922F did not increase in size, a second portion of zone 922G was unaffected by the zone change.

Figure 10:
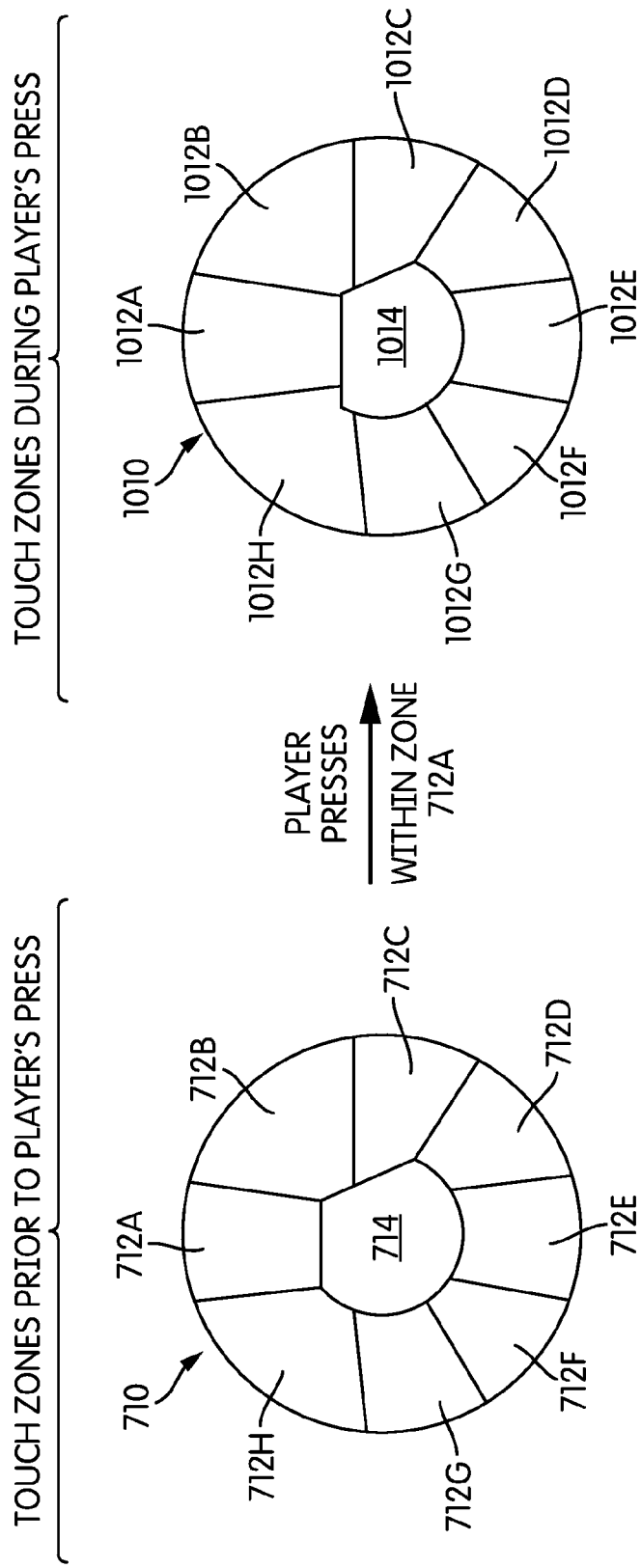
FIG. 10 illustrates an example diagram depicting touch zones of a touch control being adjusted or changed based on a player pressing the touch control, in accordance with various aspects described herein.

FIG. 10 illustrates an example diagram depicting touch zones for a touch control being adjusted or changed based on a player pressing the touch control. As illustrated by FIG. 10, prior to a player pressing within touch zone 712A, touch zone arrangement 710 may be used. However, when the user presses within touch zone 712A, touch zone arrangement 1010 may be used, which includes touch zones 1012A-1012H. The change from touch zone arrangement 710 to touch zone arrangement 1010 may be performed without the user being aware of the change. As compared to touch zone 712A, touch zone 1012A may be of an increased size to allow a player to have more precise movements within touch zone 1012A (the shapes of the zones have also changed in the illustrated example). Touch zone arrangement 1010 may be used, for example, while the player continues to touch within touch zone 1012A. When the user enters or presses within another touch zone (e.g., any of zones 1012B-1012H), enters the dead zone 1014, or otherwise stops pressing within touch zone 1012A, the touch zone arrangement being used may change again. In some embodiments, the touch control may change from using touch control arrangement 1014 and back to touch control arrangement 710 when the player enters or presses within another touch zone, enters the dead zone, or otherwise stops pressing within touch zone 1012A.

Figure 11A:
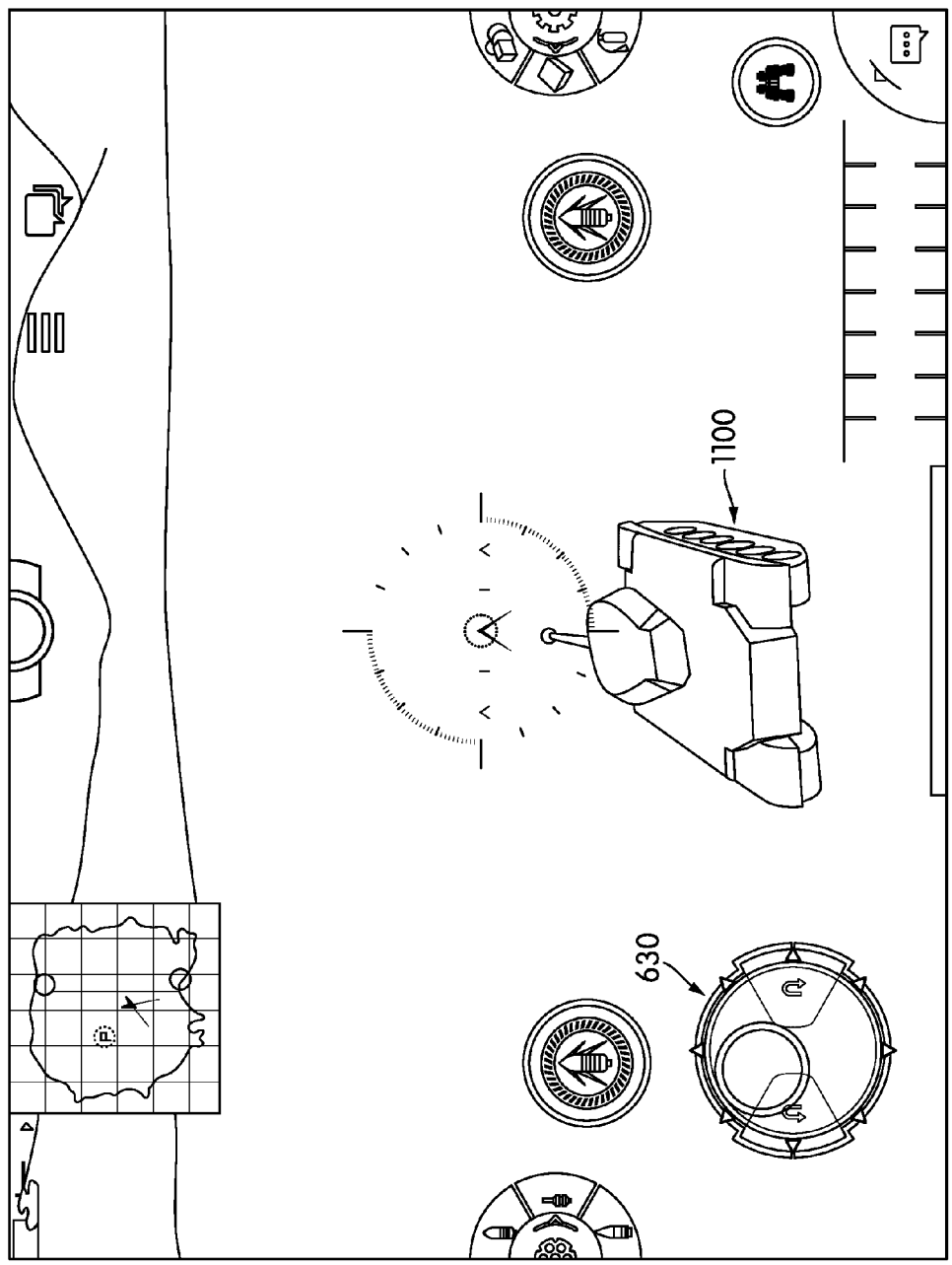
FIGS. 11A-11O illustrate example screenshots of a video game user interface implementing different aspects of user control in accordance with one or more aspects described herein.

As the player experiences the virtual world such as, for example, by controlling the vehicle to different locations within the virtual world, the user interface and/or virtual world may provide the player with different visual cues to indicate how the vehicle is being controlled. FIGS. 11A-11N illustrate example screenshots of a video game user interface implementing different aspects of user control in accordance with one or more aspects described herein, and each screenshot depicts one or more visual indications related to user control of a vehicle or object. While the user interfaces depicted in FIGS. 11A-11N may include some common elements as the interfaces depicted in other figures, such as FIG. 6 and FIG. 8, and/or some different elements, the following discussion of FIGS. 11A-11N will highlight one or more visual cues or indicators present in each Figure and describe various aspects related to user control of the vehicle in the virtual world. In particular, each of FIGS. 11A-11N includes touch control 630, which is used in these examples to control the hull of the vehicle. While the below examples will describe specific manners in which a vehicle is controlled in certain directions (e.g., move forward, move reverse, turn clockwise, turn counterclockwise, etc.), some embodiments of touch control 630 may control the vehicle to move in those directions in other or additional manners.

FIG. 11A illustrates a screenshot in which touch control 630 is being pressed, but is within a dead zone of touch control 630's touch arrangement (e.g., the user presses and moves touch pad 702 within dead zone 714 of FIG. 7, or touches within dead zone 714 of FIG. 7). When in a dead zone, the vehicle 1100 being controlled may be stationary and, therefore, the user interface may not need to show any additional visual indicator as to the vehicle's movement.

Figure 11B:
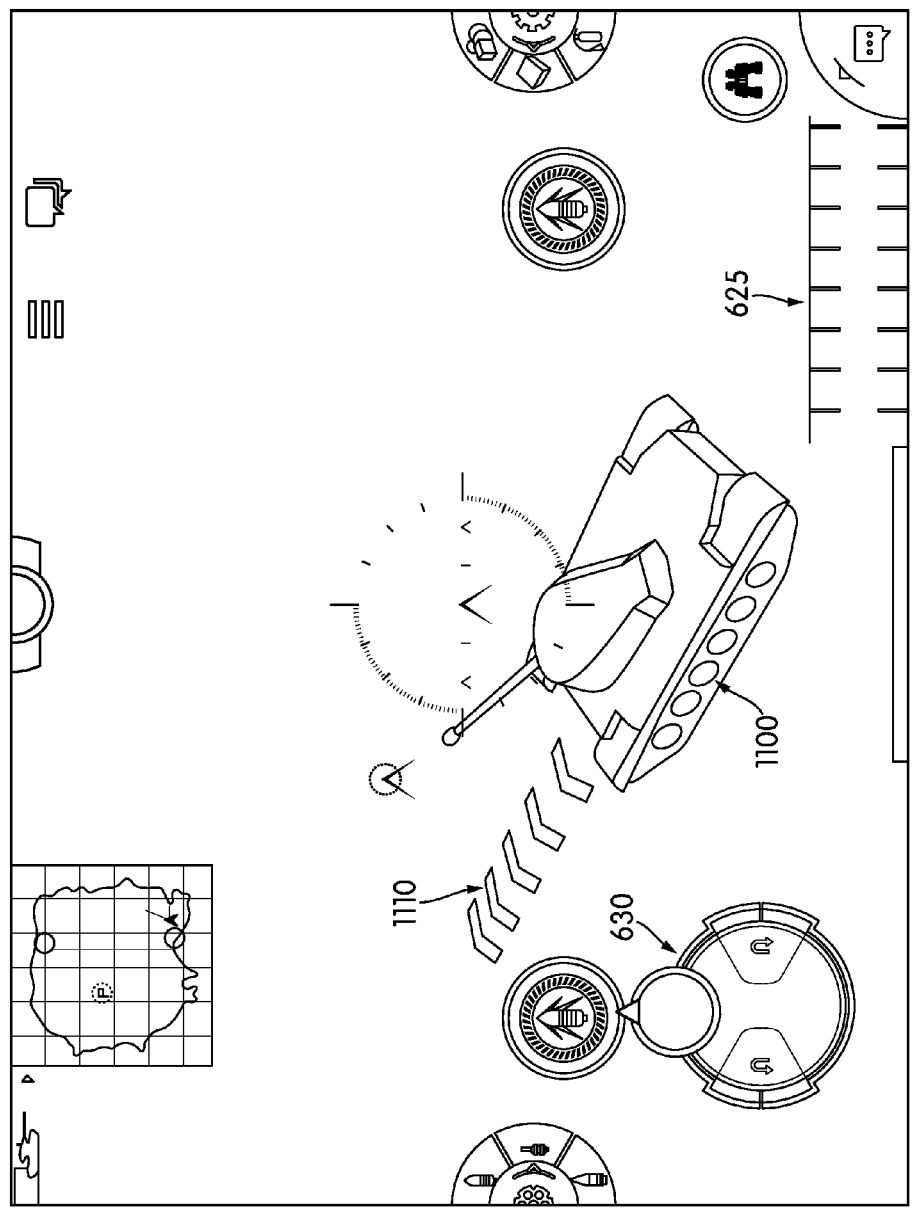

FIG. 11B illustrates a screenshot in which touch control 630 is being pressed and is controlling the vehicle to move forward (e.g., the user presses and moves touch pad 702 to and/or within touch zone 712A of FIG. 7, or touches within touch zone 712A of FIG. 7). When moving forward, a visual indicator 1110 may be displayed to indicate that the hull of the vehicle 1100 is moving forward.

FIG. 11B also illustrates an example where a user may be using camera control 625 to move the camera but keep the weapon pointed at its current position.

Figure 11C:
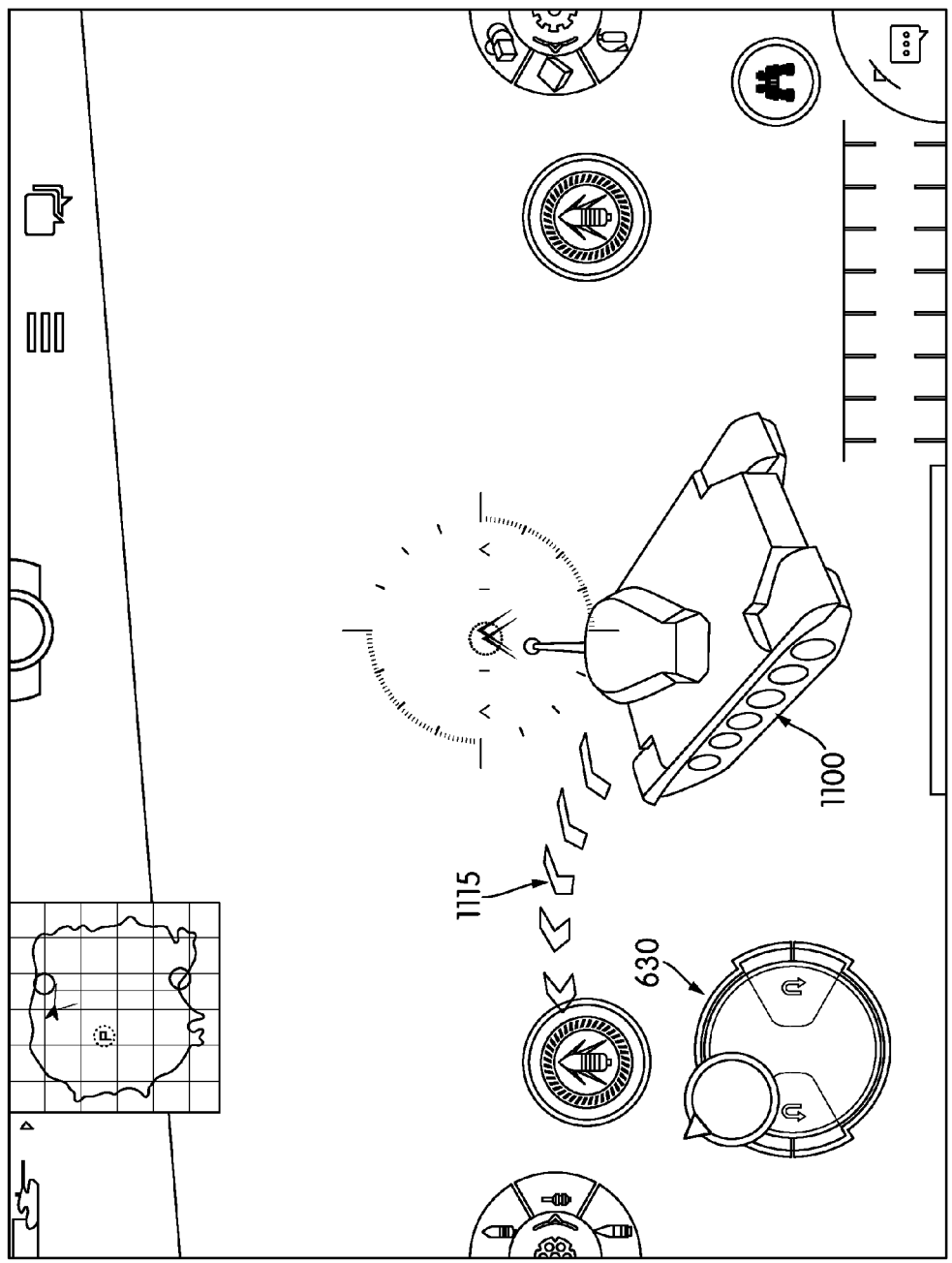

FIG. 11C illustrates a screenshot in which touch control 630 is being pressed and is controlling the vehicle to move forward and turn counterclockwise (e.g., the user presses and moves touch pad 702 of FIG. 7 to and/or within touch zone 712H from touch zone 712A or from the dead zone 714; or touches within touch zone 712H of FIG. 7). When moving forward and turning counterclockwise, a visual indicator 1115 may be displayed to indicate that the hull of the vehicle 1100 is moving forward and turning counterclockwise.

As illustrated by comparing the views depicted in FIG. 11A with those of FIG. 11B and FIG. 11C (and other Figures), the turret of the controlled vehicle 1100 may be controlled independently from the hull. The turret (if present) of the vehicle 1100 may be controlled using a different method or type of user control. For example, for some tank vehicles, the turret can be pivoted independently of the hull of the tank with the player's view following the direction of the turret or the direction of the turret following the player's view. If touch control 630 is used to control the hull of the vehicle 1100, the player may press and drag on another portion of the screen to change his or her view of the virtual world, which also controls the orientation of the turret. As discussed herein, the direction of a player's view (as defined by a virtual camera, which may be moved via an environmental control, camera control 625, and/or one or more automated processes that result from other user interactions) can be changed independently of the direction in which a vehicle or other object may travel, so the direction of the player's view may not necessarily be from the front or rear of the vehicle.

Figure 11D:
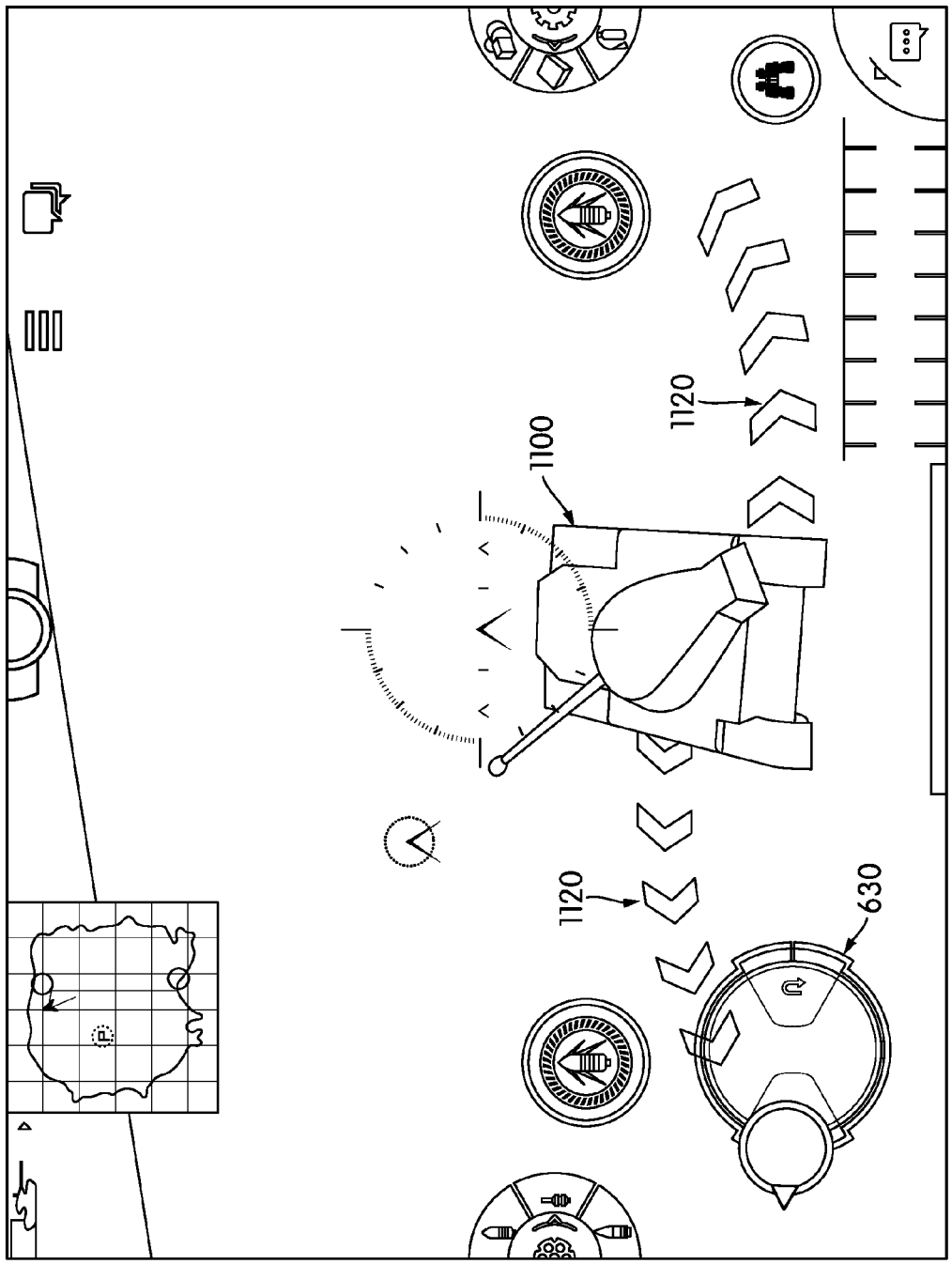

FIG. 11D illustrates a screenshot in which touch control 630 is being pressed and is controlling the vehicle to turn, pivot or otherwise rotate counterclockwise (e.g., the user presses and moves touch pad 702 of FIG. 7 to and/or within touch zone 712G from touch zone 712H or from the dead zone 714; or touches within touch zone 712G of FIG. 7). When turning counterclockwise or performing a pivot turn in the counterclockwise direction, a visual indicator 1120 may be displayed to indicate that the hull of the vehicle 1100 is turning counterclockwise or performing a pivot turn in the counterclockwise direction.

Figure 11E:
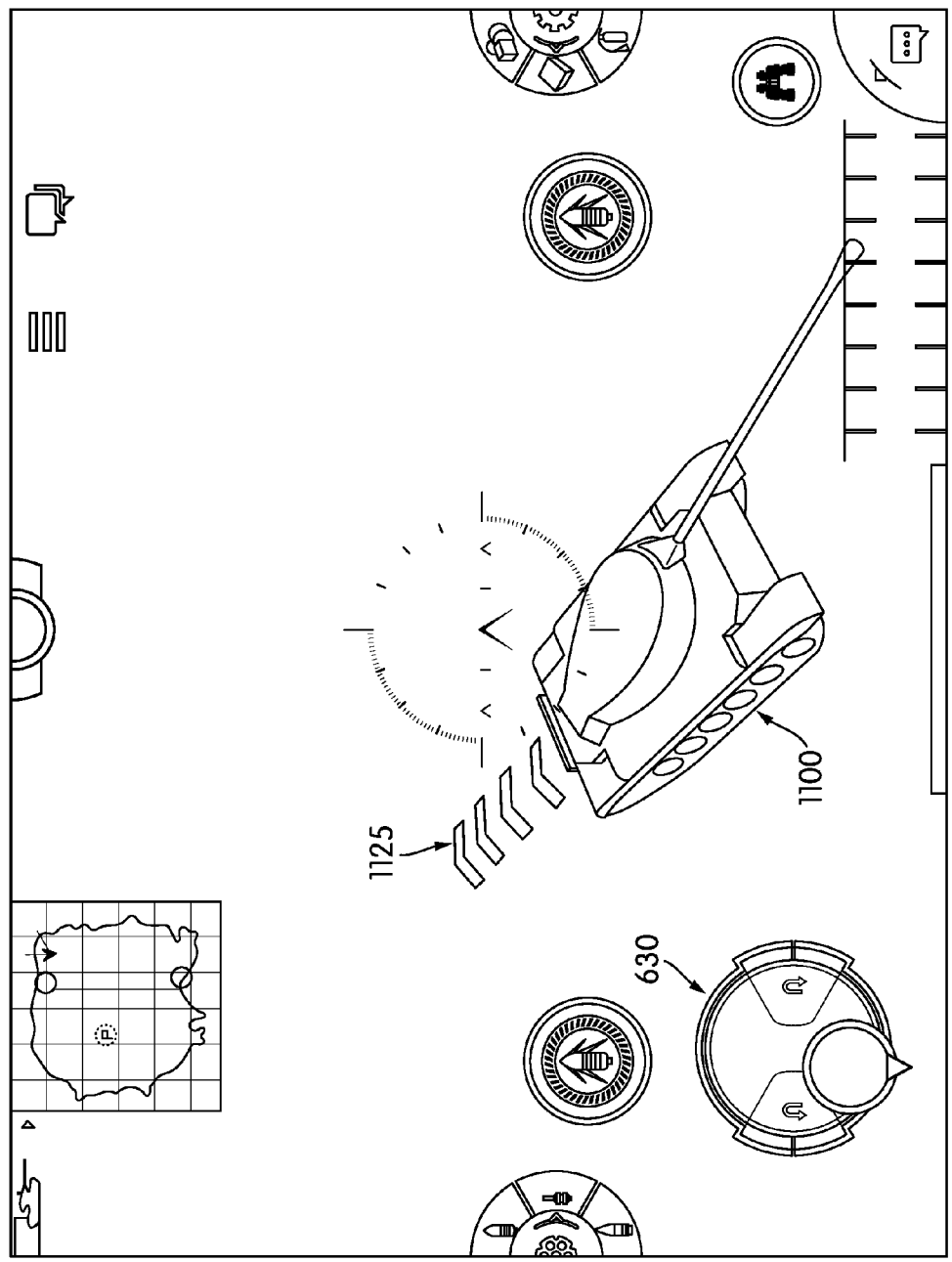

FIG. 11E illustrates a screenshot in which touch control 630 is being pressed and is controlling the vehicle to move in reverse (e.g., the user presses and moves touch pad 702 of FIG. 7 to and/or within touch zone 712E from dead zone 714, or touches within touch zone 712E of FIG. 7). When moving in reverse, a visual indicator 1125 may be displayed to indicate that the hull of the vehicle 1100 is moving in reverse.

Figure 11F:
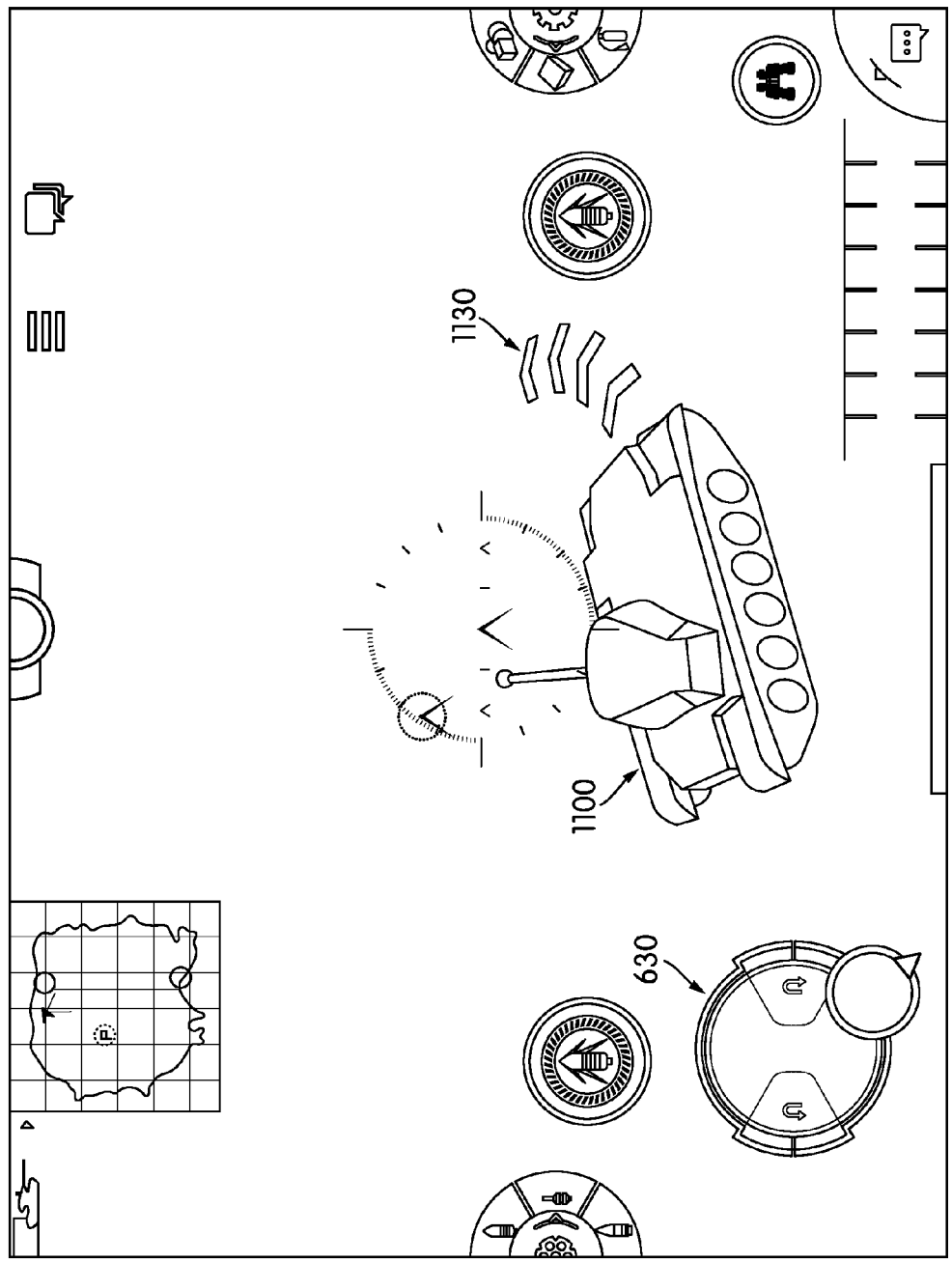

FIG. 11F illustrates a screenshot in which touch control 630 is being pressed and is controlling the vehicle to move in reverse and turn counterclockwise (e.g., the user presses and moves touch pad 702 of FIG. 7 to and/or within touch zone 712D from dead zone 714 or from touch zone 712E of FIG. 7; or touches within touch zone 712D of FIG. 7). When moving in reverse and turning counterclockwise, a visual indicator 1130 may be displayed to indicate that the hull of the vehicle 1100 is moving in reverse and turning counterclockwise.

Figure 11G:
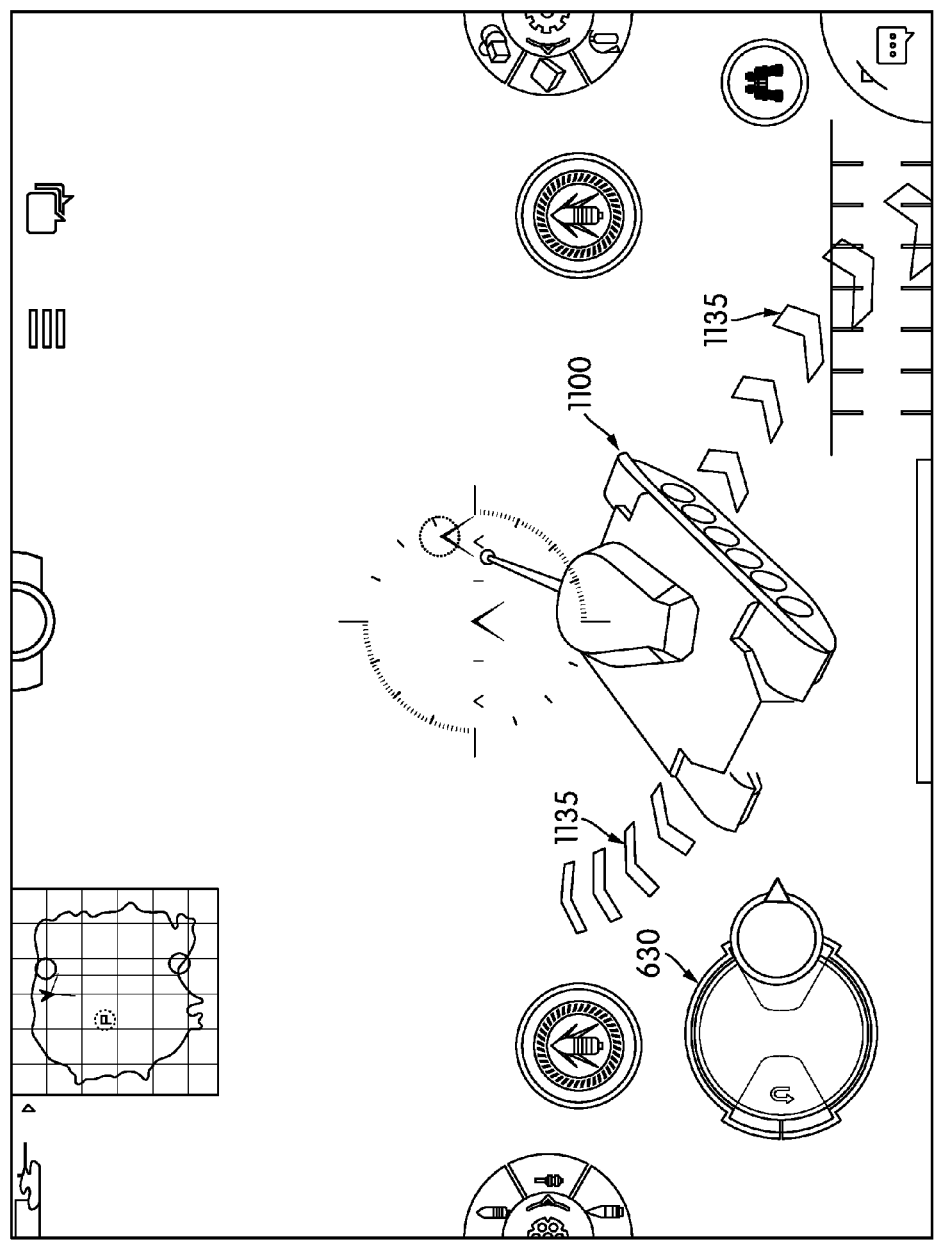

FIG. 11G illustrates a screenshot in which touch control 630 is being pressed and is controlling the vehicle to turn or rotate clockwise (e.g., the user presses and moves touch pad 702 of FIG. 7 to and/or within touch zone 712C from touch zone 712B or from the dead zone 714; or touches within touch zone 712C of FIG. 7). When turning clockwise or performing a pivot turn in the clockwise direction, a visual indicator 1135 may be displayed to indicate that the hull of the vehicle 1100 is turning clockwise or performing a pivot turn in the clockwise direction.

Figure 11H:
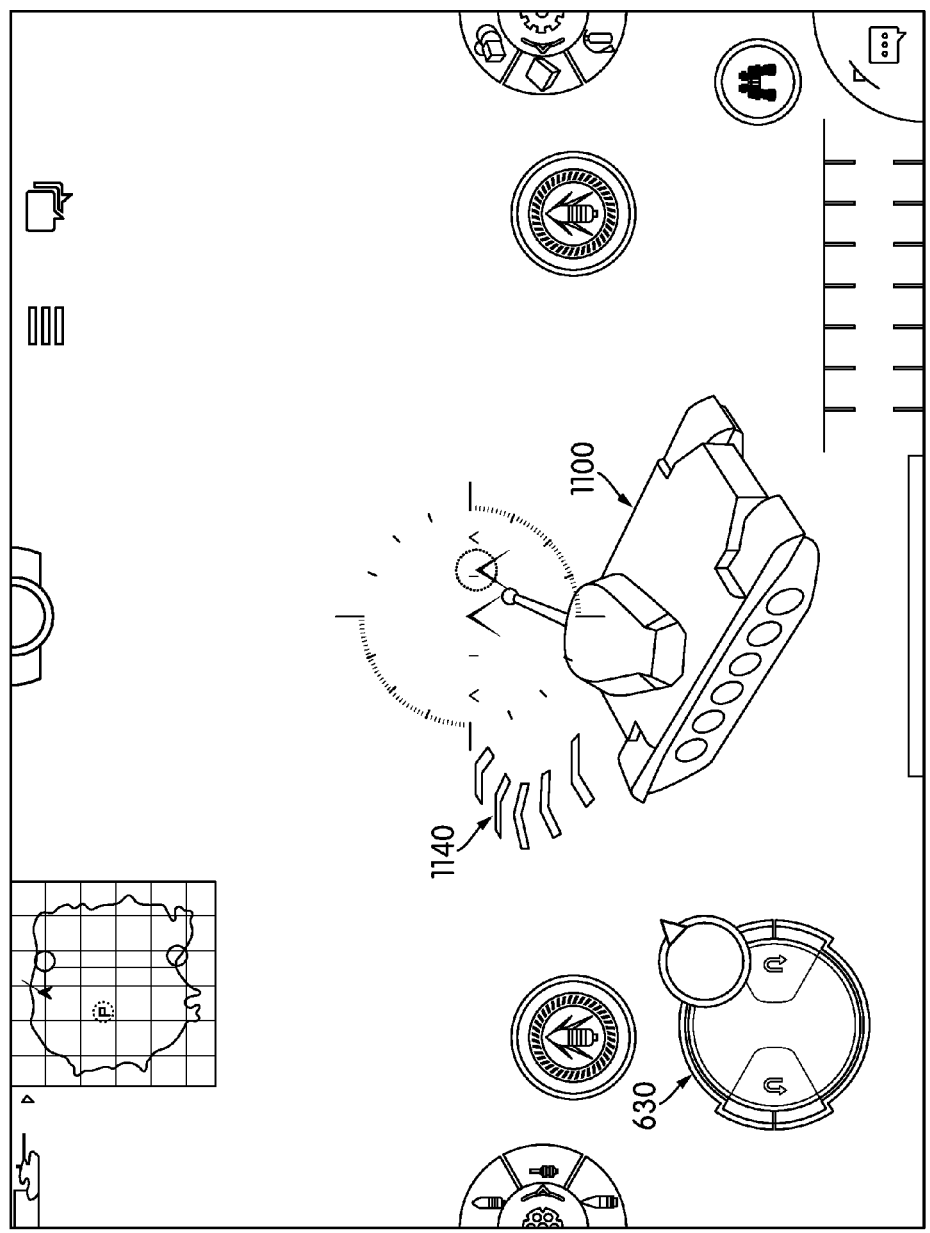

FIG. 11H illustrates a screenshot in which touch control 630 is being pressed and is controlling the vehicle to move forward and turn clockwise (e.g., the user presses and moves touch pad 702 of FIG. 7 to and/or within touch zone 712B from dead zone 714 or from touch zone 712A of FIG. 7; or touches within touch zone 712B of FIG. 7). When moving forward and turning clockwise, a visual indicator 1140 may be displayed to indicate that the hull of the vehicle 1100 is moving forward and turning clockwise.

Figure 11I:
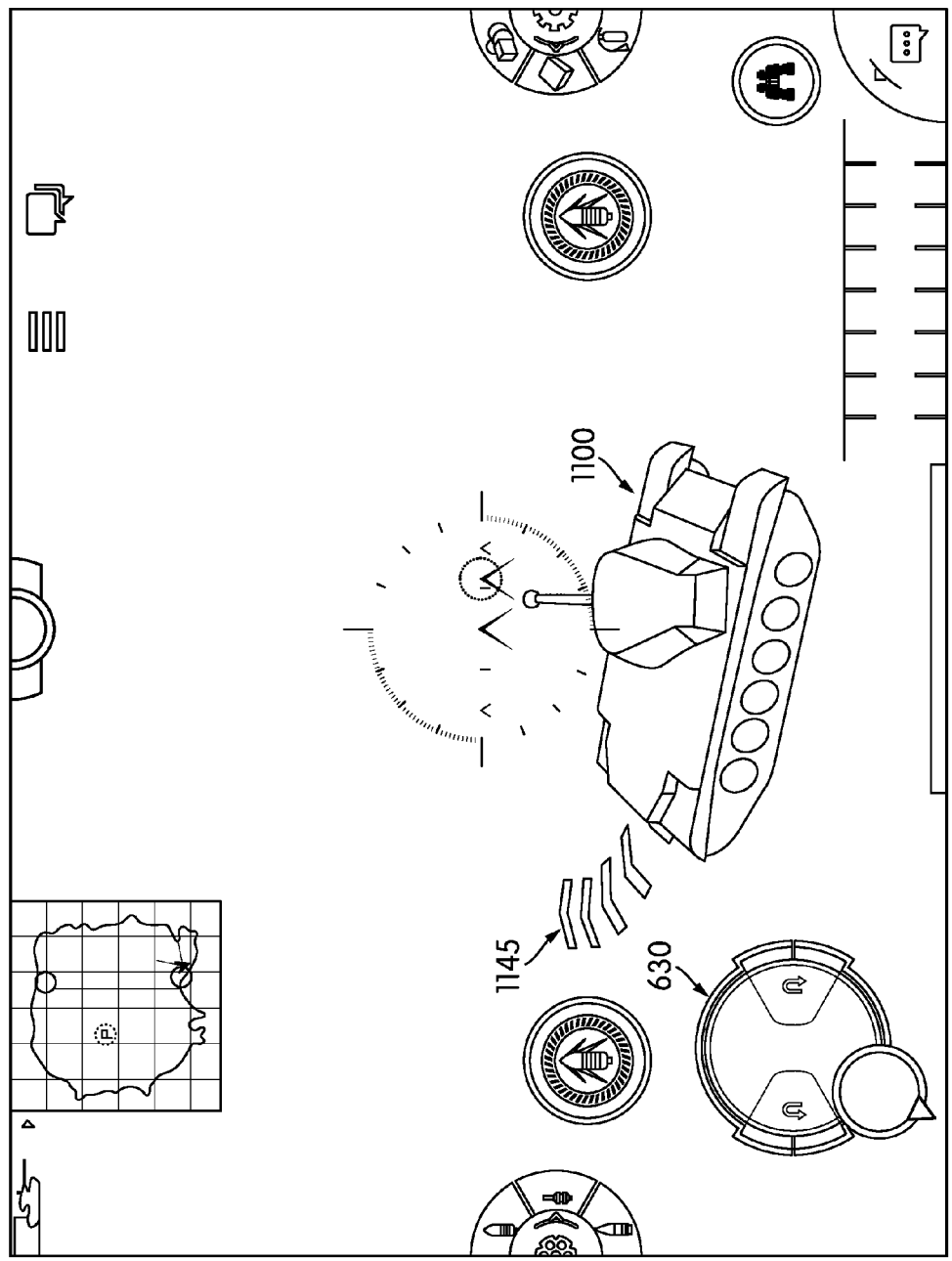

FIG. 11I illustrates a screenshot in which touch control 630 is being pressed and is controlling the vehicle to move in reverse and turn clockwise (e.g., the user presses and moves touch pad 702 of FIG. 7 to and/or within touch zone 712F from dead zone 714 or from touch zone 712E of FIG. 7; or touches within touch zone 712F of FIG. 7). When moving in reverse and turning clockwise, a visual indicator 1145 may be displayed to indicate that the hull of the vehicle 1100 is moving in reverse and turning clockwise.

Figure 11J:
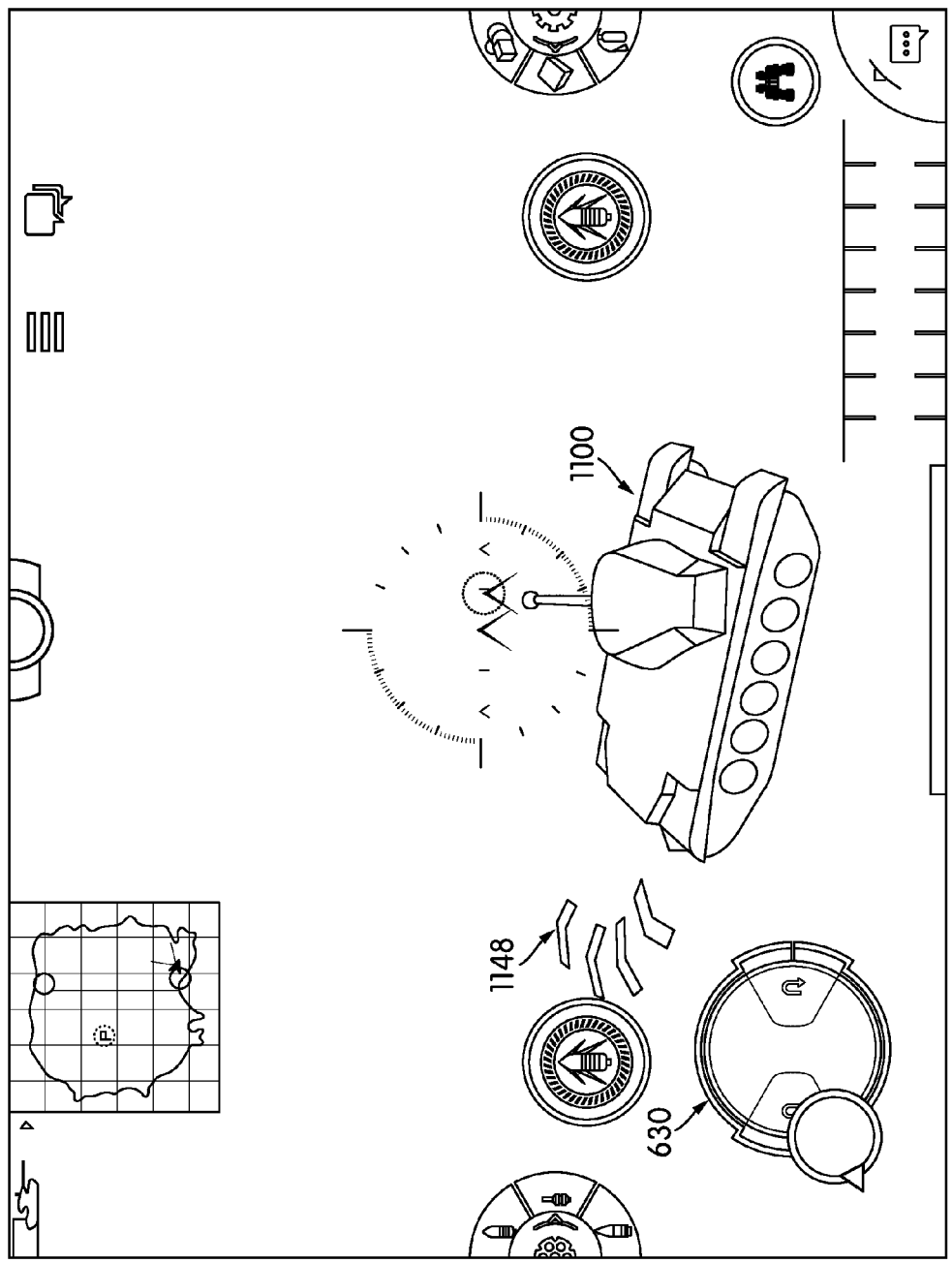

In some embodiments, the location of the user's touch within a particular touch zone may control the vehicle to be controlled faster or slower based on the current position of the user's press. For example, FIG. 11I illustrates a screenshot where a user may be pressing within touch zone 712F. FIG. 11J also illustrates a screenshot where the user may be pressing within touch zone 712F. However, as compared to the position of the user's press of FIG. 11I, the user's press of FIG. 11J is closer to touch zone 712G. Accordingly, the vehicle illustrated by FIG. 11J may be turning faster than the vehicle illustrated in FIG. 11I. The vehicle illustrated in FIG. 11J may be turning faster because the user's touch illustrated in FIG. 11J within touch zone 712F is closer to touch zone 712G than the user's touch illustrated in FIG. 11I is within touch zone 712F.

Additionally, as the user gradually moves his or her finger towards zone 712G (but the user's press remains within touch zone 712F), the vehicle may be controlled to gradually turn faster and gradually move slower in the reverse direction (until, for example, the user's press is at or near the border between touch zone 712F and 712G, and the vehicle is being controlled to turn at a maximum turning level and cease moving in the reverse direction). Similarly, as the user gradually moves his or her finger towards zone 712E (but the user's press remains within touch zone 712F), the vehicle may be controlled to gradually turn slower and gradually move faster in the reverse direction (until, for example, the user's press is at or near the border between touch zone 712F and 712E, and the vehicle is being controlled to move in the reverse direction at a maximum velocity and cease turning). Touch zones 712B, 712D and 712H may also be configured with similar functionality (e.g., touch zones 712B and 712D may gradually control the vehicle to move forward faster/slower and turn slower/faster; touch zone 712H may gradually control the vehicle to move reverse faster/slower and turn slower/faster).

The rate of turning may be indicated by the angle of the visual indicator. For example, by comparing the angle of indicator 1145 and indicator 1148 from FIGS. 11I and 11J, it can be seen that visual indicator 1148 is at a greater angle and, as discussed above, the vehicle illustrated in FIG. 11J is being controlled to turn faster than the vehicle illustrated in FIG. 11I.

Figure 11L:
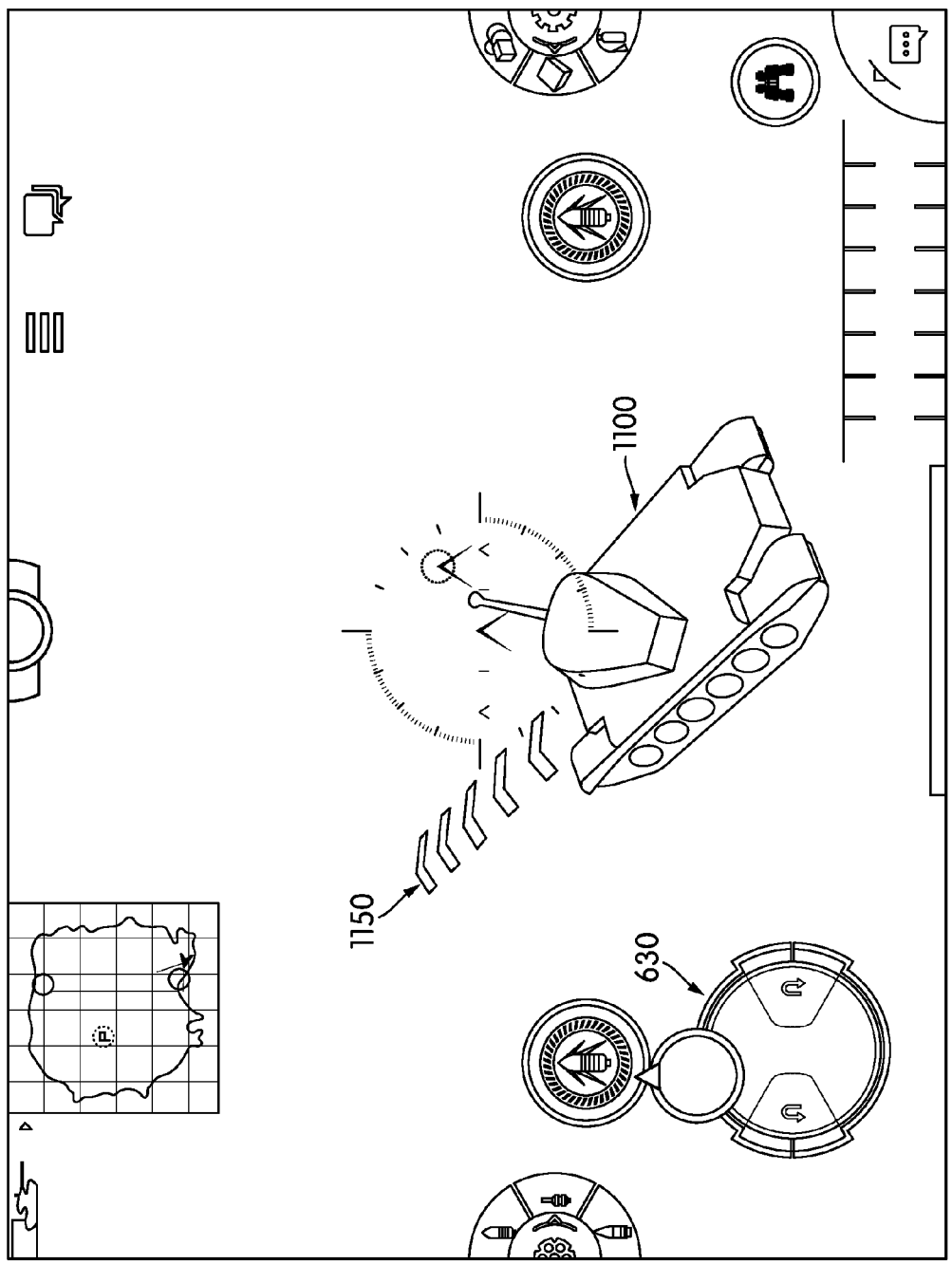

In some embodiments, a user may be able to press at different points within a touch zone, but the vehicle remains controlled in one direction (and/or turning in a particular fashion). In other words, touch control 630 may be configured to control the vehicle to move in one of a set of directions (e.g., stationary, forward and reverse) and/or turn in one of a set of turning directions (e.g., not turning, turning clockwise, turning counterclockwise, pivot-turning, etc.) based on where the user is currently pressing. For example, FIGS. 11K and 11L illustrate these aspects of user control. In particular, FIG. 11K and FIG. 11L illustrate screenshots in which touch control 630 is being pressed at different locations (e.g., the touch pad of touch control 630 in FIG. 11K is being pressed on or near the right side of touch zone 712A; and the touch pad of touch control 630 in FIG. 11L is being pressed on or near the left side of a touch zone 712A), but the vehicle 1100 remains controlled to move in the forward direction (as seen by visual indicator 1150).

In some embodiments, touch control 630 may control the vehicle using a combination of the scenarios depicted in FIGS. 11I, 11J, 11K and 11L. For example, touch control 630 may be configured to control the vehicle gradually as described above in connection with FIGS. 11I and 11J when the user is pressing within touch zones 712B, 712D, 712F or 712H. Touch control 630 may also be configured to control the vehicle only in the forward direction (e.g., not gradually) when the user is pressing within touch zone 712A; control the vehicle only in the reverse direction (e.g., not gradually) when the user is pressing within touch zone 712E; control the vehicle to pivot clockwise (e.g., not gradually) when the user is pressing within touch zone 712C; and control the vehicle to pivot counterclockwise (e.g., not gradually) when the user is pressing within touch zone 712G. In this manner, touch control 630 may control the vehicle in accordance with analog joystick techniques when a user presses within certain touch zones, but may control the vehicle in accordance with at least one different technique (e.g., not analog) when the user presses within other touch zones. One particular example where the touch control 630 may control the vehicle in accordance with analog joystick techniques when a user presses within certain touch zones, but in accordance with at least one different technique when the user presses within other touch zones is as follows:

a. Touch zones 712B, 712D, 712F and 712H may be configured in accordance with analog techniques. Touch zone 712B may control the vehicle to gradually turn clockwise and gradually move forward based on the user's press; touch zone 712D may control the vehicle to gradually turn clockwise and gradually move reverse based on the user's press; touch zone 712F may control the vehicle to gradually turn counterclockwise and gradually move reverse based on the user's press; and touch zone 712H may control the vehicle to gradually turn counterclockwise and gradually move forward based on the user's press.

b. Touch zones 712A, 712C, 712E and 712G may be configured in accordance with techniques different from the analog techniques. Touch zone 712A may control the vehicle to move forward at a maximum velocity; touch zone 712C may control the vehicle to pivot clockwise at a maximum level; touch zone 712E may control the vehicle to move reverse at a maximum velocity; and touch zone 712G may control the vehicle to pivot counterclockwise at a maximum level).

Figure 11M:
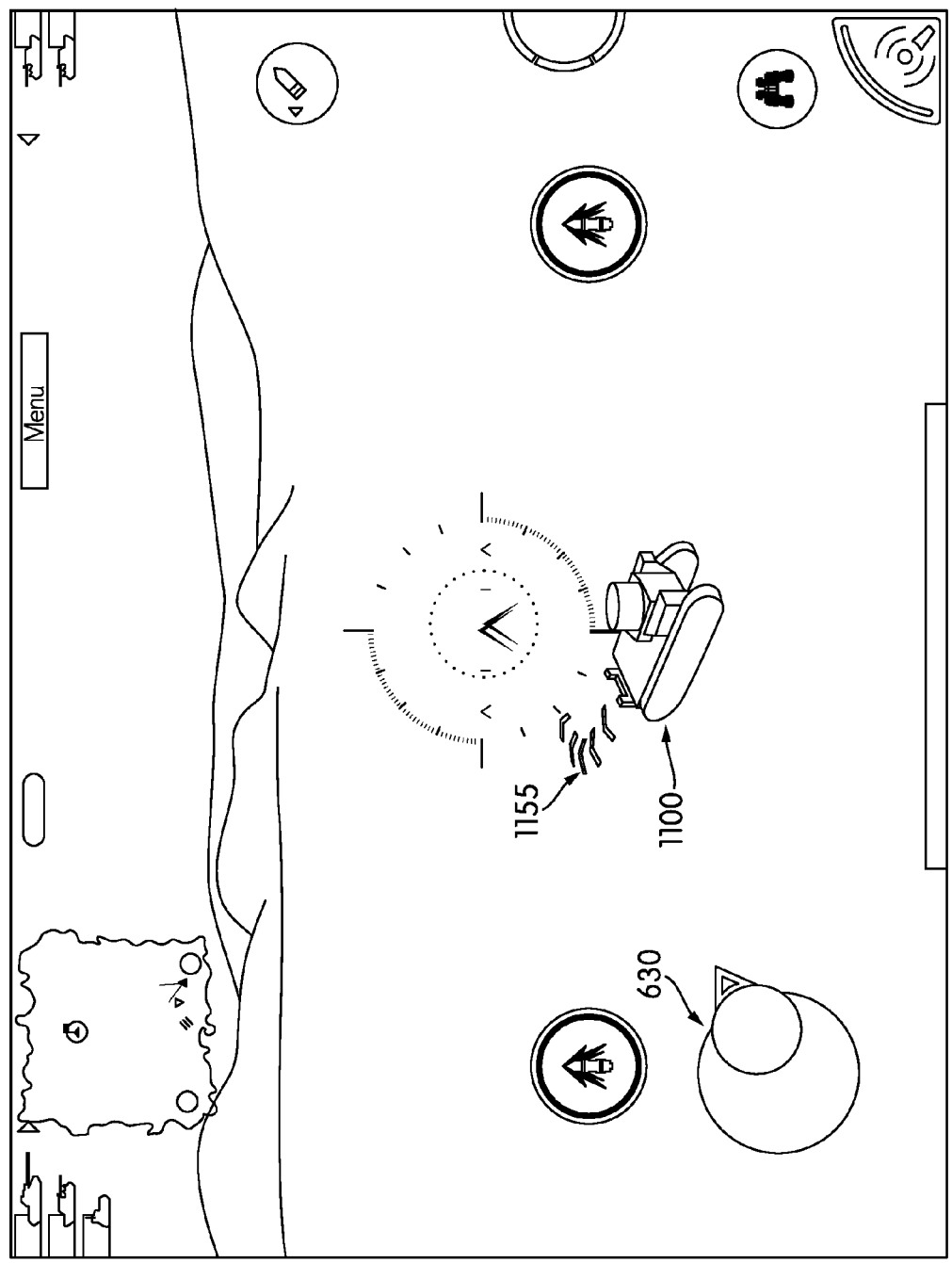
Figure 11N:
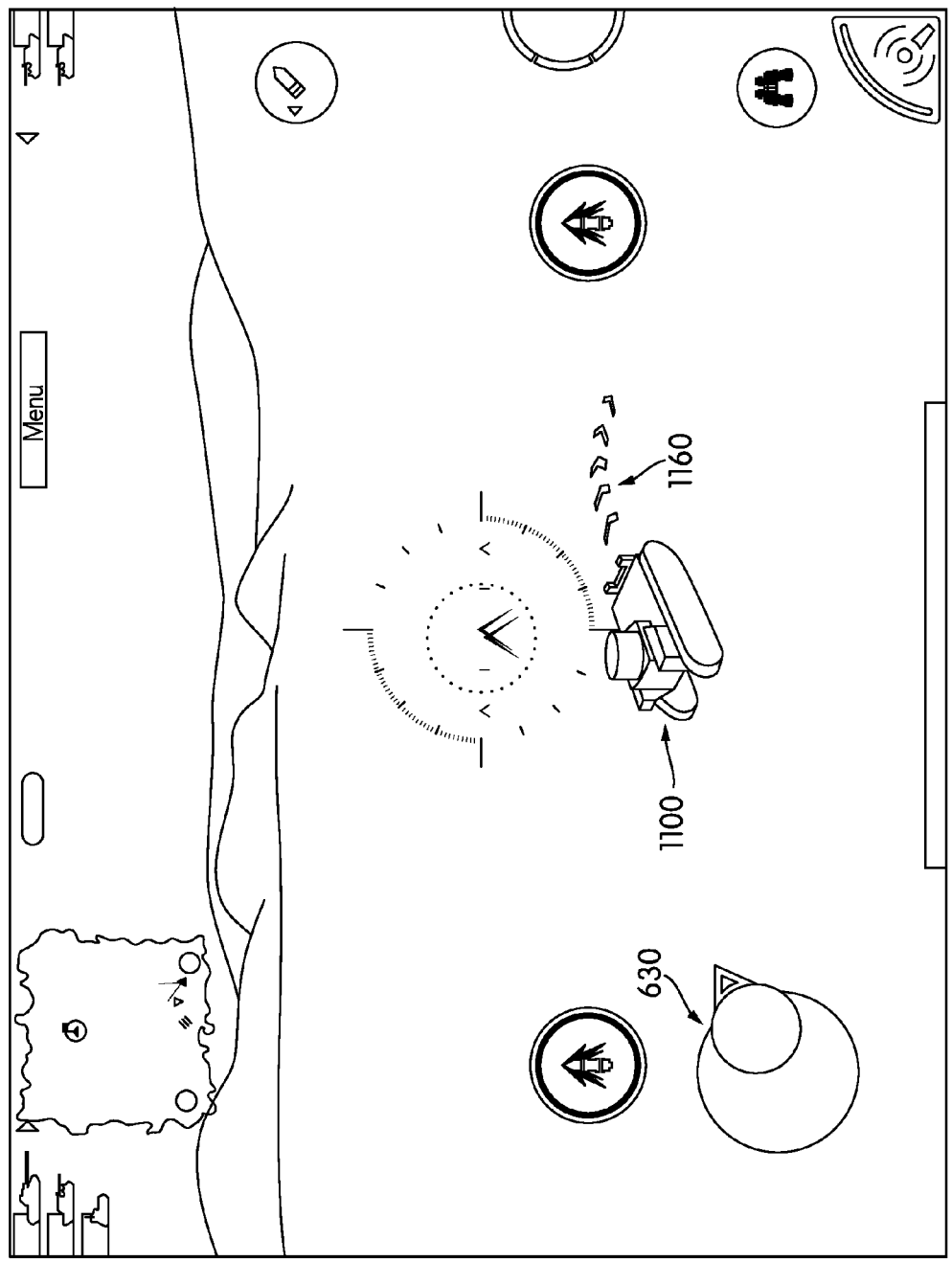

Additionally, a vehicle may be controlled to move at different velocities via touch control 630. For example, touch control 630 may be pressed within a touch zone, and the velocity may be determined based on the distance of the current press location from the perimeter of the touch control 630 (or the distance from the dead zone). In addition to or alternatively from indicating the direction the vehicle is being moved, the visual indicator being displayed may indicate the velocity. FIGS. 11M and 11N illustrate these aspects of user control. In particular, FIG. 11M and FIG. 11N illustrate a vehicle 1100 being controlled to move at a reduced velocity (the vehicle of FIG. 11F is one example where the vehicle is shown as moving at maximum velocity). As seen by comparing the visual indicators of FIGS. 11M and 11N (visual indicator 1155 of FIG. 11M and visual indicator 1160 of FIG. 11N), the vehicle of FIG. 11M is moving at a velocity that is less than the vehicle of FIG. 11N. As illustrated, visual indicator 1155 of FIG. 11M includes two out of five sub-indicators being highlighted and visual indicator 1160 of FIG. 11N includes three out of five sub-indicators being highlighted (visual indicator 1110 of FIG. 11B includes five out of five sub-indicators being highlighted).

Visual indicators 1145 and 1148 of FIGS. 11I and 11J also illustrate an example where the indicators indicate the velocity of the vehicle. In particular, FIGS. 11I and 11J illustrate an example where the indicators indicate the velocity of the vehicle based on an opacity property of the sub-indicators. Visual indicator 1148 of FIG. 11J includes four sub-indicators at 50% opacity and one sub-indicator (e.g., the one that is partially obstructed by the vehicle) at 100% opacity. Visual indicator 1145 of FIG. 11I includes five sub-indicators at 100% opacity. Accordingly, the vehicle of FIG. 11I is moving in reverse at a greater velocity than the vehicle of FIG. 11J.

Additionally, a player may be able to interact with touch control 630 to place the controlled vehicle into a "cruise" (similar to a car's "cruise control") mode. For example, in some embodiments, a player may be able to perform a double tap on the touch pad 702 when the touch pad 702 is within one of the touch zones 712A-712H to hold touch pad 702 at that location. With the touch pad 702 being held at that location, the vehicle may be controlled in a direction and a velocity based on that location (e.g., assuming the player performs a double taps the touch pad of touch control 630 illustrated in FIG. 11N, the vehicle 1100 may continue to move forward and turn clockwise at that velocity until the player removes the vehicle from the cruise mode). As another example, in some embodiments, the cruise mode may be entered based on touch pad 702 being held at a location for a threshold amount of time (e.g., assuming the player holds the touch pad of touch control 630 of FIG. 11N at the illustrated location for a time equal to or greater than the threshold time, the vehicle may be in the cruise mode and may be controlled to move in the illustrated direction at the illustrated vehicle until it is removed from the cruise mode).

A player may remove the vehicle from the cruise mode by dragging touch pad 702 to a different location or by touching anywhere on the touch control (e.g., a tap onto the touch control 630 that causes touch pad 702 to snap back to the default position and remove the vehicle from the cruise mode).

One or more embodiments may have additional or other conditions for entering the cruise mode. For example, the player may be able to enter the cruise mode if they hold or double tap the touch pad 702 within specified portions of the touch zones. For example, one embodiment may enter the cruise mode if the player double taps or holds touch pad 702 at an outer edge of the touch zone. In other words, the player may double tap or hold touch pad 702 when the vehicle is moving at a maximum velocity to enter the cruise mode (see e.g., FIG. 11B illustrating one example where the user is controlling the vehicle to move forward at a maximum velocity). In some arrangements, a setting may active that causes the cruise mode to be automatically triggered when a player stops pressing on the touch control 630. For example, when a user moves touch pad 702 and removes his or her finger, the touch pad may remain at the last location of the player's press and, accordingly, the vehicle may continue to be controlled in accordance with the touch zone of that last location (e.g., if the user last pressed in zone 712A, the vehicle may continue to be controlled to move forward).

Figure 11O:
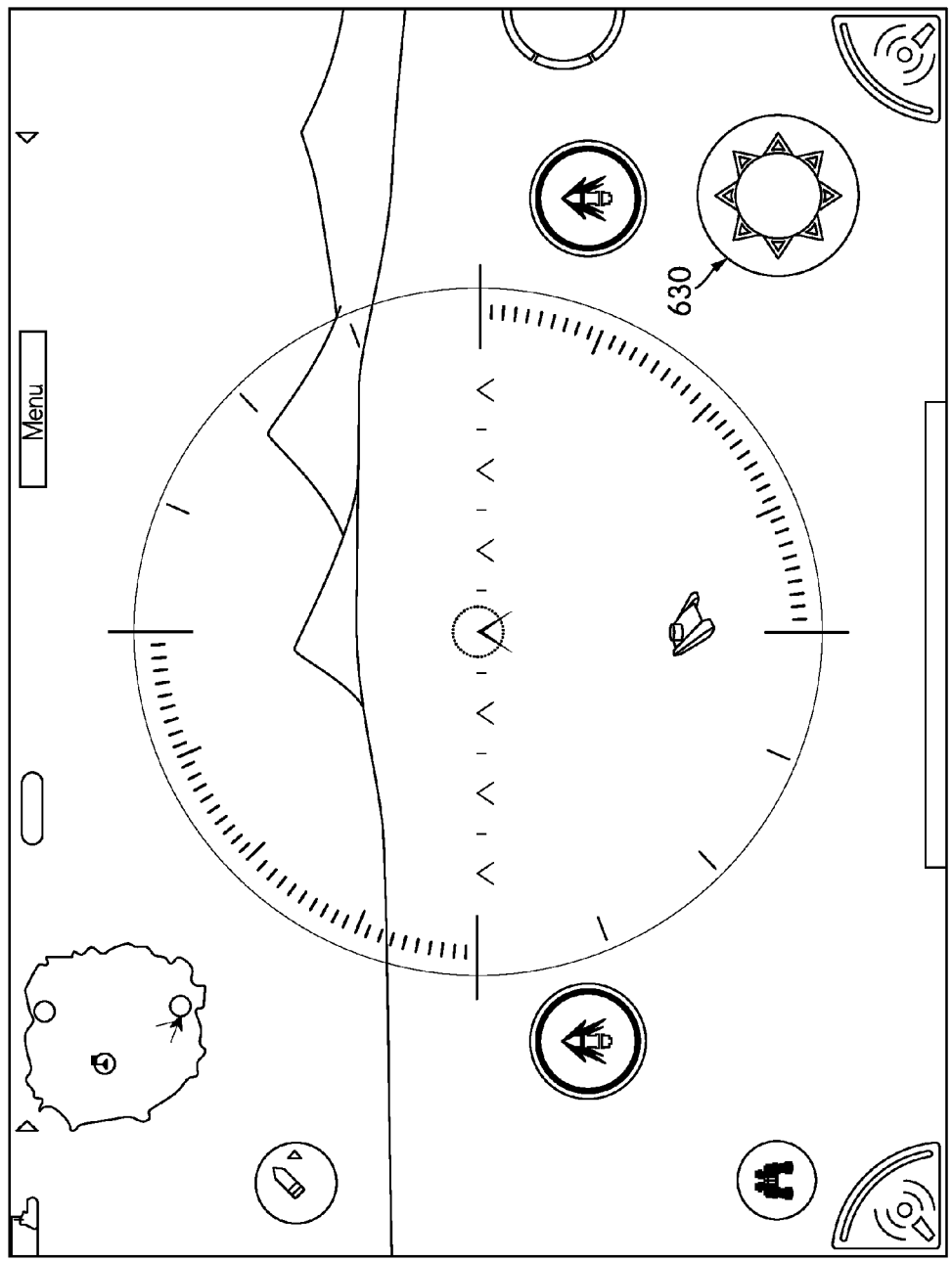

As illustrated throughout the above examples, touch control 630 is shown as being placed at a fixed location in the user interface and, in particular, in the lower left-hand corner of the user interface. Touch control 630 may, in some embodiments, be placed at a different location in the user interface. FIG. 11O illustrates a screenshot in which touch control 630 is placed at a location in the right side of the user interface. The location where the touch control 630 is placed in the user interface may be in accordance with (or based on) a setting that, in some variations, a player may select via a settings or options menu (e.g., a menu accessible by pressing menu control 608). Additionally, a player may be able to customize the location at which the touch control 630 is placed via a menu setting (e.g., enter in a screen coordinate) or other setting (e.g., enter a touch control placement mode that allows the player to drag touch control 630 to a desired screen location and then accept that location).

Additionally, as illustrated throughout the above example, a visual indicator may be displayed that indicates the direction and velocity of the controlled vehicle. In some embodiments, the visual indicator may change color when the tank is turning (e.g., turn green when turning clockwise, turn yellow when turning counterclockwise, turn white when moving forward or reverse). For example, one color may be used if the vehicle is moving forward but a different color may be used if the vehicle is moving in reverse. For example, visual indicator 1110 and 1115 (and others) may be colored green, while indicator 1120 may be colored green. In some arrangements, performing a pivot turn, as shown in FIG. 11E may be given its own color (e.g., blue) or may be given one of the colors for forward or reverse (e.g., colored green or yellow).

Touch control 630 is only one type of touch control for controlling a vehicle or other object in a virtual world. In particular, touch control 630 is visually designed to simulate the appearance of an analog stick of a gamepad and, in some embodiments, can be placed in a fixed position within the user interface. A different type of touch control, however, can be used in some variations and it may be designed differently from touch control 630. For example, in some embodiments, the different type of touch control may be dynamically placed within the user interface based on a player's touch or press. Described herein is a type of user control that can be referred to as a "dissected" or "split" touch control (the terms "dissected" and "split" may be used interchangeably herein). The dissected touch control will be discussed herein as having a visual appearance different from the touch control 630 and as being able to be dynamically placed within the user interface (as opposed to being placed in a fixed position).

Some embodiments may combine aspects of touch control 630 with aspects of the dissected touch control to create a type of touch control contemplated by the present disclosure. For example, the visual appearance of the dissected touch control could be combined with the fixed position aspect described in the above examples using touch control 630. As another example, the dynamic placement aspect of the dissected touch control could be combined with the visual appearance of touch control 630.

Additionally, some embodiments may include both types of touch control. In one or more of such embodiments, the player may be able to select between which type of touch control is used via a setting of a settings or options menu (e.g., a menu accessible via menu control 608).

Figure 12:
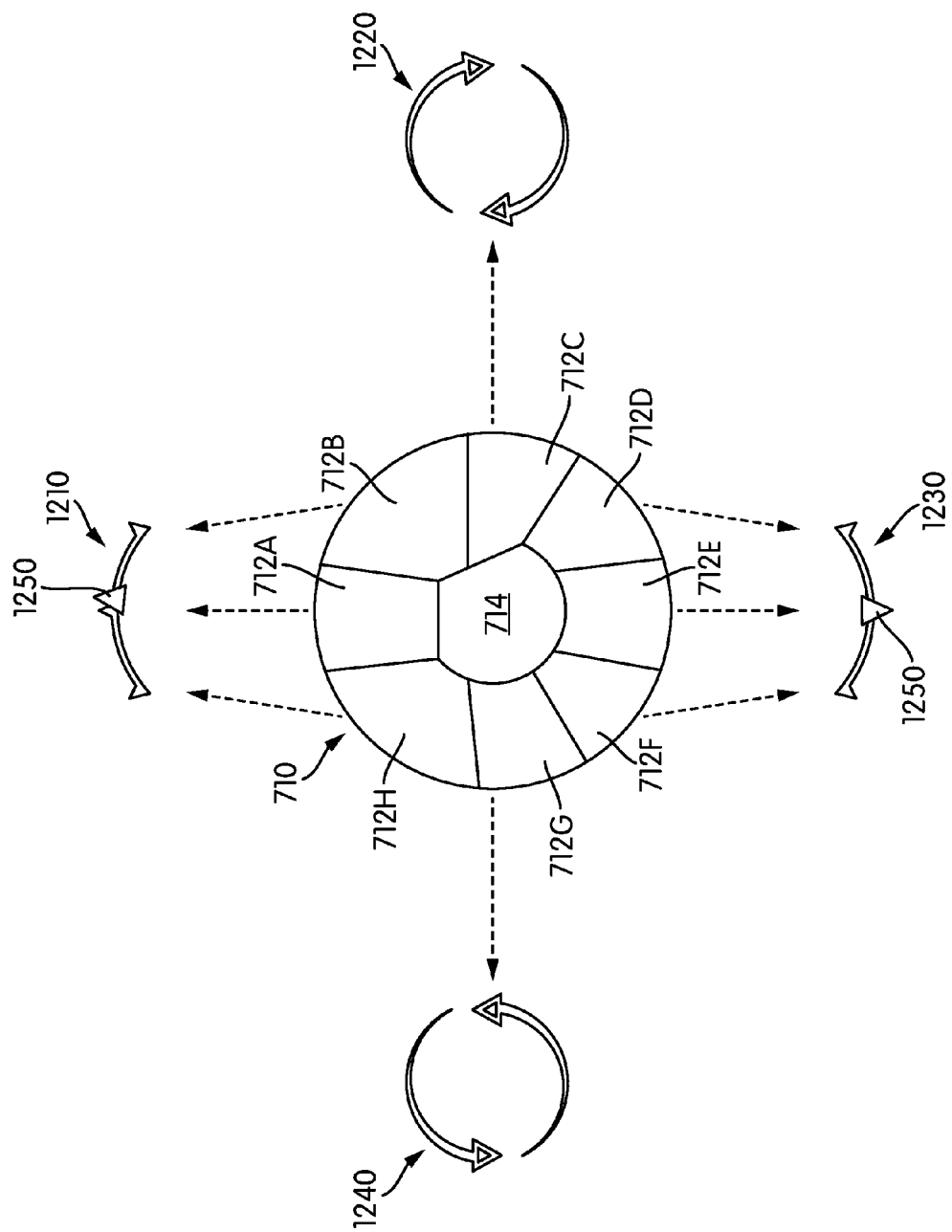
FIG. 12 illustrates an example diagram of touch zones for controlling an object of a virtual world in accordance with a dissected touch control and other aspects described herein.

In some embodiments, the dissected touch control may be visually different than touch control 630, but may use the same or similar touch zone arrangements as discussed above in connection with, for example, FIGS. 7 and 9, among others. As one particular example, such a dissected touch control may use features related to changing or adjusting the touch zone arrangements that were discussed above in connection with touch control 630. FIG. 12 illustrates an example diagram of touch zones for controlling an object of a virtual world in accordance with (or based on) a dissected touch control and other aspects described herein. As illustrated in FIG. 12, touch zone arrangement 710 may be used for the dissected touch control (e.g., the same touch zone arrangement as discussed above with respect to FIG. 7).

Dissected touch control may be defined by dissected control elements 1210, 1220, 1230 and 1240. Each of the dissected control elements 1210, 1220, 1230 and 1240 may be associated with one or more of the touch zones from touch zone arrangement 710. In FIG. 12, the associations are indicated by dashed lines. For example, dissected control element 1210 is illustrated as being associated with touch zones 712A, 712B and 712H. Dissected control element 1220 is illustrated as being associated with touch zone 712C. Dissected control element 1230 is illustrated as being associated with touch zones 712D, 712E and 712F. Dissected control element 1240 is illustrated as being associated with touch zone 712G.

In some arrangements, only one of the dissected touch control elements is displayed at a time. To display a particular element, a player may perform a touch gesture (e.g., provide gesture input via the touch sensor). For example, in some arrangements, the dissected touch control may be able to be dynamically placed. Examples of the dynamic placement of the dissected touch control will be discussed below. To summarize one example of the dynamic placement, a player may be able to touch within the left side of a display screen to begin the gesture. When the player first presses the screen, the location of the touch may define the center location of the touch zone arrangement 710 (e.g., where the location of the center of the dead zone 714 is placed on the display screen). The user may then move his or her finger while pressed in a direction of a touch zone. Based on which touch zone the user's finger presses, a dissected touch control may be displayed (e.g., at the current location of the user's finger). In other words, the user is able, via his or her initial touch and/or the gesture performed, to select which dissected touch control element is displayed and/or select the location at which the dissected touch control element is placed within the user interface.

With respect to FIG. 12, dissected touch control element 1210 may be displayed in response to the user performing a gesture to any of the touch zones 712A, 712B or 712H. In some variations, the user may press within the display screen at a location. This press may result in the dead zone 714 being anchored to that location The user may then drag his or her finger into the touch zone 712A, 712B or 712H to cause dissected display element 1210 to be displayed.

Dissected touch control element 1220 may be displayed in response to the user performing a gesture from dead zone 714 and to touch zone 712C. In some variations, the user may press within the display screen at a location. This press may result in the dead zone 714 being anchored to that location. The user may then drag his or her finger into the touch zone 712C to cause dissected display element 1220 to be displayed.

Dissected touch control element 1230 may be displayed in response to the user performing a gesture from dead zone 714 and to any of touch zones 712D, 712E and 712F. In some variations, the user may press within the display screen at a location. This press may result in the dead zone 714 being anchored to that location. The user may then drag his or her finger into the touch zone 712D, 712E or 712F to cause dissected display element 1230 to be displayed.

Dissected touch control element 1240 may be displayed in response to the user performing a gesture from dead zone 714 and to touch zone 712G. In some variations, the user may press within the display screen at a location. This press may result in the dead zone 714 being anchored to that location. the user may then drag his or her finger into the touch zone 712G to cause dissected display element 1240 to be displayed.

In addition to the touch control elements, the dissected touch control may include a position indicator 1250, which indicates the current position of the user's press. As illustrated in FIG. 12, touch elements 1210 and 1230 include a position indicator 1250.

When a particular element is displayed, a player may be able to drag his or her finger within the associated touch controls in order to control the vehicle to perform one of a set of movements. For example, dissected touch control element 1210 may be used to control a vehicle to move forward, move forward and turn counterclockwise, or move forward and turn clockwise. As the user moves his or her finger throughout the touch zones 712A, 712B or 712H, the vehicle may be controlled such that it gradually changes from moving and/or turning in those directions (e.g., as the user moves from touch zone 712H to 712A, the vehicle may be controlled such that it slows the turning rate until it ceases to turn and is only moving forward). Dissected touch control element 1220 may be used to control a vehicle to turn clockwise. Dissected touch control element 1230 may be used to control a vehicle to move in reverse, move in reverse and turn clockwise, or move in reverse and turn counterclockwise. As the user moves his or her finger throughout the touch zones 712D, 712E or 712F, the vehicle may be controlled such that it gradually changes from moving and/or turning in those directions (e.g., as the user moves from touch zone 712F to 712D, the vehicle may be controlled such that it slows the turning rate until it ceases to turn and is only moving in reverse). Dissected touch control element 1240 may be used to control a vehicle to turn counterclockwise.

Figure 13A:
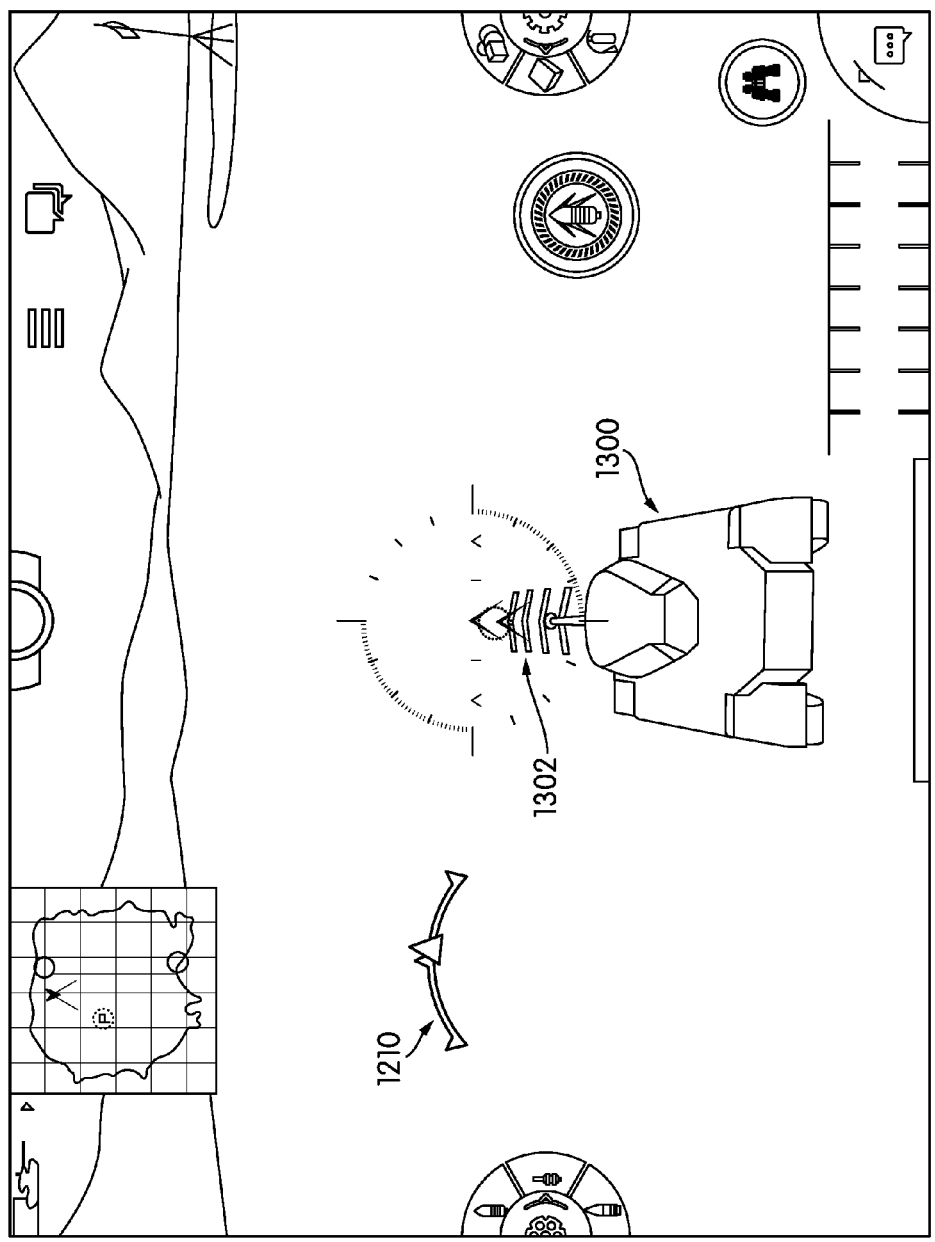
FIGS. 13A-13N illustrate example screenshots of a video game user interface implementing different aspects of user control in accordance with one or more aspects described herein.
Figure 13B:
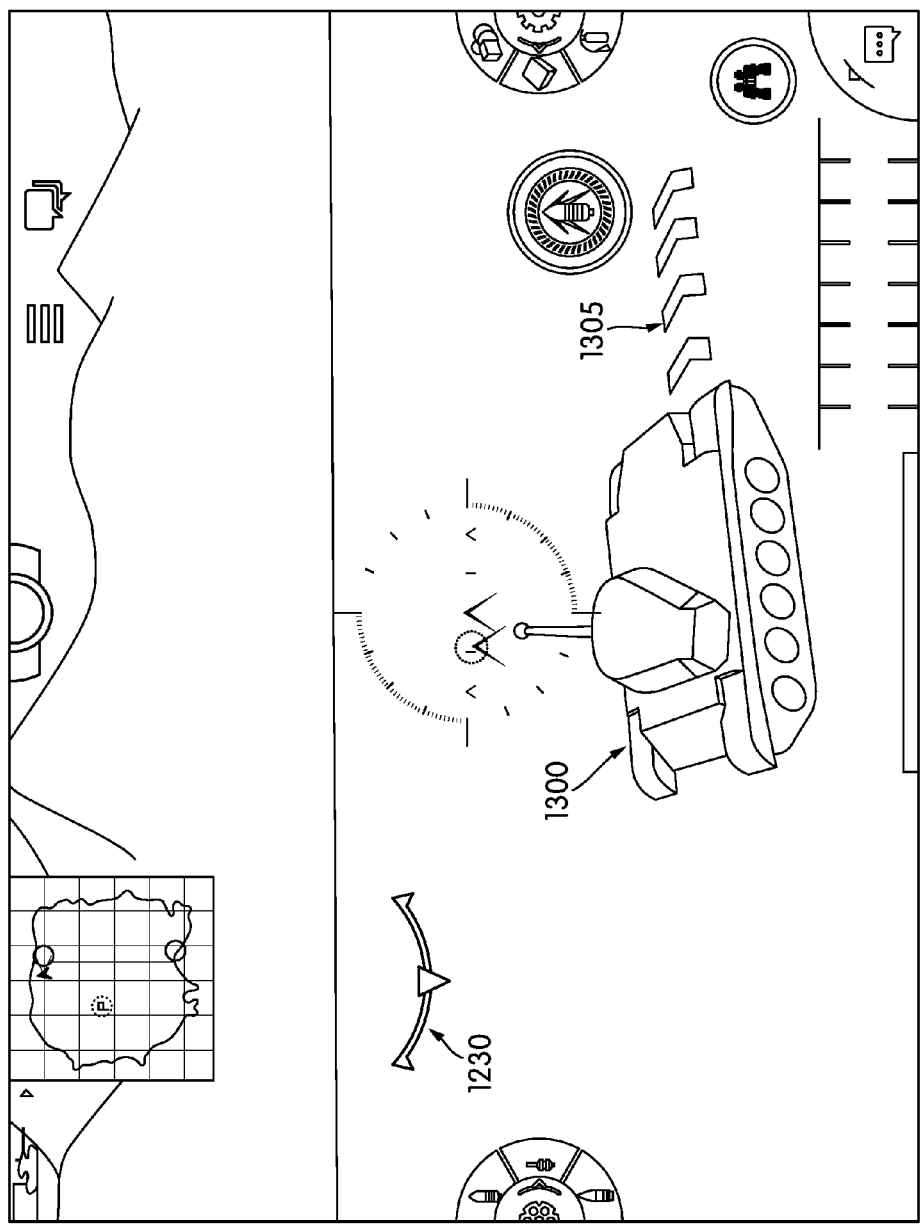
Figure 13C:
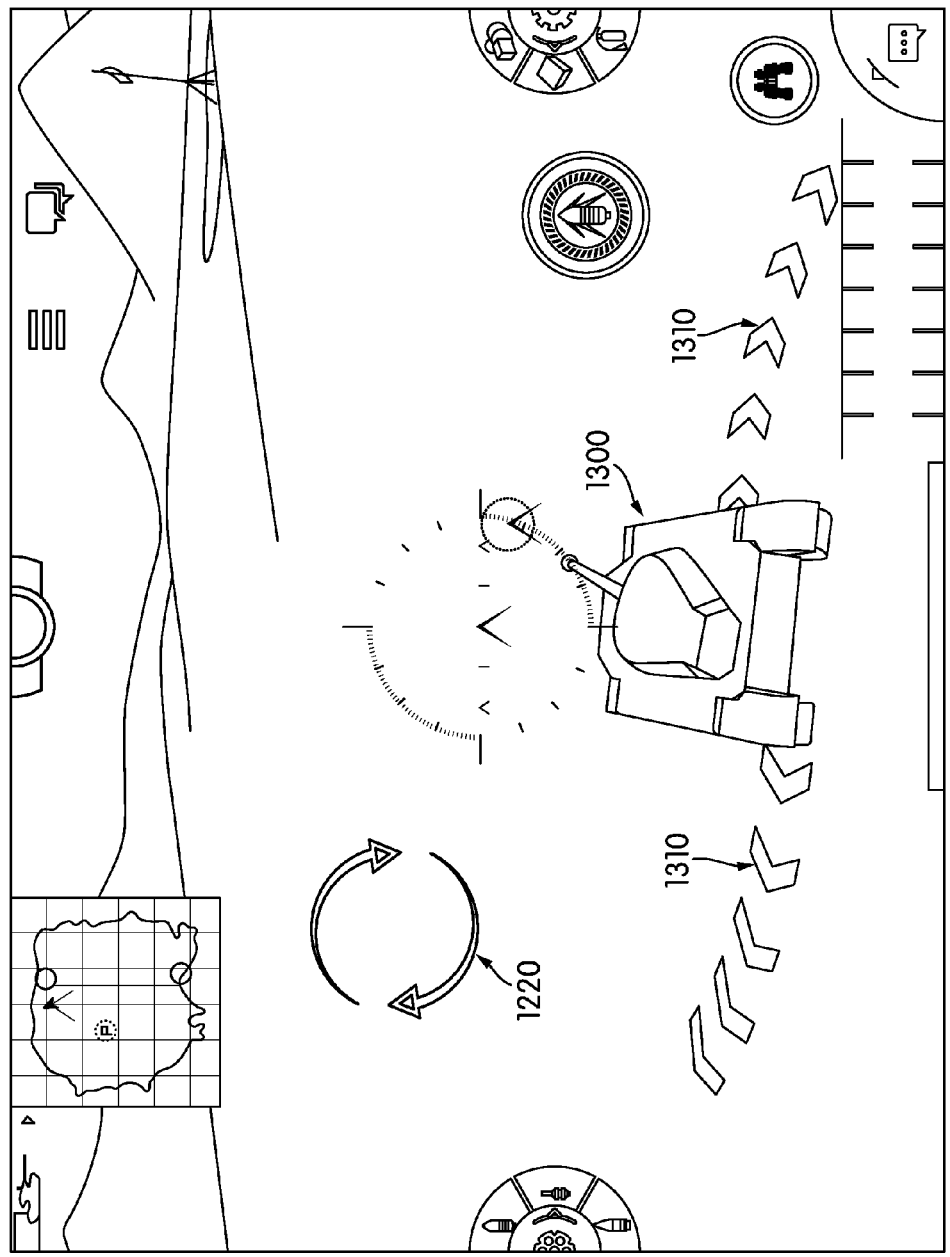
Figure 13D:
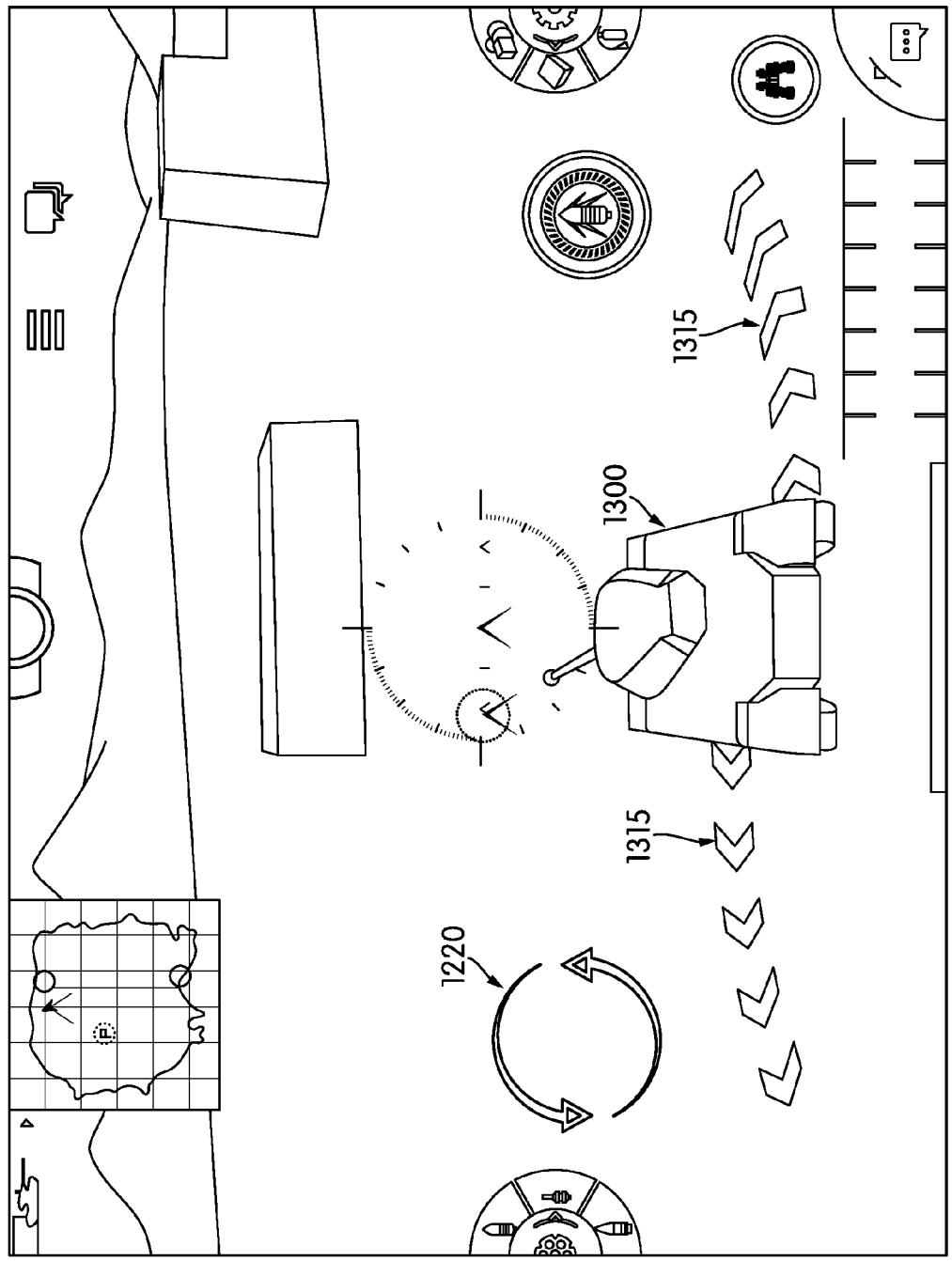
Figure 13E:
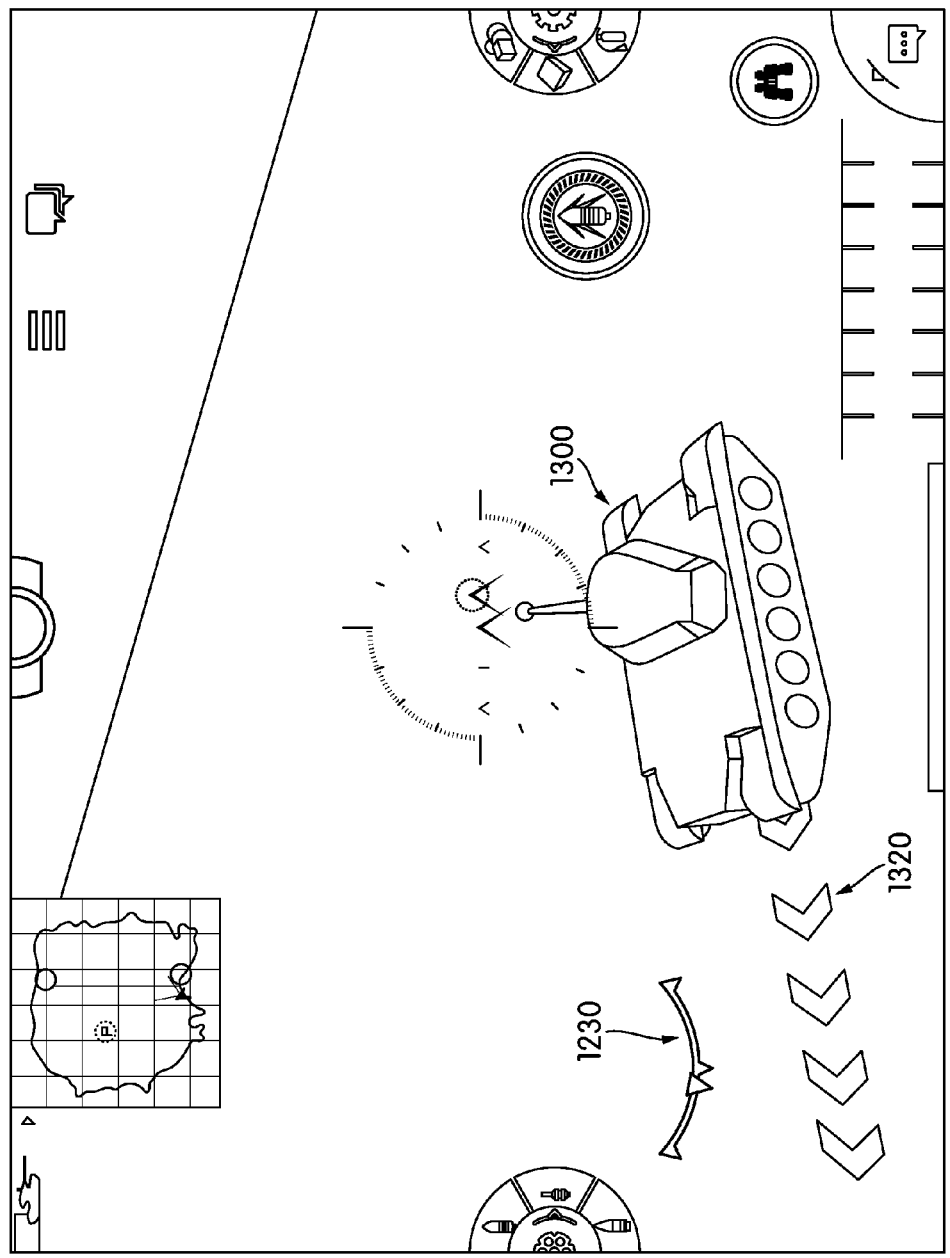
Figure 13F:
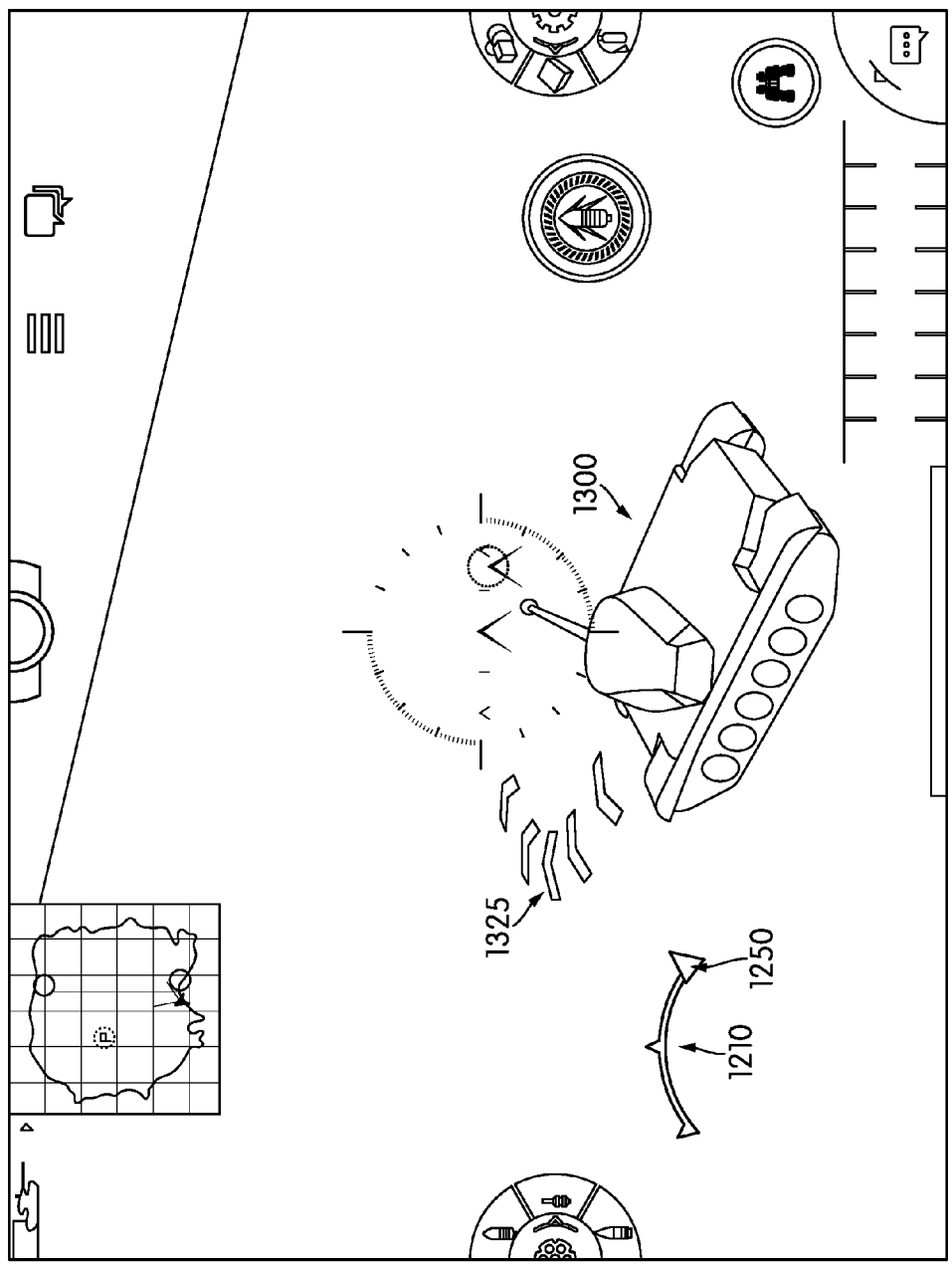
Figure 13G:
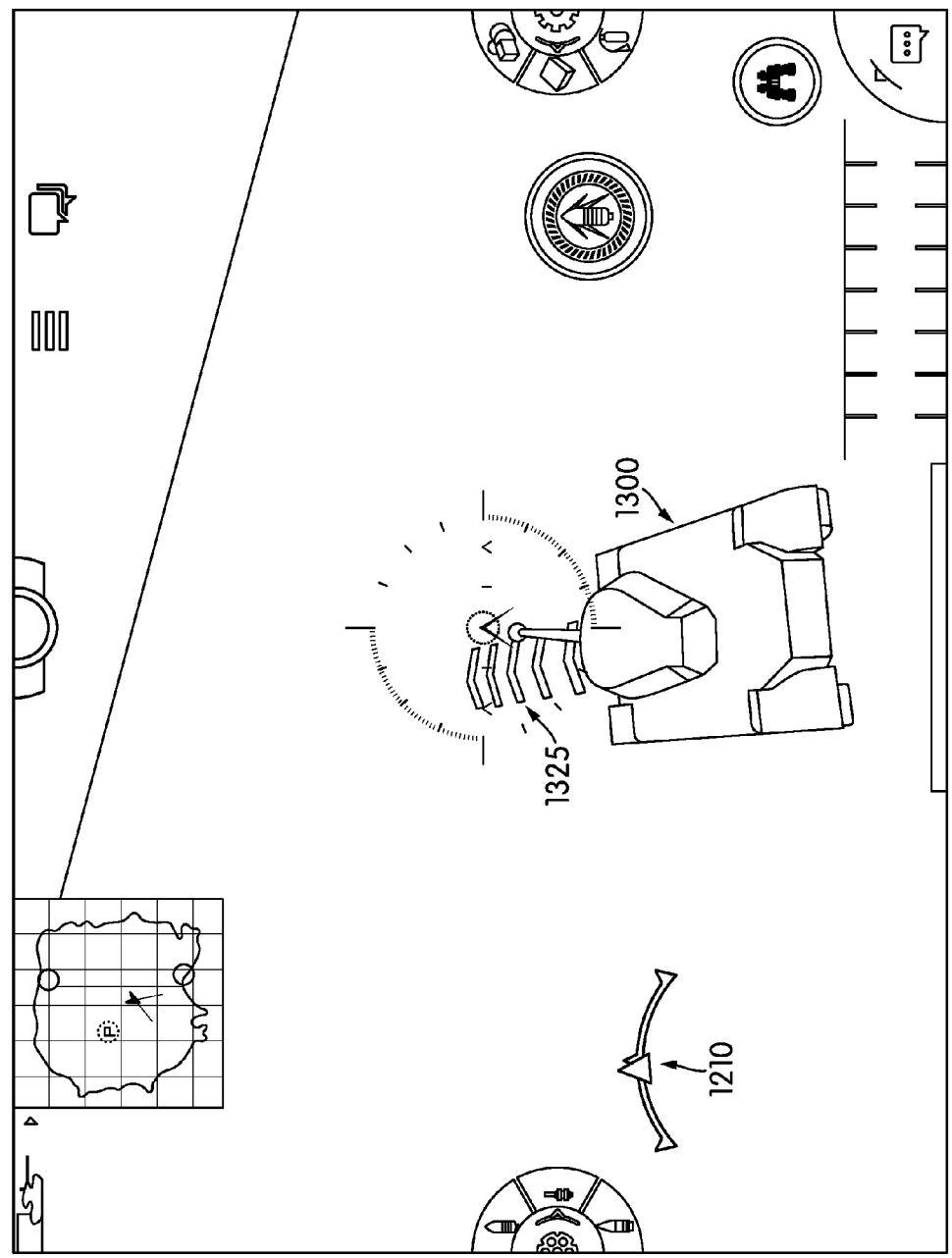
Figure 13H:
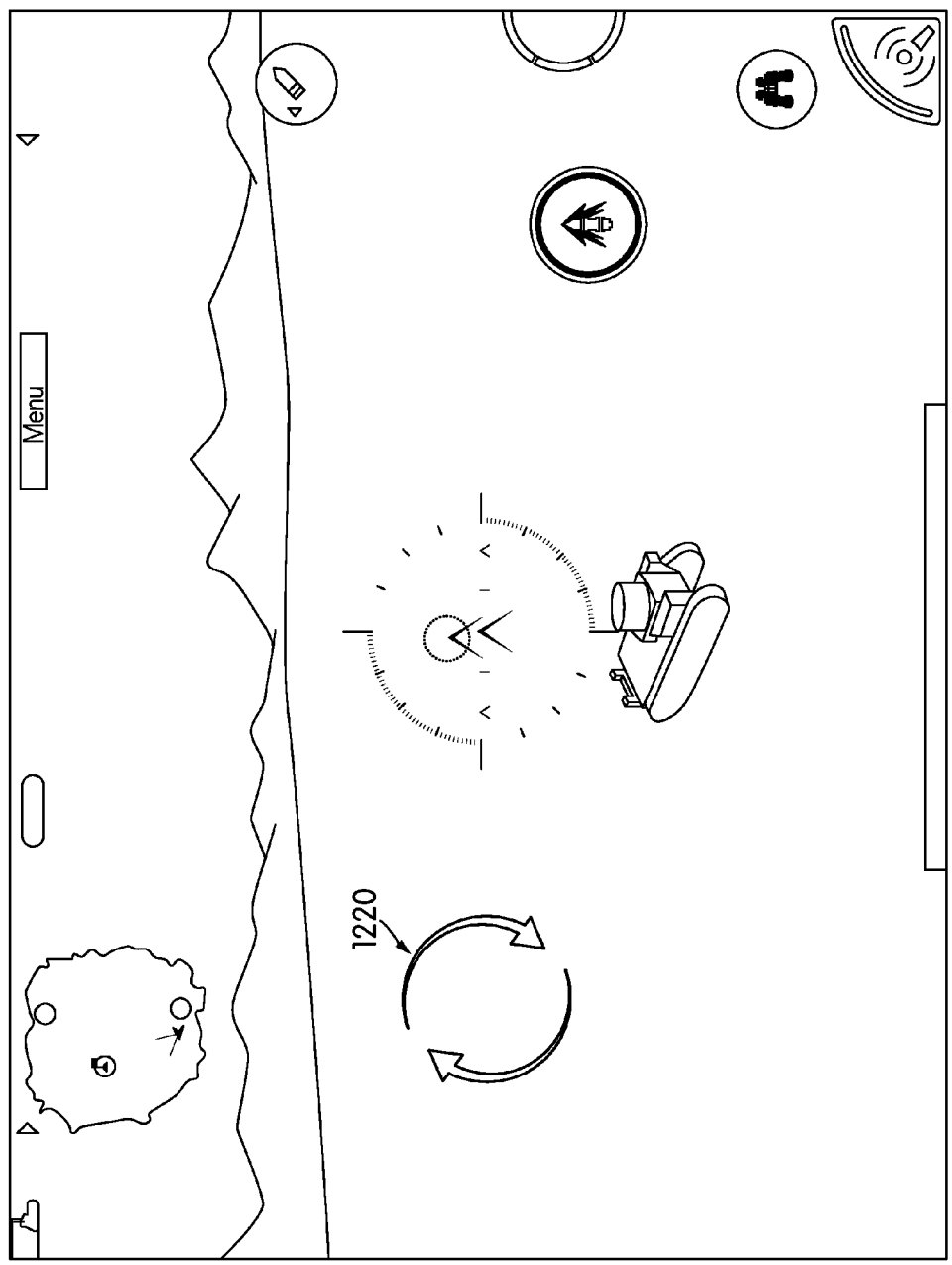
Figure 13I:
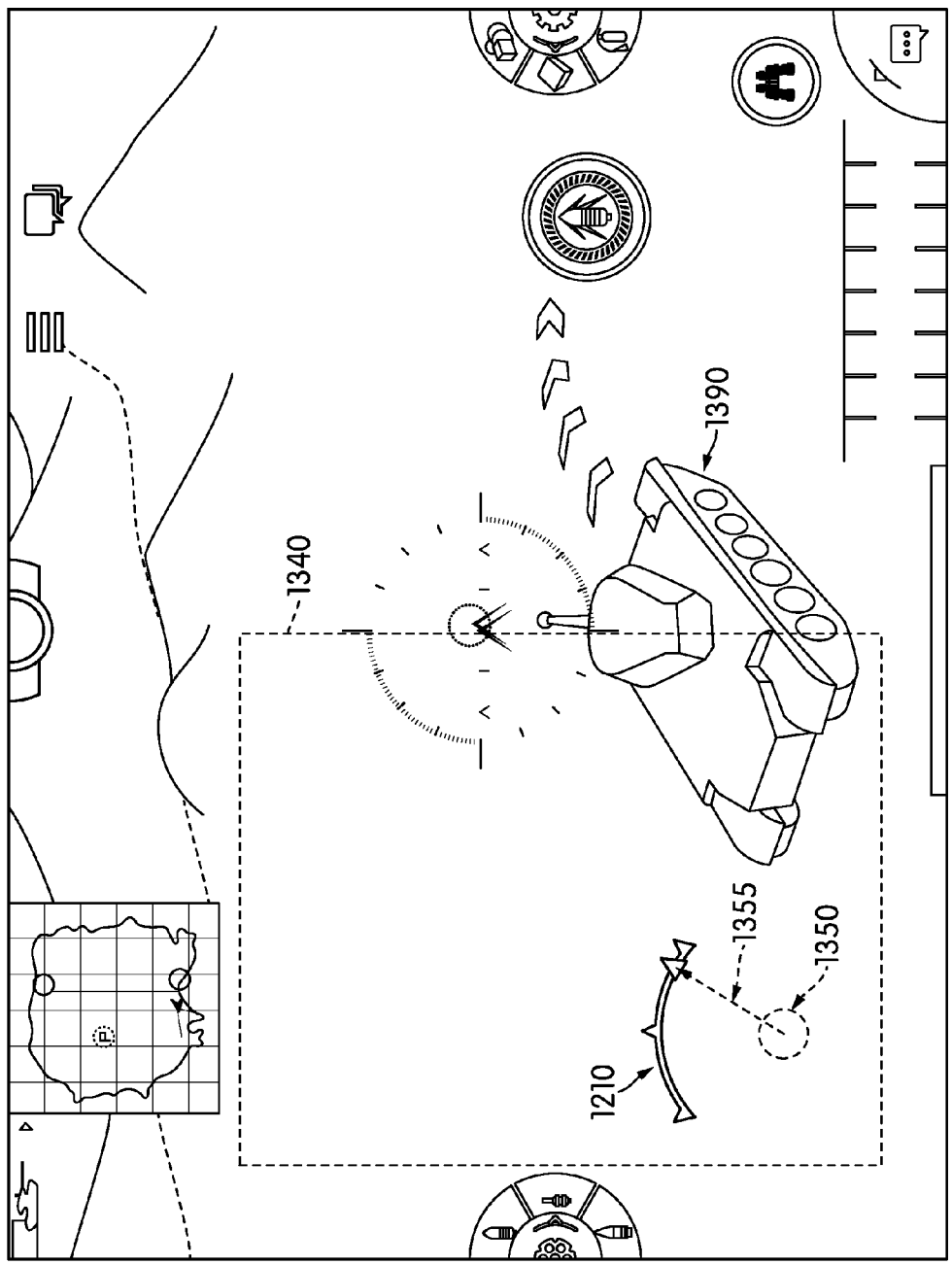
Figure 13J:
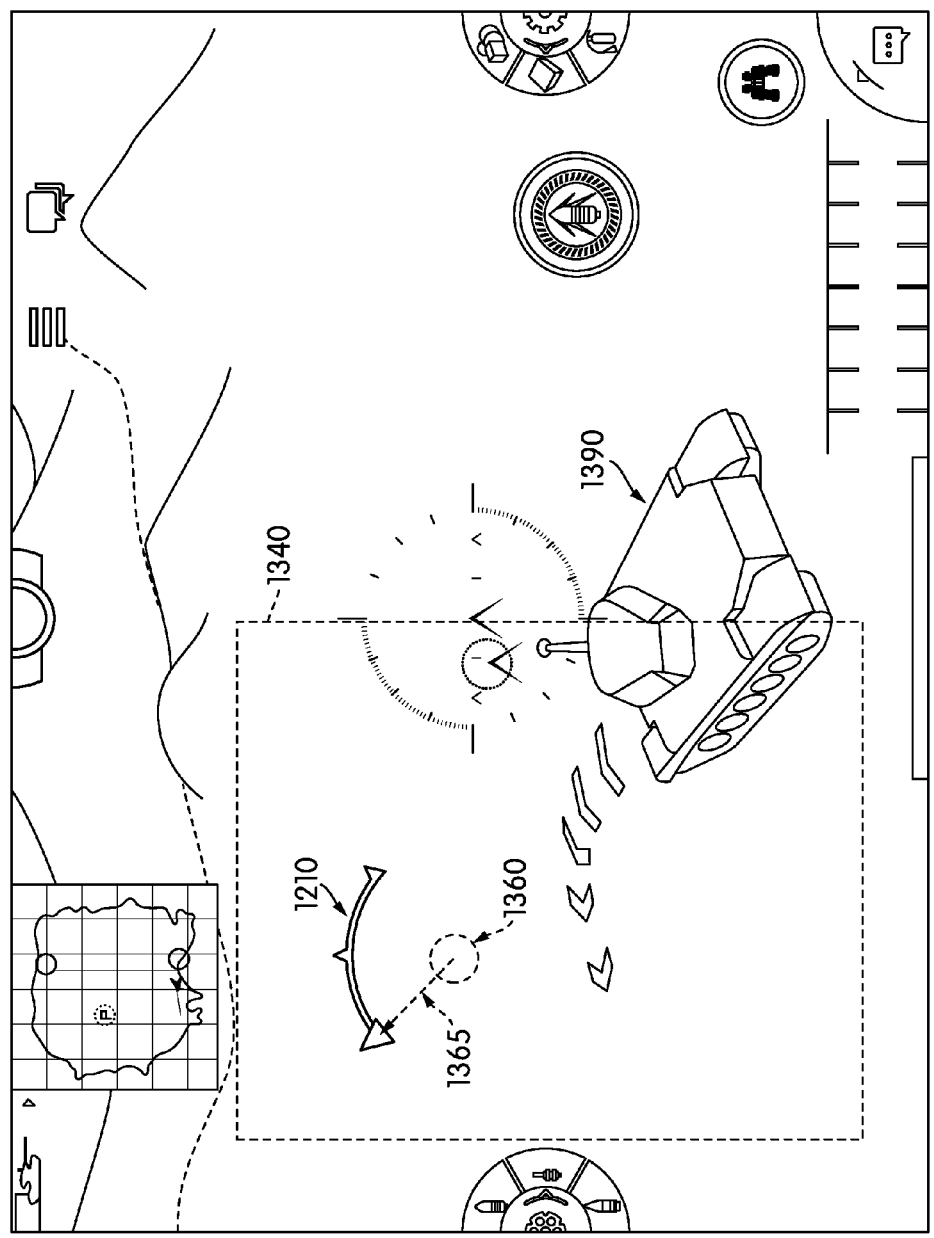
Figure 13K:
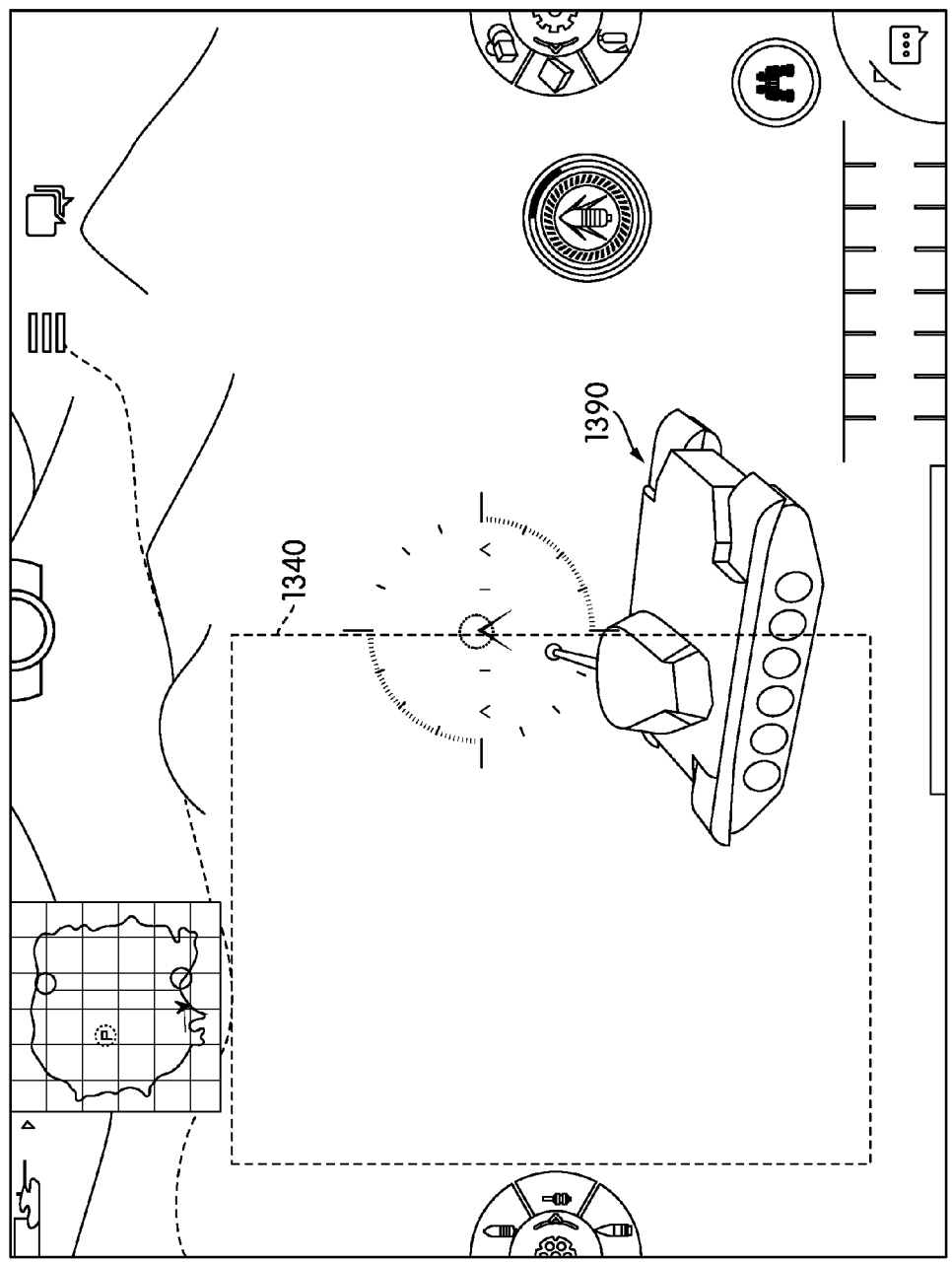
Figure 13L:
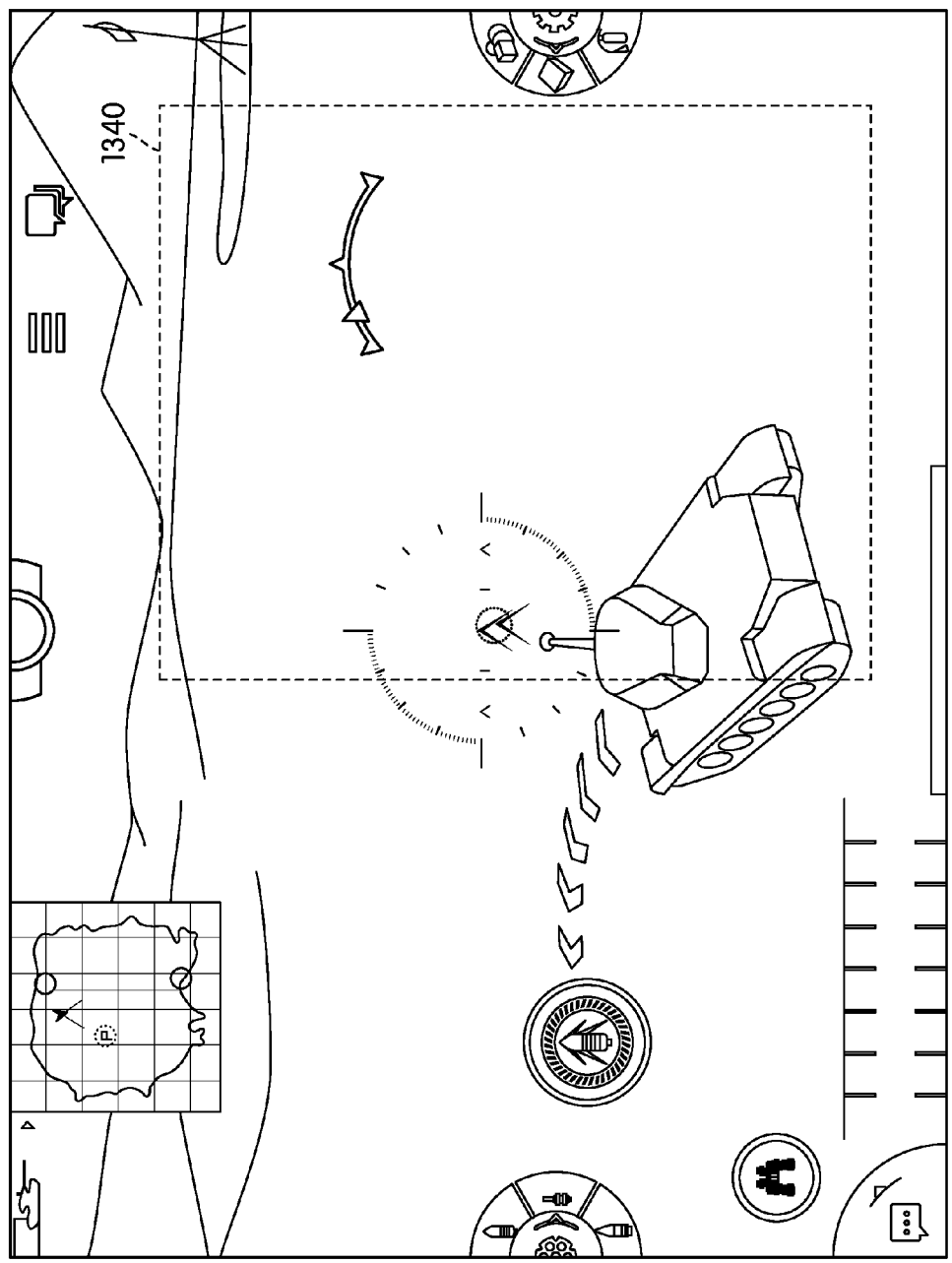
Figure 13M:
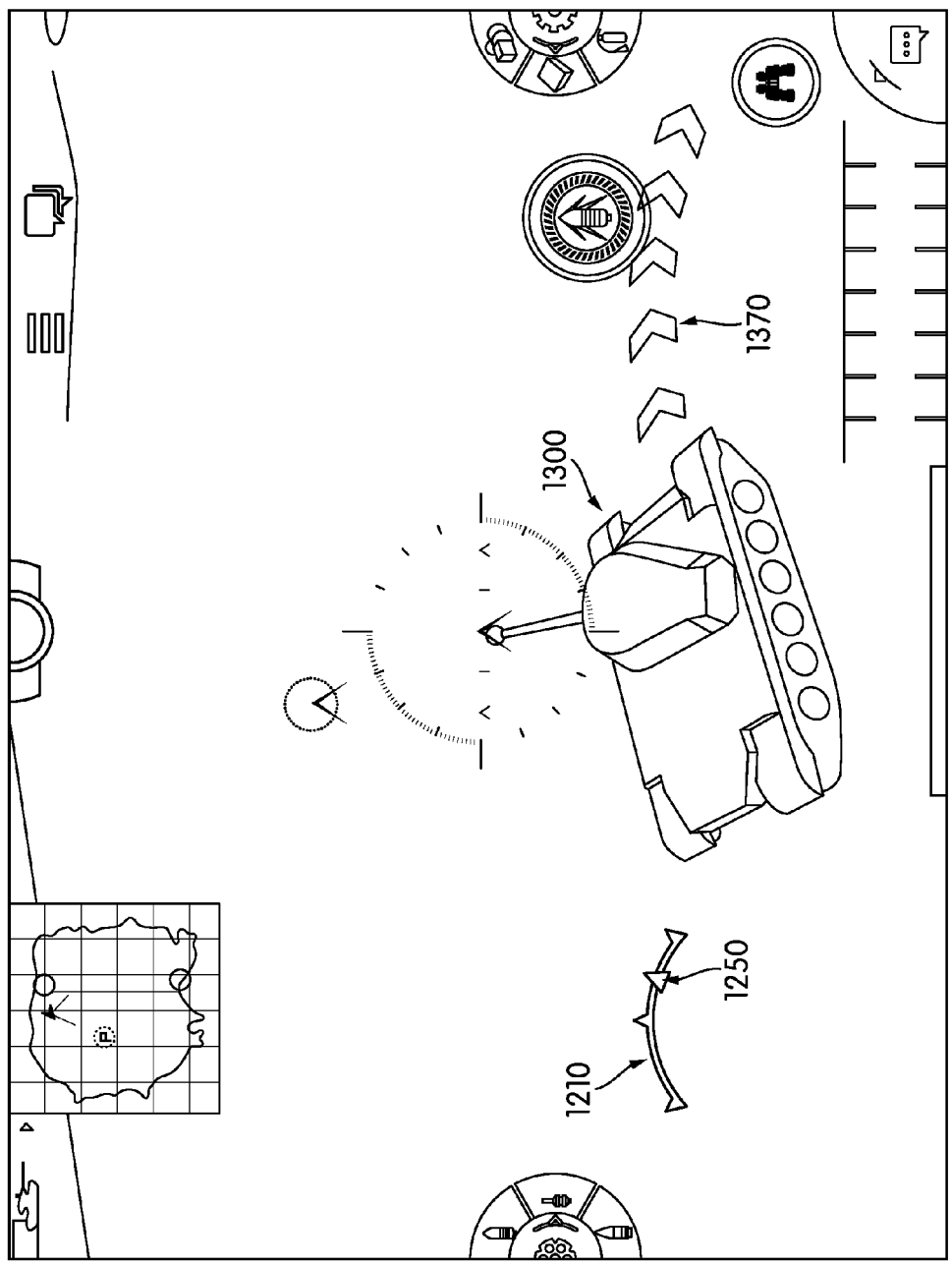
Figure 13N:
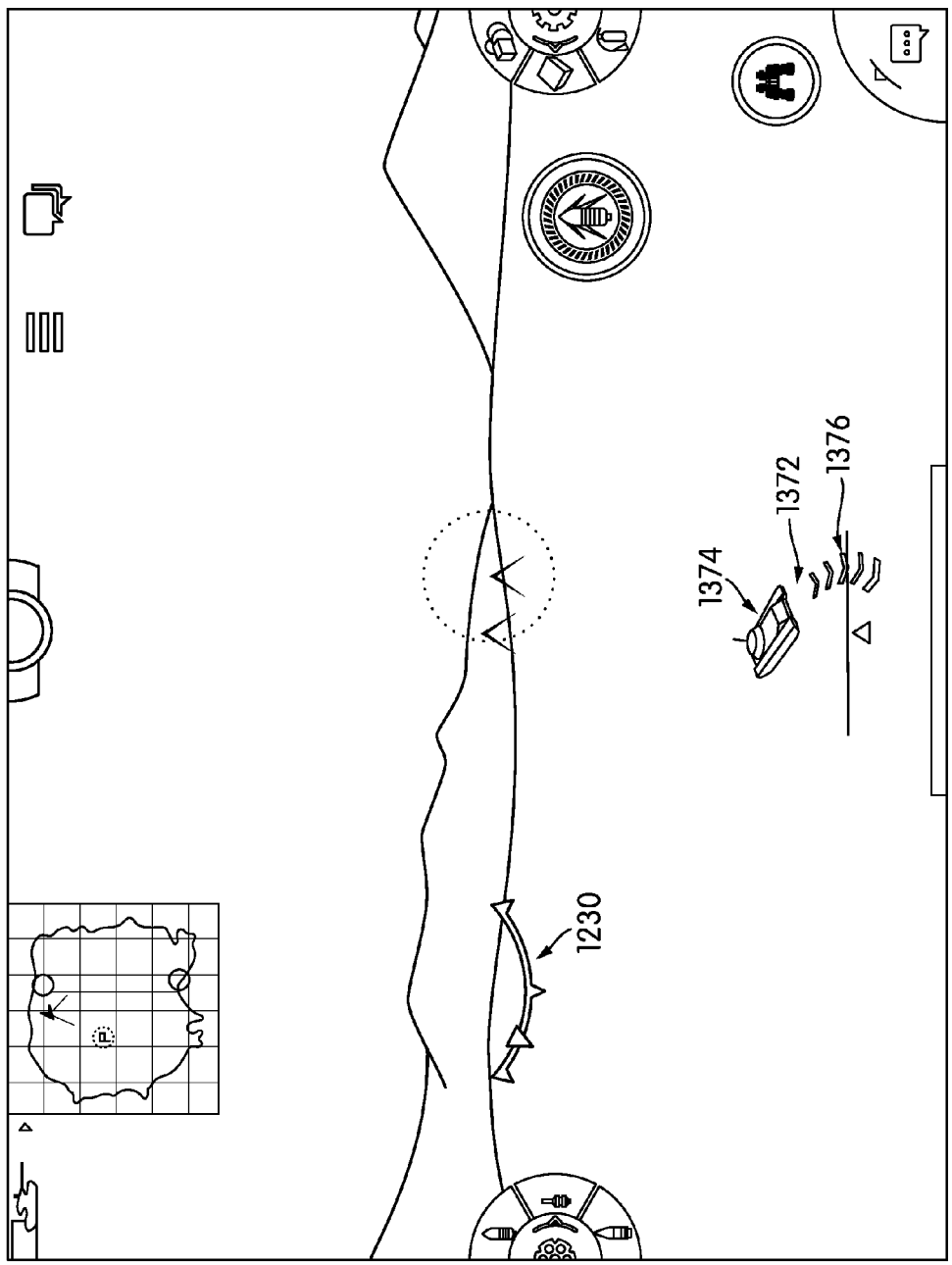

FIGS. 13A-13N illustrate example screenshots of a video game user interface implementing different aspects of user control in accordance with one or more aspects described herein, and each screenshot depicts one or more aspects related to the dissected touch control. Some aspects of the interface depicted in FIGS. 13A-13N may include the same or similar controls as the user interface illustrated in the above examples of FIGS. 6, 8 and 11A-11N. For example, the user interface of FIG. 13A may include one or more of the same controls as the user interface illustrated in FIG. 6, including, menu control 608 and zoom control 628. However, some controls may be different. For example, the interface of FIGS. 13A-13N includes a single fire control as compared to the two fire controls included in FIG. 6.

FIG. 13A illustrates an example screenshot showing a dissected touch control element being displayed. In particular, dissected touch control element 1210 is displayed. As illustrated, dissected touch control element 1210 is being used to control vehicle 1300 to move forward, which is indicated to the user via visual indicator 1302.

Vehicle 1300 may be controlled via the dissected touch control to move in similar directions and/or turn in particular directions similarly to how a vehicle may be controlled via the touch control 630. The visual indicators that are displayed may also be similar to those discussed with respect to touch control 630 in FIGS. 11A-11N. For example, FIGS. 13B-13G illustrate example screenshots showing dissected touch control element causing vehicle 1300 to move and/or turn in various directions and at particular velocities. The example screenshots of FIGS. 13B-13G also show a visual indicator that provides an indication as to the direction the vehicle is moving and/or turning, and, in some embodiments, an indication as to the velocity of the vehicle.

FIG. 13B depicts vehicle 1300 being controlled to move in reverse and turn clockwise via a player's interaction with dissected touch control element 1230. Visual indicator 1305 indicates vehicle 1300 is moving in reverse and turning clockwise at maximum velocity.

FIG. 13C depicts vehicle 1300 being controlled to turn clockwise via a player's interaction with dissected touch control element 1220. Visual indicator 1310 indicates vehicle 1300 is turning clockwise at maximum velocity.

FIG. 13D depicts vehicle 1300 being controlled to turn counterclockwise via a player's interaction with dissected touch control element 1240. Visual indicator 1315 indicates vehicle 1300 is turning counterclockwise at maximum velocity.

FIG. 13E depicts vehicle 1300 being controlled to move in reverse via a player's interaction with dissected touch control element 1230. Visual indicator 1320 indicates vehicle 1300 is turning counterclockwise at maximum velocity.

FIG. 13F depicts vehicle 1300 being controlled to move forward and turn clockwise via a player's interaction with dissected touch control element 1210. Visual indicator 1325 indicates vehicle 1300 is moving forward and turning counterclockwise at maximum velocity.

FIG. 13G depicts vehicle 1300 being controlled to move forward via a player's interaction with dissected touch control element 1210. Visual indicator 1330 indicates vehicle 1300 is moving forward at maximum velocity.

In some embodiments, which element of the dissected touch control is displayed depends on which touch zone the user's finger is currently pressed within. For example, touch control element 1210 may be displayed when the user presses within touch zone 712H, 712A or 712B, but touch control 1230 may be displayed when the user presses within touch zone 712D, 712E or 712F. However, in some alternative embodiments, after a particular element is displayed and while the player's finger remains pressed to the screen, the displayed element may remain displayed. While the player's finger remains pressed within one of the associated touch zones, the displayed element may be highlighted (e.g., in a highlighted state). In such embodiments, the elements of FIG. 12 may each be in a highlighted state. However, if the player moves his or her finger to one of the touch zones that is not associated with the displayed element, then the displayed element may be unhighlighted (e.g., in an unhighlighted state). FIG. 13H illustrates an example screenshot showing a dissected touch control element in an unhighlighted state (e.g., as compared to FIG. 12, dissected touch control element 1220 of FIG. 13A is not highlighted). In particular, FIG. 13H depicts dissected touch control element 1220 in an unhighlighted state in response to a player having his or her finger in touch zone 712A, 712B, 712D, 712E, 712F, 712G or 712H. The dissected touch control element 1220 may return to the highlighted state when the player moves his or her finger back into touch zone 712C.

As discussed above, the player may be able, via his or her initial touch and/or the gesture performed, to select which dissected touch control element is displayed and/or select the location at which the dissected touch control element is placed within the user interface. FIGS. 13I and 13J illustrate screenshots where the dissected touch control is placed at different locations based on a player's initial touch. As illustrated in FIGS. 13I and 13J, the player may be able to press at any location within the area defined by area 1340. The screenshots of FIGS. 13I and 13J show a scenario where a presses first presses at location 1350 and performs gesture 1355 to display dissected touch control element 1210. Location 1350, gesture 1355 and display of dissected touch control element 1210 are depicted in FIG. 13I. After controlling vehicle 1390 for a period of time, the user may stop pressing on the screen. This may cause dissected touch control element 1210 to disappear (e.g., not be displayed). The player may subsequently press at location 1360 and perform gesture 1365 to display dissected touch control element 1210 again, but at a different screen location. Location 1360, gesture 1365 and display of dissected touch control element 1210 at the different location are depicted in FIG. 13J.

In some embodiments, when the player is not pressing on the screen, none of the dissected touch control elements may be displayed. FIG. 13K illustrates a screenshot where none of the dissected touch control elements are displayed in response to the user not pressing within area 1340. The user, however, may be pressing in other portions of the screen (e.g., pressing fire control to fire on the enemy, press and drag a finger to control the turret of the tank or change the viewing angle of the virtual world, etc.).

In some embodiments, the location where area 1340 is placed (e.g., the area where a player may press and/or perform gestures to display and interact with the dissected touch control and its elements) in the user interface may be in accordance with (or based on) a setting that, in some variations, a player may select via a settings or options menu. FIGS. 13I, 13J and 13K, among others, depict a user interface in which the area 1340 is placed on the left side of the user interface. FIG. 13L illustrates a screenshot where area 1340 is placed on the right side of the user interface and the player is using the dissected touch control to move a vehicle forward and turn counterclockwise.

As the user moves his or her finger throughout the touch zones, the vehicle may be controlled such that it gradually changes from moving and/or turning in a particular direction. For example, as the user moves his or her finger from touch zone 712B to 712A, the vehicle may be controlled such that it gradually decreases the rate at which the vehicle is turning clockwise. FIG. 13F illustrates the vehicle turning clockwise and moving forward (e.g., the user may be pressing his finger within touch zone 712B). FIG. 13M depicts the vehicle turning clockwise at a slower rate. Comparing the depictions of FIG. 13F to FIG. 13M, it can be seen that the user may be pressing closer to touch zone 712A in FIG. 13M than in FIG. 13F (compare the location of position indicator 1250 in FIGS. 13F and 13M, which indicates where the user is currently pressing). Comparing the visual indicators of FIGS. 13F and 13M, it can also be seen that the vehicle is turning at a reduced rate. Indeed, visual indicator 1325 of FIG. 13F is closer to forming a perpendicular angle than visual indicator 1370 of FIG. 13M.

In some embodiments, the video game user interface may include different viewing modes, such as a zoom or sniper mode, in addition to a default viewing mode. FIG. 13N illustrates a screenshot where the dissected touch control is used while in a different viewing mode. As illustrated in FIG. 13N, a representation of the vehicle being controlled (e.g., vehicle 1300) is being shown in this mode to indicate the current orientation of the vehicle's chassis 1372, the current orientation of the vehicle's turret 1374, and visual indicator 1376 that indicates the direction and/or speed of travel for the vehicle. Visual indicator 1376 indicates the vehicle is being controlled to move in reverse and turn clockwise at a maximum velocity.

Figure 14:
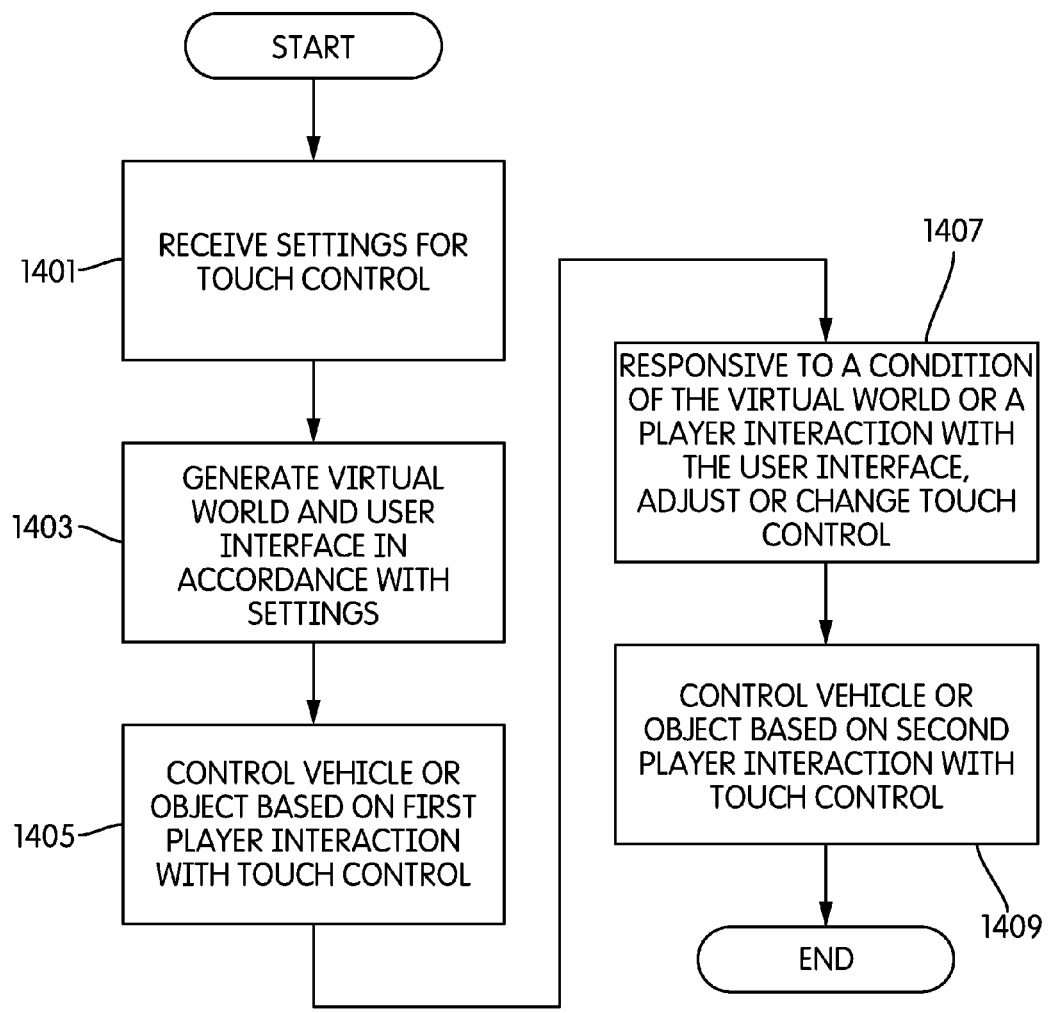
FIG. 14 illustrates an example method of providing a user interface to a virtual world that includes at least two types of touch control according to various aspects described herein.

Discussed above are various examples where a player is able to control a vehicle or other object via a particular type of touch control, such as touch control 630 or a dissected touch control. FIG. 14 illustrates an example method of providing a user interface to a virtual world that includes at least two types of touch control.

At step 1401, a computing device may receive settings for touch control. For example, a player may interact with a generated menu to select various settings related to user control of objects or vehicles. In particular, a menu may present an option for a player to select the type of touch control and the placement of the touch control. One setting may allow the player to select between a first type or a second type of touch control (e.g., select between touch control 630 and the dissected touch control, which has elements 1210, 1220, 1230 and 1240). Another setting may allow the player to select the placement of the touch control (e.g., select between placing the touch control on the left side of the screen or the right side of the screen; select which hand is dominant for the player, which results in the touch control being placed on the side of the screen nearest the dominant hand). In some variations, the computing device may receive default settings that the player has not selected (e.g., default settings that are provided with a fresh install of the video game), which may include, for example, a size and screen position for the touch control.

At step 1403, a computing device may generate a virtual world and user interface in accordance with (or based on) the settings. For example, the virtual world may be similar to any of the virtual worlds or environments depicted in the various screenshots discussed throughout this disclosure. The user interface may include one or more (or all) of the controls discussed herein. Additionally, the user interface may, based on the settings of step 1401, include a touch control of a particular type (e.g., touch control 630 or dissected touch control). The touch control may be configured with a touch zone arrangement, such as, for example touch zone arrangement 710.

At step 1405, the computing device may control a vehicle or object of the virtual world based on a first player interaction with the touch control. For example, the user may perform any of the various interactions with touch control 630 or dissected touch control discussed in the examples of this disclosure. As the player interacts with the touch control, the vehicle may be controlled to move through the virtual world in particular directions and/or at particular velocities. As the vehicle or object moves in a direction and/or at a velocity, a visual indicator may be displayed that indicates the direction and/or velocity the vehicle or object is travelling (as discussed in the various examples described throughout this disclosure).

At step 1407, the computing device may, responsive to conditions of the virtual world or a player interaction with the user interface, adjust or change the touch control. For example, if the viewing mode changes, the touch zone arrangement of the touch control may be changed or adjusted (see FIG. 9). As another example, if the player presses within a particular touch zone, the dead zone of the touch zone arrangement may be decreased in size and/or one or more touch zones may be increased in size (see FIG. 10).

At step 1409, the computing device may control the vehicle or object based on another (e.g., a second) player interaction with the touch control. Similar to step 1405, the user may perform any of the various interactions with touch control 630 or dissected touch control discussed in the examples of this disclosure. As the player interacts with the touch control, the vehicle may be controlled to move through the virtual world in particular directions and/or velocities. As the vehicle or object moves in a direction and/or at a velocity, a visual indicator may be displayed that indicates the direction and/or velocity the vehicle or object is travelling (as discussed in the various examples described throughout this disclosure).

However, with respect to the second player interaction, the touch control, as a result of step 1407, may be using or implementing a changed touch zone arrangement (e.g., zone arrangement 910 or 1010). Accordingly, the second player interaction may result in the vehicle being controlled differently than if the previous zone arrangement was used (e.g., zone arrangement 710). For example, with respect to zone arrangements 710 and 910, as illustrated in FIG. 9, if the second player interaction of step 1409 is within zone 912A, it may cause the vehicle to move forward in the virtual world. However, if the second player interaction was performed when the touch control used touch zone arrangement 710 (e.g., during step 1405), it may have caused the vehicle to move forward and turn counterclockwise (e.g., because it would have been within zone 712H) or move forward and turn clockwise (e.g., because it would have been within zone 712B).

The above examples described various types of touch controls. Additional types of controls may relate to user control over one or more statuses or conditions a vehicle or object may receive as it travels throughout the virtual world. FIGS. 15A-15H illustrate example screenshots of a user interface that includes aspects related to user control over vehicle conditions or statuses. With respect to the examples discussed throughout FIGS. 15A-15H, the various conditions or statuses that a vehicle may receive as it travels throughout the virtual world include a damage status, a crew injury status and an equipment fire status. A user may interact with a repair control, a first aid control, or fire extinguisher control to cure or remove these statuses. The repair controls, first aid control and fire extinguisher will be referred collectively as "vehicle condition controls" or an "object condition controls."

Figure 15A:
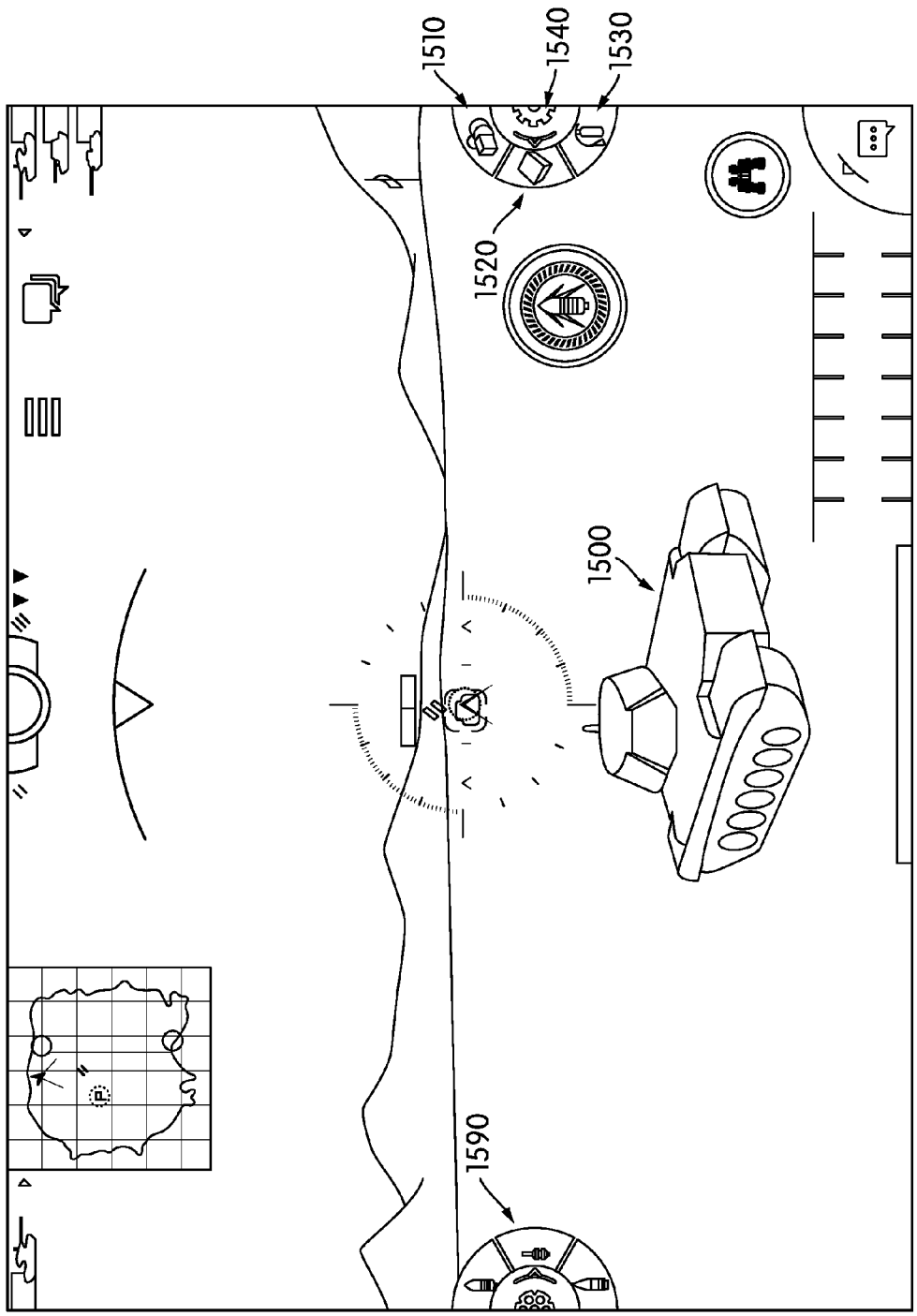
FIGS. 15A-15H illustrate example screenshots of a user interface that includes aspects related to user control over vehicle conditions or statuses in accordance with one or more aspects described herein.

FIG. 15A illustrates an example screenshot of a user interface in which a user may interact with vehicle condition controls when the vehicle does not have any conditions. In some embodiments, the user is unable to interact with the vehicle condition controls until the vehicle 1500 takes damage or has one of the statuses.

As illustrated in FIG. 15A, the user interface includes repair control 1510, first aid control 1520, fire extinguisher control 1530, and vehicle condition enable toggle control 1540. Other controls are possible and could be substituted for one of the controls (or added to the user interface) including, for example, a combination control that is able to remove multiple types of statuses (e.g., a combination control that is able to remove an equipment fire status, a damage status and a crew injury status). A similar type of control could be used for other controls in the user interface. For example, ammo control 1590, which allows a user to change ammo types loaded into the vehicle's weapon system, uses a control similar to the condition controls. Other viewing modes may also include the condition controls and messages depicted throughout FIGS. 15A-15H.

Figure 15B:
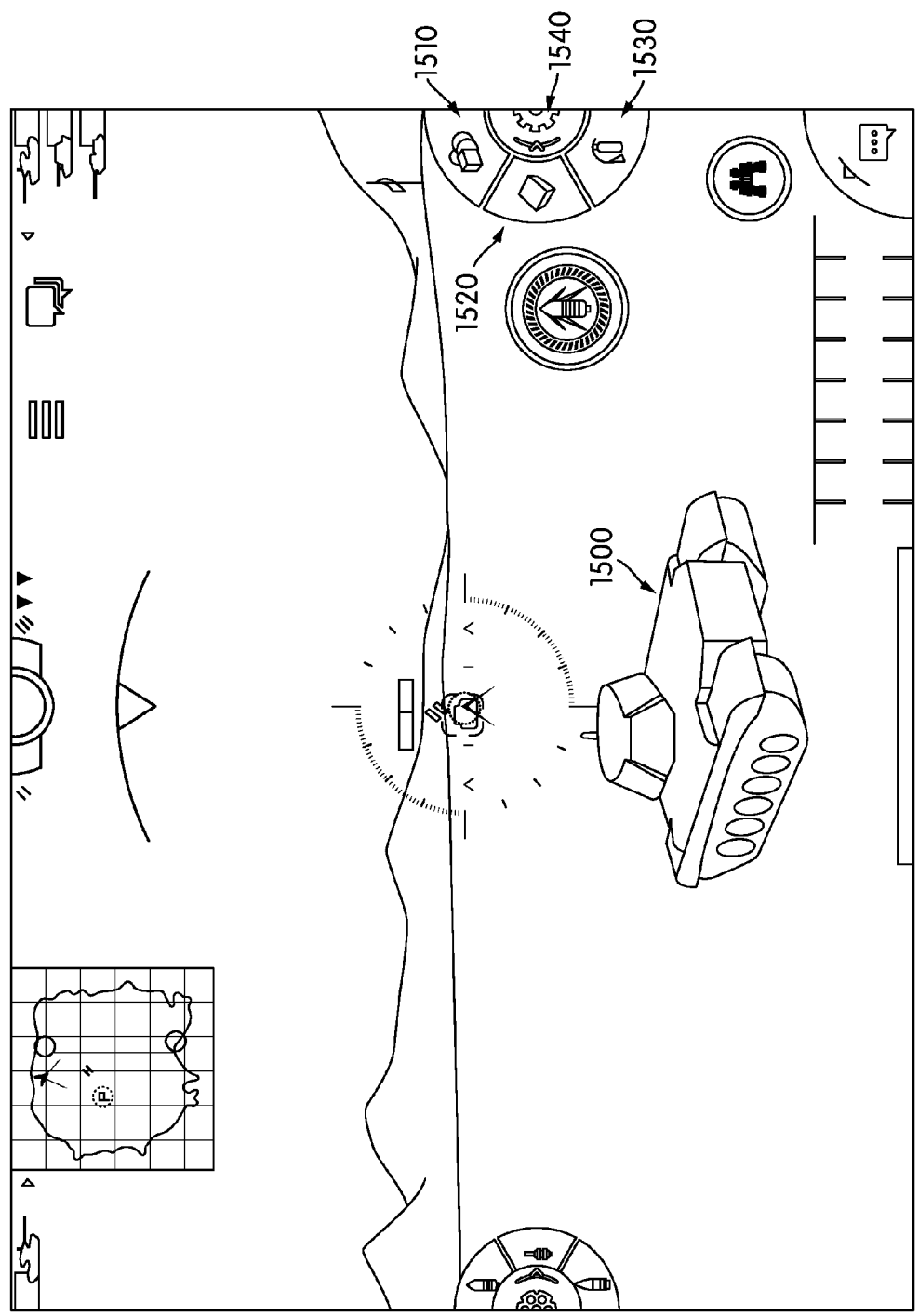

In some embodiments, each of the vehicle condition controls may need to be placed into an enabled mode or state before the associated status can be removed. As illustrated in FIG. 15A, all status controls are in a disabled mode or state (mode and state can be used interchangeably). FIG. 15B illustrates the condition controls as being in an enabled mode (e.g., repair control 1510, first aid control 1420 and fire extinguisher control 1530 may be extended to indicate they are enabled). When enabled, repair control 1510, first aid control 1420 and fire extinguisher control 1530 may be extended to indicate they are enabled. To enable/disable the condition controls, the user may be able to press vehicle condition enable toggle control 1540 to toggle between the enabled and disabled modes. Additionally, when a vehicle gains a particular condition, the associated control may be automatically enabled.

When a user presses a control that is in the enabled mode, the condition associated with the control may be attempted to be removed. For example, when repair control 1510 is pressed by the user, an attempt may be made to fix damage to the vehicle or fix a broken vehicle component (remove a damage status). When first aid control 1520 is pressed by the user, an attempt may be made to treat injured vehicle crew (remove a crew injury status). When fire extinguisher control 1530 is pressed by the user, an attempt may be made to put out a fire detected within the vehicle (remove an equipment fire status). In some embodiments, even if the vehicle does not have the status upon the user pressing the enabled control, the control may remain in the enabled mode. If the vehicle does not have the status, a message may be displayed indicating that the vehicle does not have the corresponding status.

Figure 15C:
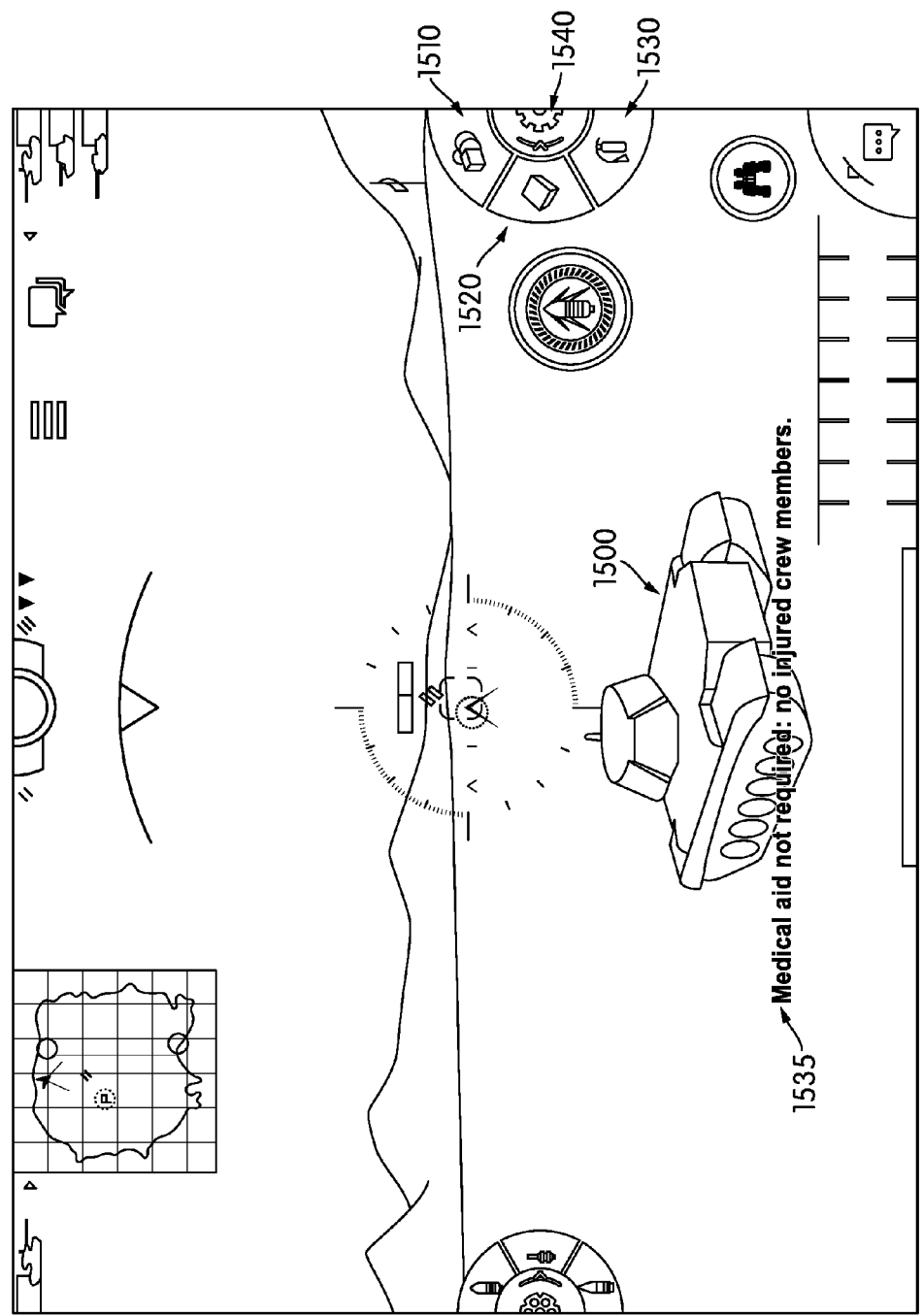

FIG. 15C illustrates an example screenshot where the first aid control 1520 has been placed in the active mode and pressed by the user when the vehicle 1500 does not have a crew injury status, which causes message 1535 to be displayed.

Figure 15D:
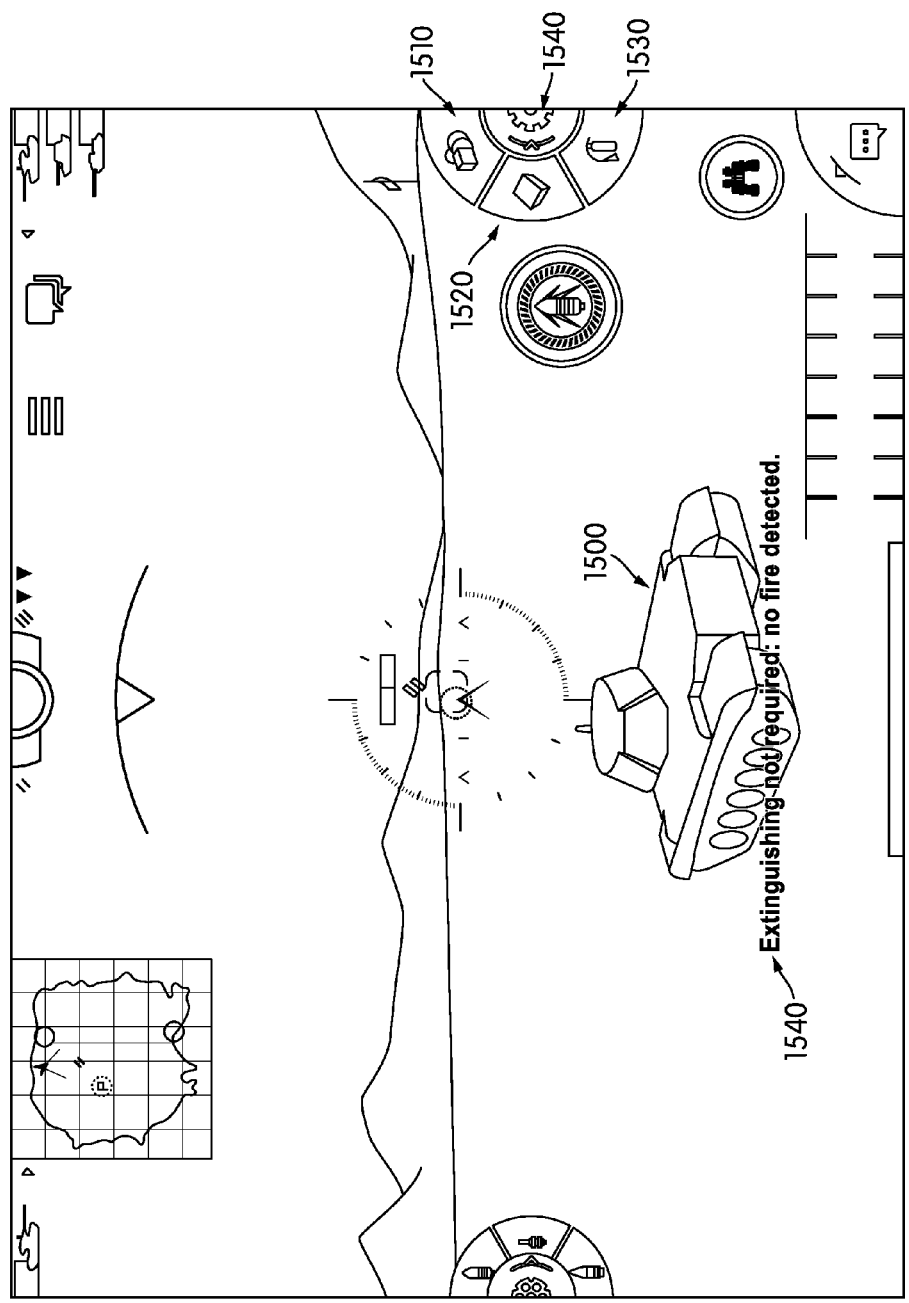

FIG. 15D illustrates an example screenshot where the fire extinguisher control 1530 has been placed in the active mode and pressed by the user when the vehicle 1500 does not have an equipment fire status, which causes message 1540 to be displayed.

Figure 15E:
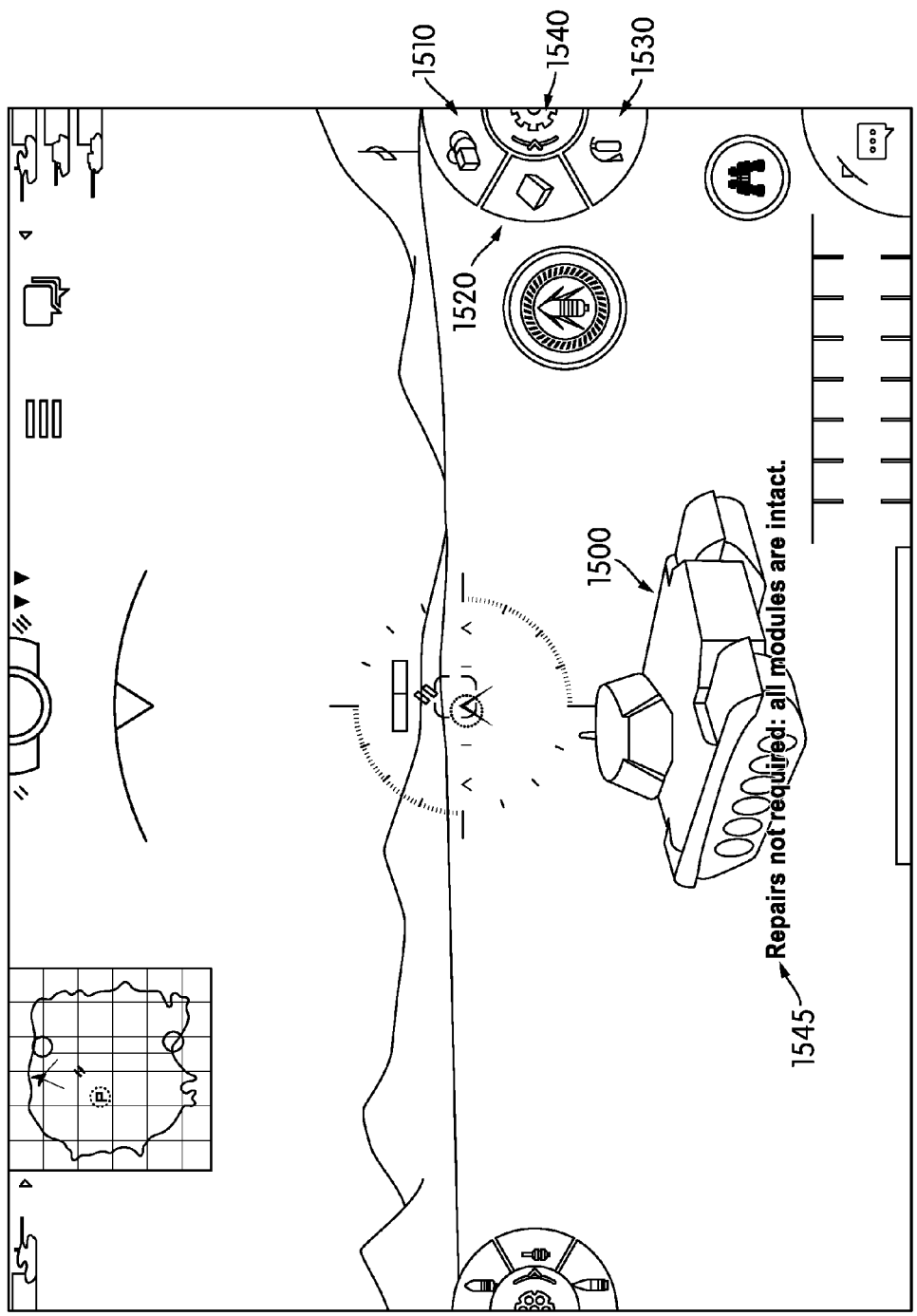

FIG. 15E illustrates an example screenshot where the repair control 1510 has been placed in the active mode and pressed by the user when the vehicle 1500 does not have a repair status, which causes message 1545 to be displayed.

Figure 15F:
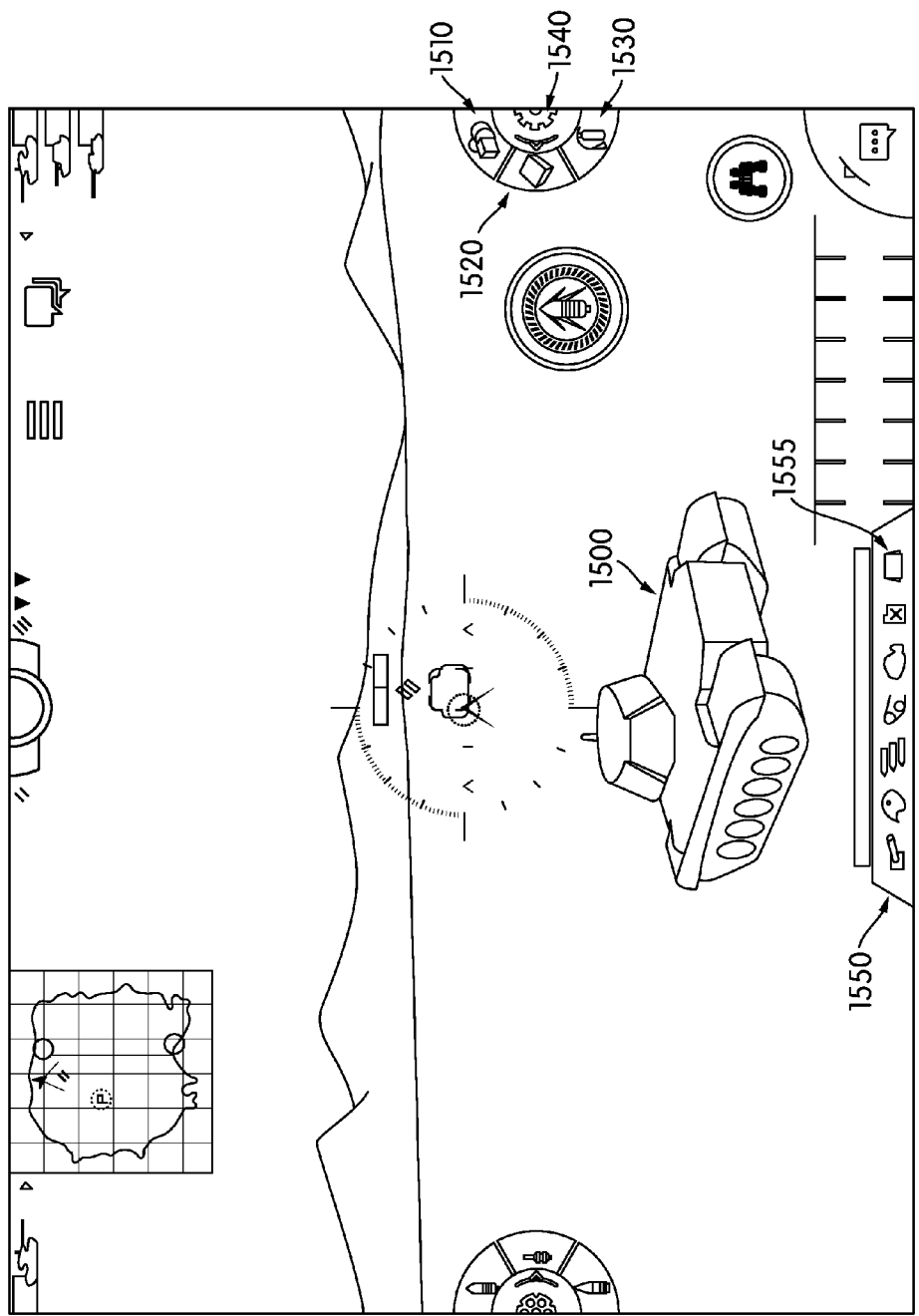

When a vehicle receives a status, the user interface may include a status indicator to indicate which status the vehicle currently has. FIG. 15F illustrates an example screenshot with a user interface that includes a status indicator. In particular, FIG. 15F depicts a user interface that includes visual status indicator 1550 that indicates the vehicle has a damage status (e.g., to the chassis) at 1555.

As also depicted by FIG. 15F, repair control 1510 is in the disabled mode. Accordingly, the user may, in some embodiments, be required to place the control in the active mode (by pressing toggle control 1540) prior to removing the damage status. Visual status indicator 1550 may be removed from the user interface when the damage status is removed and if the vehicle has no other statuses.

Figure 15G:
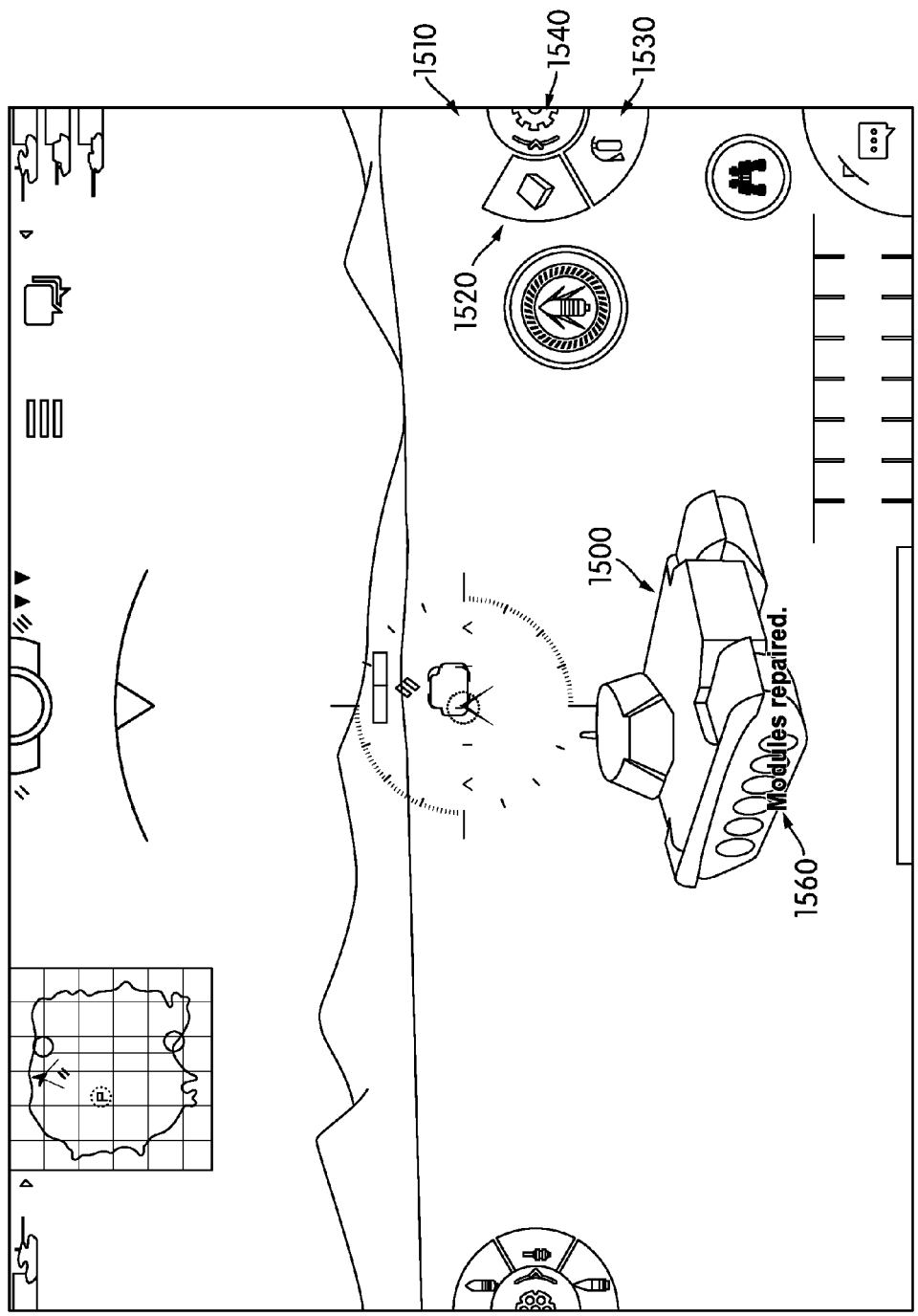

Additionally, in some embodiments, when the damage status is removed, the repair control 1510 may revert to the disabled mode, in some embodiments. In others, the repair control 1510 may remain in the enabled mode. If the repair control is linked to a consumable (e.g., a consumable that limits the number of damage statuses that can be removed), a consumable will be removed or decremented and, if the player is left without any consumables for the repair control 1510, the repair control 1510 may be disabled and the icon for the repair control 1510 may be removed from the user interface. FIG. 15G illustrates a screenshot with a user interface including a repair control 1510 that is disabled after removing a damage status (message 1560 is being displayed to show successful removal of the damage status). Resulting from the removal of the damage status, the user has no more consumables allowing for removal of the damage status; thus, repair control 1510 is displayed without an icon. Without a consumable, the player may be unable to move the repair control 1510 into the enabled mode (and thus is unable to remove a damage status).

Figure 15H:
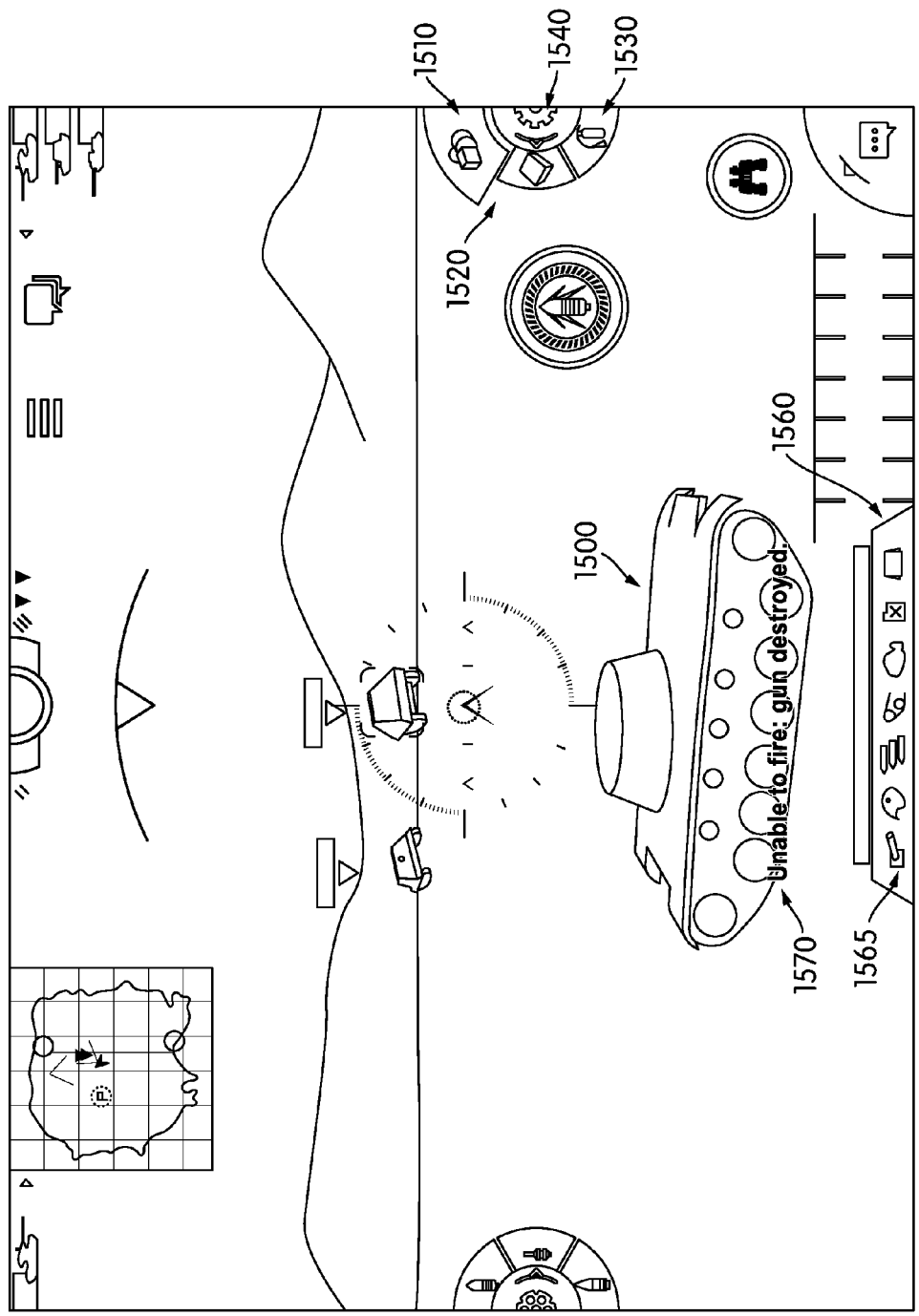

Some statuses or conditions received by the vehicle may affect the performance of the vehicle. For example, FIG. 15H illustrates a screenshot in which a vehicle 1500 has a damage status (as indicated by visual status indicator 1565 at 1560, and message 1570) that indicates the gun is too damaged to fire a shot. The player, accordingly, will be unable to fire the gun until the status is removed (e.g., by pressing repair control 1510 when it is in the enabled mode). As also illustrated in FIG. 15H, the associated control may be automatically placed in the enabled mode responsive to the vehicle gaining the associated status. In particular, FIG. 15H illustrates repair control 1510 in the enabled mode while fire extinguisher control 1520 and first aid control 1530 remain in the disabled mode. Repair control 1510 may have been placed in the enabled mode in response to the damaged gun status, which resulted from the gun taking a particular amount of damage.

Figure 16:
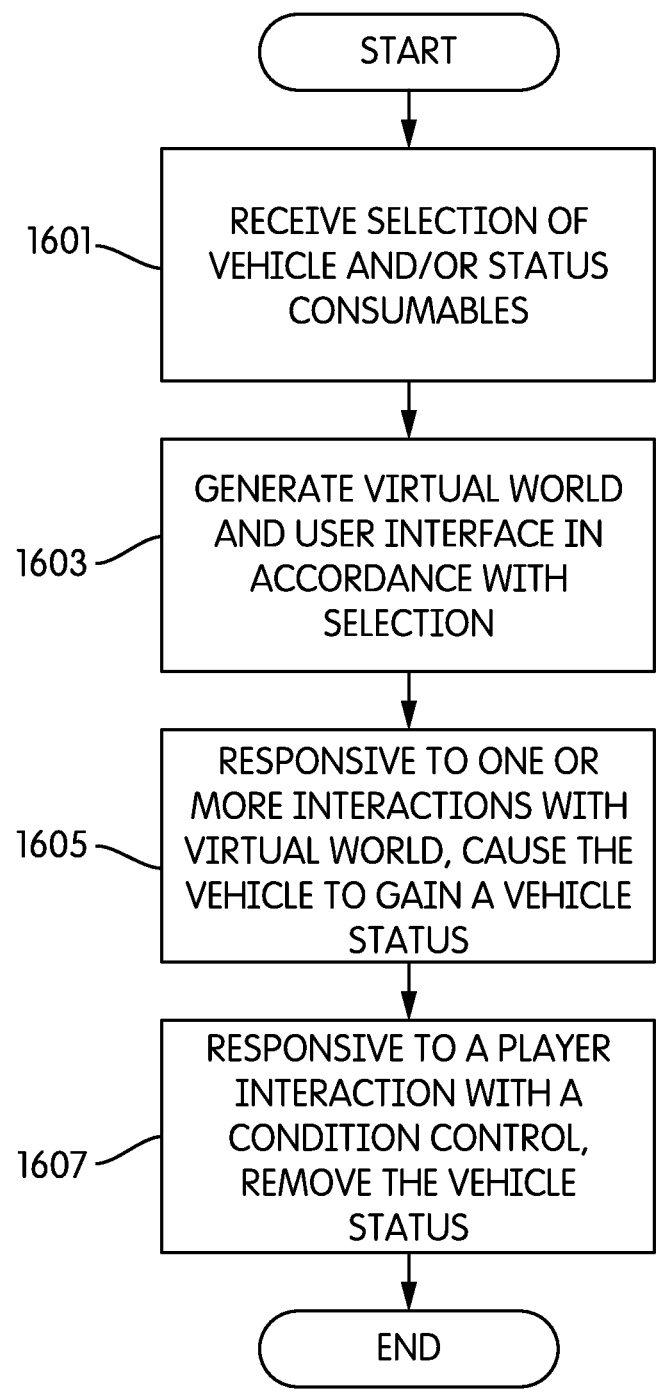
FIG. 16 illustrates an example method of providing a user interface to a virtual world that includes one or more user controls over vehicle conditions or statuses in accordance with various aspects described herein.

Discussed above are various examples where a player is able to control a vehicle or other object to remove vehicle conditions or statuses via, for example, one or more vehicle condition controls. FIG. 16 illustrates an example method of providing a user interface for a virtual world that includes one or more user controls over vehicle conditions or statuses.

At step 1601, a computing device may receive a selection of a vehicle and/or one or more status consumables. For example, a player may be able to interact with a menu to select the type of vehicle he or she will control in the virtual world (e.g., select the type or model of tank). The player may also be able to select one or more consumables that will allow them to remove one or more types of vehicle statuses. The types of consumables a player can select may be dependent on the type of vehicle selected (e.g., some tanks may be able to use a fire extinguisher, but others may not be able to use a fire extinguisher, etc.).

At step 1603, the computing device may generate a virtual world and user interface in accordance with (or based on) the selection of step 1601. For example, any of the user interfaces and virtual worlds described herein may be generated. The user interface may also include one or more vehicle condition controls, as discussed in connection with FIGS. 15A-15H (e.g., a fire extinguisher control, a repair control, a first aid control, a combination status control, etc.). In some arrangements, the types of vehicle condition controls displayed in the user interface may be dependent on the type of vehicle selected (e.g., if the selected tank can use a fire extinguisher, the user interface may include a fire extinguisher control). In others, the types of vehicle condition controls displayed in the user interface may be dependent on the consumables selected by the player (e.g., if the user has a combination status control, the user interface may include a combination status control).

At step 1605, the computing device may responsive to one or more interactions with the virtual world, cause the vehicle to gain a vehicle status. Examples of the various vehicle statuses were discussed above in connection with FIGS. 15A-15H. In one example, the vehicle may gain a damage status after receiving a particular amount of damage. The damage status may further be to a particular component of the vehicle, such as the gun, chassis, motor, treads, weapon system, and the like.

At step 1607, the computing device may, responsive to a player interaction with a condition control, remove the vehicle status. For example, if the vehicle receives a damage status and the repair control 1510 is enabled and pressed by the user, the vehicle status may be removed (e.g., over a period of time or instantaneously). Additional responses to removal of a vehicle condition were discussed above in connection with FIGS. 15A-15H and include, for example, displaying a message that the status was removed, decrementing of a consumable associated with the condition control and placing the condition control into the disabled mode.

While the steps of the methods illustrated throughout this disclosure are described and shown in a particular order, these steps may be rearranged and performed in any order.

The present aspects have been described in terms of preferred and illustrative embodiments. Numerous other embodiments, modifications and variations within the scope and spirit of the appended claims will occur to persons of ordinary skill in the art from a review of this disclosure.

The invention claimed is:

1. A method comprising:
   generating a virtual world that includes an object that, based on one or more interactions with a user interface, is controllable within the virtual world;
   generating, by a computing device that has a touch sensor, the user interface to include a plurality of object condition controls operable in an enabled mode and a disabled mode, wherein the plurality of object condition controls corresponds to a plurality of consumables, wherein the plurality of consumables is usable to remove a plurality of object statuses; and
   while the object is controllable within the virtual world and the user interface includes the plurality of object condition controls:
      indicating that the object has gained a first object status from the plurality of object statuses, wherein the first object status is removable based on usage of a first consumable from the plurality of consumables,
      placing the plurality of object condition controls in the disabled mode responsive to receiving a first interaction with the user interface, wherein the first interaction is based on the user pressing on the touch sensor, wherein the disabled mode prevents usage of the plurality of consumables,
      placing the plurality of object condition controls in the enabled mode responsive to receiving a second interaction with the user interface, wherein the second interaction is based on the user pressing on the touch sensor, and
      removing, while the plurality of object condition controls is in the enabled mode and responsive to a third interaction with the user interface, the first object status based on usage of the first consumable, wherein the third interaction is based on the user pressing on the touch sensor at a location corresponding to the first object condition control.

2. The method of claim 1, further comprising:
   decrementing the first consumable responsive to removing the first object status.

3. The method of claim 1, wherein the first object status comprises a crew injury status of the object.

4. The method of claim 1, wherein the first object status comprises a damage status of the object.

5. The method of claim 1, wherein first object status comprises an equipment fire status of the object.

6. The method of claim 1, wherein the user interface includes a toggle control for changing the plurality of object condition controls between the enabled mode and the disabled mode;
   wherein the first interaction with the user interface is based on the user pressing on the touch sensor at a location corresponding to the toggle control;
   wherein, when the plurality of object condition controls is in the disabled mode, the user interface includes a first visual indicator that indicates the disabled mode; and
   wherein, when the plurality of object condition controls is in the enabled mode, the user interface includes a second visual indicator that indicates the enabled mode.

7. The method of claim 1, wherein indicating that the object has gained the first object status includes indicating that a module of a chassis of the object is damaged and is unable to operate.

8. The method of claim 7, wherein the object includes a tank, and the module includes a gun of the tank.

9. An apparatus, comprising:
   a touch sensor;
   one or more processors; and
   memory storing executable instructions that, when executed by the one or more processors, cause the apparatus to:
      generate a virtual world that includes an object that, based on one or more interactions with a user interface, is controllable;
      generate the user interface to include a plurality of object condition controls operable in an enabled mode and a disabled mode, wherein the plurality of object condition controls corresponds to a plurality of consumables, wherein the plurality of consumables is usable to remove a plurality of object statuses; and
      while the object is controllable within the virtual world and the user interface includes the plurality of object condition controls:
         indicate that the object has gained a first object status, wherein the first object status is removable based on usage of a first consumable from the plurality of consumables,
         place the plurality of object condition controls in the disabled mode responsive to receiving a first interaction with the user interface, wherein the first interaction is based on the user pressing on the touch sensor, wherein the disabled mode prevents usage of the plurality of consumables,
         place the plurality of object condition controls in the enabled mode responsive to receiving a second interaction with the user interface, wherein the second interaction is based on the user pressing on the touch sensor, and
         remove, while the plurality of object condition controls is in the enabled mode and responsive to a third interaction with the user interface, the first object status based on usage of the first consumable, wherein the third interaction is based on the user pressing on the touch sensor at a location corresponding to the first object condition control.

10. The apparatus of claim 9, wherein the executable instructions, when executed, cause the apparatus to:
    decrement the first consumable responsive to removing the first object status.

11. The apparatus of claim 9, wherein the first object status comprises a crew injury status of the object.

12. The apparatus of claim 9, wherein the first object status comprises a damage status of the object.

13. The apparatus of claim 9, wherein the first object status comprises an equipment fire status of the object.

14. The apparatus of claim 9, wherein the user interface includes a toggle control for changing the plurality of object condition controls between the enabled mode and the disabled mode;
wherein the first interaction with the user interface is based on the user pressing on the touch sensor at a location corresponding to the toggle control;
wherein, when the plurality of object condition controls are in the disabled mode, the user interface includes a first visual indicator that indicates the disabled mode; and
wherein, when the plurality of object condition controls are in the enabled mode, the user interface includes a second visual indicator that indicates the enabled mode.

15. The apparatus of claim 9, wherein causing the apparatus to indicate that the object has gained the first object status includes causing the apparatus to indicate that a module of a chassis of the object is damaged and is unable to operate.

16. One or more non-transitory computer-readable media storing executable instructions that, when executed, cause an apparatus to:
generate a virtual world that includes an object that, based on one or more interactions with a user interface, is controllable within the virtual world;
generate the user interface to include a plurality of object condition controls operable in an enabled mode and a disabled mode, wherein the plurality of object condition controls corresponds to a plurality of consumables, wherein the plurality of consumables is usable to remove a plurality of object statuses; and
while the object is controllable within the virtual world and the user interface includes the plurality of object condition controls:
indicate that the object has gained a first object status from the plurality of object statuses, wherein the first object status is removable based on usage of a first consumable from the plurality of consumables,
place the plurality of object condition controls in the disabled mode responsive to receiving a first interaction with the user interface, wherein the first interaction is based on the user pressing on a touch sensor, wherein the disabled mode prevents usage of the plurality of consumables,
place the plurality of object condition controls in the enabled mode responsive to receiving a second interaction with the user interface, wherein the second interaction is based on the user pressing on the touch sensor,
remove, while the plurality of object condition controls is in the enabled mode and responsive to a third interaction with the user interface, the first object status based on usage of the first consumable, wherein the third interaction is based on the user pressing on the touch sensor at a location corresponding to the first object condition control.

17. The one or more non-transitory computer-readable media of claim 16, wherein the executable instructions, when executed, cause the apparatus to:
decrement the first object condition control responsive to removing the object status.

18. The one or more non-transitory computer-readable media of claim 16, wherein the first object status comprises a crew injury status of the object, a damage status of the object, or an equipment fire status of the object.

19. The one or more non-transitory computer-readable media of claim 16, wherein the user interface includes a toggle control for changing the plurality of object condition controls between the enabled mode and the disabled mode;
wherein the first interaction with the user interface is based on the user pressing on the touch sensor at a location corresponding to the toggle control;
wherein, when the plurality of object condition controls is in the disabled mode, the user interface includes a first visual indicator that indicates the disabled mode; and
wherein, when the plurality of object condition controls is in the enabled mode, the user interface includes a second visual indicator that indicates the enabled mode.

20. The one or more non-transitory computer-readable media of claim 16, wherein causing the apparatus to indicate that the object has gained the first object status includes causing the apparatus to indicate that a module of a chassis of the object is damaged and is unable to operate.

* * * * *